(12) United States Patent
Sakai et al.

(10) Patent No.: US 7,999,893 B2
(45) Date of Patent: Aug. 16, 2011

(54) COMPLEX BIREFRINGENT MEDIUM, POLARIZING PLATE, AND LIQUID CRYSTAL DEVICE

(75) Inventors: Akira Sakai, Kyoto (JP); Takayuki Natsume, Matsusaka (JP); Masahiro Hasegawa, Tenri (JP); Kazuhiko Tsuda, Nara (JP); Nobuaki Yamada, Higashiosaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 328 days.

(21) Appl. No.: 12/300,682

(22) PCT Filed: Jun. 1, 2007

(86) PCT No.: PCT/JP2007/061215
§ 371 (c)(1),
(2), (4) Date: Nov. 13, 2008

(87) PCT Pub. No.: WO2008/001582
PCT Pub. Date: Jan. 3, 2008

(65) Prior Publication Data
US 2009/0096970 A1    Apr. 16, 2009

(30) Foreign Application Priority Data
Jun. 28, 2006  (JP) .................. 2006-178460

(51) Int. Cl.
*G02F 1/13363* (2006.01)
(52) U.S. Cl. .................. 349/117; 349/118; 349/119
(58) Field of Classification Search .................. None
See application file for complete search history.

(56) References Cited

U.S. PATENT DOCUMENTS 5,583,679 A * 12/1996 Ito et al. .................. 349/118
6,061,113 A    5/2000 Kawata
(Continued)

FOREIGN PATENT DOCUMENTS

EP          0 864 885        9/1998
(Continued)

OTHER PUBLICATIONS

International Search Report for PCT/JP2007/061215, mailed Aug. 28, 2007.

*Primary Examiner* — Mike Stahl
(74) *Attorney, Agent, or Firm* — Nixon & Vanderhye P.C.

(57) ABSTRACT

The present invention provides a complex birefringent medium, which has the so-called inverse wavelength dispersibility, that is, a wavelength dispersibility capable of giving an optimum phase difference to a light of a wide visible wavelength range, has a wide viewing angle, can be produced by a convenient method and is excellent in a degree of adjusting freedom of inverse wavelength dispersibility and in mass productivity, a polarizing plate and a liquid crystal display device. The complex birefringent medium of the present invention is a complex birefringent medium having a structure in which a plurality of birefringent layers are laminated, wherein in the complex birefringent medium, a phase difference exhibits inverse wavelength dispersibility as the whole of the complex birefringent medium, and wherein when a principal refractive index having the maximum absolute value of a difference from an average value of three principal refractive indexes at a wavelength $\lambda$ (nm) is designated as a first principal refractive index $n1(\lambda)$, a normal line of the birefringent layer and a principal axis corresponding to the first principal refractive index $n1(550)$ of the birefringent layer are in the same plane.

39 Claims, 26 Drawing Sheets

U.S. PATENT DOCUMENTS

| | | |
|---|---|---|
| 6,400,433 B1 | 6/2002 | Arakawa et al. |
| 6,565,974 B1 | 5/2003 | Uchiyama et al. |
| 2002/0159005 A1 | 10/2002 | Arakawa et al. |
| 2002/0169267 A1 | 11/2002 | Minakuchi et al. |
| 2003/0214625 A1 | 11/2003 | Arakawa et al. |
| 2004/0227879 A1* | 11/2004 | Elman et al. .................. 349/117 |
| 2005/0014913 A1* | 1/2005 | Kim et al. ....................... 526/90 |
| 2005/0057714 A1* | 3/2005 | Jeon et al. ..................... 349/122 |
| 2006/0176426 A1* | 8/2006 | Jeon et al. ..................... 349/116 |
| 2006/0244884 A1* | 11/2006 | Jeon et al. ..................... 349/119 |
| 2009/0072194 A1* | 3/2009 | Yamahara et al. ....... 252/299.01 |

FOREIGN PATENT DOCUMENTS

| | | |
|---|---|---|
| EP | 1 045 261 | 10/2000 |
| EP | 1 457 792 | 9/2004 |
| EP | 1 693 692 | 8/2006 |
| JP | 3-13916 | 1/1991 |
| JP | 3-13917 | 1/1991 |
| JP | 3-263013 | 11/1991 |
| JP | 4-121703 | 4/1992 |
| JP | 5-27119 | 2/1993 |
| JP | 5-100114 | 4/1993 |
| JP | 10-68816 | 3/1998 |
| JP | 10-90521 | 4/1998 |
| JP | 10-239518 | 9/1998 |
| JP | 10-278123 | 10/1998 |
| JP | 2000-284126 | 10/2000 |
| JP | 2001-4837 | 1/2001 |
| JP | 2002-267838 | 9/2002 |
| JP | 2003-207640 | 7/2003 |
| JP | 2004-326089 A * | 11/2004 |
| JP | 2005-208414 | 8/2005 |
| WO | WO 00/26705 | 5/2000 |
| WO | WO 2004/068223 A1 * | 8/2004 |
| WO | WO 2004/068225 A1 * | 8/2004 |
| WO | WO 2004/104681 | 12/2004 |
| WO | WO 2005/017613 | 2/2005 |

* cited by examiner

COMPLEX BIREFRINGENT MEDIUM, POLARIZING PLATE, AND LIQUID CRYSTAL DEVICE

This application is the U.S. national phase of International Application No. PCT/JP2007/061215, filed 1 Jun. 2007, which designated the U.S. and claims priority to Japan Application No. 2006-178460, filed 28 Jun. 2006, the entire contents of each of which are hereby incorporated by reference.

TECHNICAL FIELD

The present invention relates to a complex birefringent medium, a polarizing plate and a liquid crystal display device. More particularly, the present invention relates to a complex birefringent medium exhibiting inverse wavelength dispersibility, a polarizing plate and a liquid crystal display device using the complex birefringent medium.

BACKGROUND ART

A complex birefringent medium is an optical element capable of converting a polarized state (linearly polarized light, circularly polarized light, elliptically polarized light) of incident light. Such the birefringent media are industrially widely used as phase difference films typified by a λ/4 plate having a phase difference (birefringent phase difference, retardation) corresponding to ¼ of an incident light wavelength λ and a λ/2 plate having a phase difference corresponding to ½ of an incident light wavelength λ in liquid crystal display devices or the like together with linear polarizers capable of obtaining linearly polarized light from natural light. As a conventional phase difference film, thin plates composed of inorganic materials such as calcite, mica, crystal and the like and stretched polymer films formed by stretching a polymer film having large intrinsic birefringence (ultimate birefringence value) at high draw ratio to enhance a degree of orientation of a high polymer chain and to develop oriented birefringence are well known. Furthermore, recently, a phase difference film in which the orientation of liquid crystal is fixed or the like is known.

The λ/4 plate has an optical function of converting the linearly polarized light to the circularly polarized light, and it is applied for a circularly polarizing plate or the like. Since the circularly polarized light has a property in which chirality of right and left is replaced each other in reflecting the circularly polarized light with a mirror or the like, when a left-handed circularly polarizing plate is disposed on a mirror and light is irradiated, light passing through the left-handed circularly polarizing plate and converted to left-handed circularly polarized light is converted to right-handed circularly polarized light by reflection on the mirror, and this right-handed circularly polarized light cannot pass through the left-handed circularly polarizing plate. That is, the circularly polarizing plate has an optical function of reducing reflection. Such a reflection-protective optical function of the circularly polarizing plate is applied to for reducing reflection on an internal electrode in organic EL or the like. Further, the λ/2 plate has an optical function of converting the orientation (vibration direction) of the linearly polarized light. Furthermore, a phase difference film having a phase difference other than a quarter and a half of an incident light wavelength λ also has an optical function of converting the polarized state (ellipticity and/or orientation) of incident light to another state.

These phase difference films are generally designed so as to exhibit required optical functions to light of specified wavelength (monochromatic light). For example, the λ/4 plate is generally adjusted to a phase difference corresponding a quarter of a wavelength at only a specific design central wavelength, and it is not adjusted to a phase difference corresponding a quarter of a wavelength due to the wavelength dispersion of intrinsic birefringence resulting from the materials of the phase difference film at other wavelength. That is, in the conventional phase difference films, since it is common that an absolute value of the intrinsic birefringence, which the material exhibits, generally becomes larger as the wavelength is shorter and becomes smaller as the wavelength is longer, that is, exhibits normal wavelength dispersibility. If a phase difference is adjusted to, for example, 137.5 nm which is a quarter of 550 nm at 550 nm of a design central wavelength, a phase difference at a wavelength of 450 nm becomes, for example, 148.5 nm which is larger than 137.5 nm, and this is larger than 112.5 nm which is a quarter of 450 nm. Even if the phase difference at a wavelength of 450 nm is identical to the phase difference 137.5 nm at a wavelength of 550 nm, it is larger than 112.5 nm. Further, a phase difference at a wavelength of 650 nm becomes, for example, 132 nm which is smaller than 137.5 nm, and this is smaller than 162.5 nm which is a quarter of 650 nm. Even if the phase difference at a wavelength of 650 nm is identical to the phase difference 137.5 nm at a wavelength of 550 nm, it is smaller than 162.5 nm. White light is irradiated to such the phase difference film, output light is colored because converting of the polarized state varies from one wavelength to another.

In order to prevent such coloring, various investigations is made concerning a wideband phase difference film capable of providing an optimal phase difference for light in a wide range of visible wavelength range, specifically, a phase difference film having the so-called inverse wavelength dispersibility (inverse characteristics of normal wavelength dispersibility) in which an absolute value of a practical phase differences becomes smaller as the wavelength is shorter and an absolute value of a practical phase differences becomes larger as the wavelength is longer. As such the phase difference film having the inverse wavelength dispersibility, a phase difference film formed by laminating two stretched film having different wavelength dispersion of intrinsic birefringence in such a way that stretching directions (or optic axes, slow axes, fast axes) are perpendicular to each other is disclosed (for example, refer to Patent Documents 1 to 5).

Further, a phase difference film formed by bonding a λ/4 plate to a λ/2 plate with two stretching directions (or optic axes, slow axes, fast axes) crossed is disclosed (for example, refer to Patent Documents 6 and 7). Further, a phase difference film formed by laminating at least two phase difference films having a phase difference of 160 to 300 nm with two slow axes not parallel and not perpendicular to each other is disclosed (for example, refer to Patent Document 8). Furthermore, a method, in which a phase difference layer to use liquid crystalline molecules is used for at least one layer of two or more stretched films in place of a method of laminating two or more stretched films, is also investigated. For example, a phase difference plate, which is formed by laminating a first optically anisotropic layer containing liquid crystalline molecules and substantially having a phase difference of n and a second optically anisotropic layer containing liquid crystalline molecules and substantially having a phase difference of π/2 on a long transparent support in such a way that an angle between a in-plane slow axis of the second optically anisotropic layer and a in-plane slow axis of the first optically anisotropic layer is substantially 60 degrees, is disclosed (for example, refer to Patent Document 9). In addition, a phase difference film formed by laminating an optically anisotropic layer having a phase difference of 210 to 300 nm at a wavelength of 550 nm and an optically anisotropic layer having a phase difference of 115 to 150 nm at a wavelength of 550 nm, in which one optically anisotropic layer is made of a polymer film and the other optically anisotropic layer is made of a liquid crystalline molecule, is disclosed (for example, refer to Patent Document 10).

In contrast, a technique in which a wideband phase difference film is realized by one phase difference film is proposed (for example, refer to Patent Documents 11 and 12). In this method, a polymer film composed of a copolymer and/or a blend polymer containing a monomer unit having positive refractive index anisotropy and a monomer unit having negative birefringence is uniaxially-stretched. In accordance with this method, a wideband phase difference film can be realized by one layer phase difference film without laminating phase difference films and a viewing angle characteristic can be improved.

Further, a low-profile wideband phase difference film which can be produced by a simple production process is contemplated and a liquid crystal composition exhibiting inverse wavelength dispersibility is also proposed (for example, refer to Patent Documents 13). In this method, a liquid crystal layer containing a compound having two or more species of mesogenic groups and a rod-shaped liquid crystal compound is provided, and by aligning the rod-shaped liquid crystal compound so as to have homogeneous alignment, and aligning at least one species of the mesogenic group of the compound having mesogenic groups at a 45 to 90 degree angle with respect to an optic axis of the rod-shaped liquid crystal compound in a film-plane, the inverse wavelength dispersibility is tried to be developed.

Furthermore, a phase difference film having inverse wavelength dispersibility formed by aligning a liquid crystal monomer having discotic mesogen and nematic mesogen having a polymerizable group at its end in a molecule in such a way that an optic axis of discotic mesogen is substantially parallel to an optic axis of nematic mesogen is proposed (for example, refer to Patent Documents 14). Further, a method of laminating a stretched film having an optically-positive uniaxial property and a stretched film having an optically-negative uniaxial property with stretching directions parallel to each other is known (for example, refer to Patent Document 15).

[Patent Document 1]
Japanese Kokai Publication No. Hei-3-13916
[Patent Document 2]
Japanese Kokai Publication No. Hei-3-263013
[Patent Document 3]
Japanese Kokai Publication No. Hei-4-121703
[Patent Document 4]
Japanese Kokai Publication No. Hei-5-27119
[Patent Document 5]
Japanese Kokai Publication No. Hei-10-239518
[Patent Document 6]
Japanese Kokai Publication No. Hei-10-68816
[Patent Document 7]
Japanese Kokai Publication No. Hei-5-100114
[Patent Document 8]
Japanese Kokai Publication No. Hei-10-90521
[Patent Document 9]
Japanese Kokai Publication No. 2001-4837
[Patent Document 10]
Japanese Kokai Publication No. 2000-284126
[Patent Document 11]
WO 00/26705
[Patent Document 12]
Japanese Kokai Publication No. 2003-207640
[Patent Document 13]
Japanese Kokai Publication No. 2002-267838
[Patent Document 14]
Japanese Kokai Publication No. 2005-208414
[Patent Document 15]
Japanese Kokai Publication No. Hei-3-13917

DISCLOSURE OF THE INVENTION

Problems to be Solved by the Invention

The present inventors made various investigations concerning phase difference films (hereinafter, also referred to as a "double layer perpendicularly laminated type phase difference film") disclosed in Patent Documents 1 to 5 and phase difference films (hereinafter, also referred to as a "double layer crisscross laminated type phase difference film") disclosed in Patent Documents 6 to 10, and consequently found that these double layer perpendicularly laminated type phase difference film and double layer crisscross laminated type phase difference film are all a laminated body formed by laminating two or more birefringent layers while controlling properly angles of their stretching directions (or optic axes, slow axes, fast axes), and these phase difference films can realize a desired function of converting a polarized state at a design angle (generally, a normal line direction of the phase difference film), but the desired function of converting a polarized state cannot be achieved and a viewing angle is not adequate at an angle other than the design angle.

Further, the present inventors made various investigations concerning phase difference films (hereinafter, also referred to as a "single layer type phase difference film") disclosed in Patent Documents 11 to 14, and consequently found that as for the single layer type phase difference films disclosed in Patent Documents 11 and 12, with respect to the wavelength dispersion control by this method, oriented birefringence itself becomes smaller than that of original materials since inherently, positive and negative oriented birefringence cancel each other. That is, the present inventors found that when an ideal wideband phase difference film is realized, an adequate phase difference is not exhibited in same film thickness as in conventional phase difference film and a thickness of a raw film not yet stretched have to be increased, and therefore this method cannot meet the demand for thinned phase difference film in recent years, and in addition to this, forming of the raw film itself is difficult. Further, the present inventors found that review of polymer synthesis is required for adjusting the wavelength dispersibility and freedom of optimally adjusting the wavelength dispersibility according to application is low. Furthermore, the present inventors found that options for materials is few and its synthesis is difficult in consideration of securing characteristics such as transparency compatible with optical use. As for the single layer type phase difference film disclosed in Patent Document 13, the present inventors found that in such the liquid crystal composition, when a compound to be mixed is increased, a liquid crystalline property is lost since the compound to be mixed is not liquid crystalline and therefore it is difficult to control the wavelength dispersibility arbitrarily. Furthermore, as for the single layer type phase difference film disclosed in Patent Document 14, the present inventors found that in this method, it is difficult to control the wavelength dispersibility arbitrarily since the inverse wavelength dispersibility is exhibited by controlling kinds or a length of a connecting group of principal chain mesogen and side chain mesogen.

Furthermore, the present inventors made various investigations concerning a phase difference film (hereinafter, also referred to as a "double layer parallel laminated type phase difference film") disclosed in Patent Document 15, and consequently found that in the double layer parallel laminated type phase difference film, a method of further enlarging (specifically 1.12 or more) the wavelength dispersibility $v=\Delta n(450\ nm)/\Delta n(650\ nm)$ for the purpose of compensating color of a super twisted nematic (STN) mode, that is, a method of enlarging normal wavelength dispersibility is disclosed, but there is no description about a method of realizing the so-called inverse wavelength dispersibility in which an absolute value of a practical phase differences becomes larger as the wavelength is longer. Further, the present inventors found that in the method of Patent Document 15, since it is necessary to laminate a stretched film exhibiting an optically uniaxial property, options for film materials and film stretching method is limited. For example, industrially, there may be requirement for stretching in a width direction (also referred to as transverse-uniaxial stretching) perpendicular to a direction of film-transferring in order to enable roll to roll bonding or the like to a polarizer or another phase difference film for improving processing efficiency, but in the case of transverse-uniaxial stretching, film shrinkage in a direction perpendicular to a stretching direction is impaired due to tensile for transferring a film and the film becomes a fixed end stretching. Therefore, the stretched film generally becomes a film having an optically biaxial property and becomes a film not having an optically uniaxial property.

In addition, in Patent Document 4, with respect to a laminate of a birefringent film in which a ratio of phase difference at a wavelength of 450 nm/phase difference at a wavelength of 550 nm is 1.00 to 1.05, and a birefringent film in which the ratio is 1.05 to 1.20, a method of laminating the birefringent films in such a way that optic axes of the birefringent films are parallel to each other. However, the present inventors found that also in Patent Document 4, there is no description about that the inverse wavelength dispersibility is realized while laminating the birefringent films in such a way that optic axes of the birefringent films are parallel to each other.

In view of the above state of the art, it is an object of the present invention to provide a complex birefringent medium, which has the so-called inverse wavelength dispersibility, that is, a wavelength dispersibility capable of giving an optimum phase difference to a light of a wide visible wavelength range, has a wide viewing angle, can be produced by a convenient method and is excellent in a degree of adjusting freedom of inverse wavelength dispersibility and in mass productivity, a polarizing plate and a liquid crystal display device.

Means for Solving the Problems

The present inventors made various investigations concerning the constitution of the complex birefringent medium whose production process can be readily simplified and the wavelength dispersibility can be readily controlled, and which can realize a wideband phase difference film having a wide viewing angle, and consequently have first noted number of birefringent layers composing the complex birefringent medium. Accordingly, the present inventors found that by employing a constitution in which a plurality of birefringent layers are laminated, freedom of selection of materials for realizing the inverse wavelength dispersibility is further enlarged compared with a constitution composed of one birefringent layer, and therefore the control of the wavelength dispersibility can be facilitated and the production process can be simplified and mass production can be realized.

However, the present inventors found that in accordance with the constitution in which a plurality of birefringent layers are laminated, a viewing angle becomes narrower than the constitution composed of one birefringent layer. The present inventors made investigations concerning the causes, and consequently found that the cause is due to the fact that when a principal refractive index having the maximum absolute value of a difference from an average value of three principal refractive indexes at a wavelength $\lambda$ (nm) is designated as a first principal refractive index $n1(\lambda)$, an angle which the principal axis corresponding to the first principal refractive index $n1(550)$ of one birefringent layer forms with that of the other birefringent layer is deviated largely from a design value in the direction of a normal line in an oblique direction.

Then, the present inventors found that by employing a constitution in which the normal line of the birefringent layer and the principal axis corresponding to the first principal refractive index $n1(550)$ of the birefringent layer are in the same plane, (1) in a front direction, since the principal axis corresponding to the first principal refractive index $n1(550)$ of each birefringent layer can be coincided apparently, the degradation of display quality can be suppressed, and (2) in an oblique direction, since an amount of a deviation from a design value in a normal line direction of the angle which one principal axis corresponding to the first principal refractive index $n1(550)$ of each birefringent layer forms with another principal axis can be reduced, widening of a viewing angle can be realized. Further, the present inventors found that since such the constitution is not limited to the constitution in which optically uniaxial birefringent layers are laminated, and the constitution can be uniformly applied to the wide ranging constitutions such as the constitution in which an optically uniaxial birefringent layer and an optically biaxial birefringent layer are laminated, the constitution in which optically biaxial birefringents are laminated, or the constitution in which an optically uniaxial or biaxial birefringent and a birefringent layer in an alignment state of the so-called hybrid alignment are laminated, this constitution has a large freedom of selection of materials and stretching method of the birefringent layer, and therefore this constitution is suitable for mass production and a degree of adjusting freedom of the inverse wavelength dispersibility can be improved. These findings have now led to completion of the present invention.

That is, the present invention pertains to a complex birefringent medium having a structure in which a plurality of birefringent layers are laminated, wherein in the complex birefringent medium, a phase difference exhibits inverse wavelength dispersibility as the whole of the complex birefringent medium, and wherein when a principal refractive index having the maximum absolute value of a difference from an average value of three principal refractive indexes at a wavelength $\lambda$ (nm) is designated as a first principal refractive index $n1(\lambda)$, a normal line of the birefringent layer and a principal axis corresponding to the first principal refractive index $n1(550)$ of the birefringent layer are in the same plane Hereinafter, the present invention will be described in detail.

The complex birefringent medium of the present invention has a structure in which a plurality of birefringent layers are laminated. In accordance with this constitution, by controlling the phase difference $R(\lambda)$ of each birefringent layers and the wavelength dispersion of the phase difference $R(\lambda)$ of each birefringent layers, the phase difference of the complex birefringent medium and the wavelength dispersion of the phase difference of the complex birefringent medium can be controlled. Accordingly, as distinct from the constitution composed of one birefringent layer, it is not necessary to control oriented birefringence at a level of a molecule structure and freedom of selection of materials can be enhanced, and therefore the control of the phase difference of the complex birefringent medium and the wavelength dispersion of the phase difference of the complex birefringent medium can be facilitated. Further, as distinct from the constitution composed of one birefringent layer, since materials suitable for a production process or low-cost materials can be selected as materials to compose each birefringent layer, the production process can be simplified and mass production can be realized.

In addition, the phase difference of the birefringent layer is defined by the following equation (1):

$$R(\lambda)=[n1(\lambda)-n2(\lambda)]\times d \quad (1),$$

wherein $R(\lambda)$ represents a phase difference at a wavelength $\lambda$ (nm). $n1(\lambda)$ represents a principal refractive index having the maximum absolute value of a difference from an average value of three principal refractive indexes at a wavelength $\lambda$ (nm), and in the present description, particularly, $n1(\lambda)$ at a wavelength of 550 nm is also referred to as "the first principal refractive index $n1(550)$". In addition, in the optically uniaxial birefringent layer, the first principal refractive index $n1(550)$ corresponds an extraordinary index $ne(550)$. $n2(\lambda)$ represents a principal refractive index having the second-largest absolute value of a difference from an average value of three principal refractive indexes at a wavelength $\lambda$ (nm), and particularly, $n2(\lambda)$ at a wavelength of 550 nm is also referred to as "the second principal refractive index $n2(550)$". Further, other principal refractive index is a principal refractive index $n3(\lambda)$ having the minimum absolute value. Particularly, $n3(\lambda)$ at a wavelength of 550 nm is also referred to as "the third principal refractive index $n3(550)$". In the optically uniaxial birefringent layer, the second principal refractive index $n2(550)$ and the third principal refractive index $n3(550)$ are the same, and both principal refractive indexes correspond an ordinary index $no(550)$.

In addition, in the present invention, when the relationship of $n2(550)=n3(550)$ is satisfied, any one of the principal refractive indexes may be appropriately employed as a second principal refractive index $n2(550)$ and the rest may be employed as a third principal refractive index $n3(550)$. d represents thickness.

"Three principal refractive indexes of the birefringent layer" in the present description refers to three principal refractive indexes in a coordinate system coincident with a principal dielectric axis (principal axis of dielectric tensor). A dielectric constant $\in$ is one of material constants which relates an electric field vector E to an electric displacement vector D in the form of $D=\in E$ (composite equation of a material) When the material (medium) has anisotropy, the dielectric constant $\in$ becomes a second rank tensor and has 9 independent components. Generally, each component is a complex number, but it becomes a real number when the medium does not absorb light and is transparent like a phase difference film. Furthermore, when the material (medium) does not have an optical rotary power, from an energy conservation law in a medium, the dielectric tensor have to be symmetrical tensor (diagonal components are the same), and thereby number of independent components is reduced from 9 to 6. Thereafter, by appropriately rotating an orthogonal coordinate system, it is possible to make the diagonal components of the dielectric tensor zero, and the dielectric tensor becomes a diagonal tensor. In this time, diagonal three components are referred to as a principal dielectric constant, and an orthogonal coordinate system is referred to as a principal dielectric axis. In addition, in an optical frequency, since the dielectric constant is equal to the square of refractive index, the square root of the principal dielectric constant (relative permittivity) is referred to as a principal refractive index.

The phase difference of the complex birefringent medium of the present invention exhibits the inverse wavelength dispersibility as the whole of the complex birefringent medium. "The inverse wavelength dispersibility" generally refers to a characteristic in which an absolute value of the phase differences becomes smaller as the wavelength is shorter, and becomes larger as the wavelength is longer in a visible wavelength range (400 nm $\leq \lambda \leq$ 700 nm). In the present invention, "a phase difference of the complex birefringent medium exhibits the inverse wavelength dispersibility" refers to satisfying at least one of the following equations (A) and (B).

$$1>[N1(450)-N2(450)]/[N1(550)-N2(550)] \quad (A)$$

$$1<[N1(650)-N2(650)]/[N1(550)-N2(550)] \quad (B)$$

In the equations, $N1(\lambda)$ and $N2(\lambda)$ represent refractive indexes corresponding to two eigenmodes of light with a wavelength $\lambda$ (nm), propagating in the complex birefringent medium in an arbitrary direction which is not parallel to all the principal axes corresponding to the first principal refractive index $n1(\lambda)$ of the birefringent layers. The relationship of $N1(\lambda) \geq N2(\lambda)$ is satisfied. In addition, the eigenmode referred to here means an intrinsic polarization mode, and refers to a polarized state in which light propagates in a medium while maintaining an invariant polarized state though being subjected to changes in amplitude. Since a single birefringent layer is transparent and does not have an optical rotary power in many cases, by solving Fresnel's wavefront normal line equation which is a basic equation describing the light propagation in an anisotropic medium, it is shown that an intrinsic polarization mode represents two linearly polarized light perpendicular to each other. Furthermore, it can also be shown that two electric displacement vectors D corresponding to the intrinsic polarization mode are perpendicular to a direction of light propagation, and illustrations of birefringence using an optical indicatrix described later and illustrations of a vibration direction of the intrinsic polarization mode are based on this fact. On the other hand, it is shown that since general anisotropic media such as the complex birefringent medium formed by laminating a plurality of birefringent layers generally have both linear birefringence and optical rotary power, intrinsic polarization mode is two elliptically polarized light which are perpendicular to each other (major axes of an ellipse are perpendicular to each other and rotation is opposite in direction). However, in the most cases, in the general anisotropic media, since an effect of optical rotary power is extremely small compared with an effect of linear birefringence except for the case where light propagates in a direction of principal dielectric axis, the intrinsic polarization mode is elliptically polarized light having extremely small ellipticity and the intrinsic polarization mode may be handled as a linear polarization mode. In this case, a direction of the major axis of an ellipse may be assumed to be a vibration direction of the intrinsic polarization mode.

Since the complex birefringent medium of the present invention exhibits the inverse wavelength dispersibility as the whole of the complex birefringent medium, it can exhibit a phase difference close to an ideal value at a wavelength other than 550 nm which is a design central wavelength, and therefore a wideband phase difference film can be realized. Furthermore, in this time, if materials, in which an absolute value of the phase difference $R(550)$ is large, is used as the materials composing the birefringent layers, a wideband property can be improved. In addition, in order to improve a wideband property more reliably, the complex birefringent medium of the present invention preferably satisfies both the equations (A) and (B).

In the complex birefringent medium of the present invention, the normal line of the birefringent layer and the principal axis corresponding to the first principal refractive index n1(550) of the birefringent layer are in the same plane. In the present description, the term "in the same plane" includes not only a state of being in the same plane but also a state which can be assumed to be in the same plane in view of the effect of the present invention. By the fact that the principal axis corresponding to the first principal refractive index n1 of each birefringent layer and the normal lines of the birefringent layers are in the same plane, since the principal axis corresponding to the first principal refractive index n1(550) of each birefringent layer can be overlapped in a front direction without being crossed apparently, the degradation of display quality in a front direction can be suppressed. For example, there may be a case in consideration of the viewing angle compensation or the like of a crossed Nichols polarizing plate where the complex birefringent medium of the present invention exhibits a function of converting a polarized state only in an oblique direction, in other words, there may be a case where a function of converting a polarized state in a front direction does not exhibit. In such a case, by matching the absorption axis or the transmission axis of the polarizer and the normal line direction of a plane, the principal axis corresponding to the first principal refractive index n1(550) of each birefringent layer is apparently perpendicular to the absorption axis or the transmission axis of the polarizer in a front direction, and therefore it becomes possible to prevent the complex birefringent medium of the present invention from exhibiting a function of converting a polarized state in a front direction. Further, by the fact that the principal axis corresponding to the first principal refractive index n1(550) of each birefringent layer and the normal lines of the birefringent layers are in the same plane, an amount of a deviation from a design value in a normal line direction of the angle which one principal axis corresponding to the first principal refractive index n1(550) of each birefringent layer forms with another principal axis can be reduced in an oblique direction, and therefore widening of a viewing angle can be realized. Furthermore, such the constitution is not limited to the case of laminating optically uniaxial birefringent layers, and the constitution can be widely applied to the case of laminating an optically uniaxial birefringent layer and an optically biaxial birefringent, the case of laminating optically biaxial birefringents, or the case of laminating an optically uniaxial or biaxial birefringent and a birefringent layer in an alignment state of hybrid alignment, and in these cases, the similar operation and effect can be achieved. Therefore, since this constitution has a large freedom of selection of materials and stretching method of the birefringent layer, this constitution is suitable for mass production and can improve a degree of adjusting freedom of the inverse wavelength dispersibility. In addition, in the present invention, the reason why a reference wavelength $\lambda$ of the principal axis, which are aligned in the same plane, corresponding to the first principal refractive index n1($\lambda$) is designated at 550 nm is that the sensitivity of human eyes is considered.

Since the plurality of birefringent layers used in the present invention are generally all flat plate-shaped, the normal lines of the plurality of birefringent layers are generally coincident with one another. Further, the principal axis corresponding to the first principal refractive index n1(550) of the birefringent layer will be described as follows. When the birefringent layer is an optically uniaxial phase difference film, a second principal refractive index n2(550) and a third principal refractive index n3(550) become an ordinary index no (550) and the first principal refractive index n1(550) becomes an extraordinary index ne(550), and therefore the principal axis corresponding to the first principal refractive index n1(550) is coincident with the optic axis. In addition, the optic axis refers to a direction in which two eigenmodes of light is degenerated (refractive indexes corresponding to the two eigenmodes are coincident with each other) in the birefringent layer. On the other hand, when the birefringent layer is not optically uniaxial, the principal axis corresponding to the first principal refractive index n1(550) is not coincident with the optic axis. For example, when a birefringent layer is such a optically biaxial phase difference film that three principal refractive indexes nx1(550), nx2(550) and nx3(550) at a wavelength of 550 nm in a x1-x2-x3 coordinate system coincident with a principal dielectric axis satisfy the relationship of nx1(550)>nx2(550)>nx3(550), two optic axes exist in directions symmetric to the x2 axis in a x1-x3 plane. On the other hand, the principal axis corresponding to the first principal refractive index n1(550) varies depending on a relationship between nx2(550) and nx1(550) or nx3(550). That is, when the nx2(550) is closer to nx1(550), the principal axis corresponding to the first principal refractive index n1(550) coincides with the x3 axis, and when the nx2(550) is closer to nx3(550), the principal axis corresponding to the first principal refractive index n1(550) coincides with the x1 axis. In other words, an optic axis in optically approximating the biaxial birefringent layer by the uniaxial birefringent layer corresponds the principal axis corresponding to the first principal refractive index n1(550). For example, when the relationship of nx1(550)>nx2(550)>>nx3(550) is satisfied, the x3 axis, which is an optic axis in the case where a birefringent layer is assumed to be uniaxial of nx1(550)≈nx2(550)>nx3(550), is a principal axis corresponding to the first principal refractive index n1(550). Further, when the relationship of nx1(550)>>nx2(550)>nx3(550) is satisfied, the x1 axis, which is an optic axis in the case where a birefringent layer is assumed to be uniaxial of nx1(550)>nx2(550)≈nx3(550), is a principal axis corresponding to the first principal refractive index n1(550).

The complex birefringent medium of the present invention may or may not include other constituents as long as it has the plurality of birefringent layers as a constituent, and it is not particularly limited. In addition, a layer referred to as "a birefringent layer" in the present invention means a layer of a medium, which satisfies a relationship of |R (550)|≧20 nm and does not change an orientation of the principal axis corresponding to the first principal refractive index n1(550), of media having optical anisotropy. The effect of the present invention can be adequately achieved by the fact that the normal lines and the principal axes corresponding to the first principal refractive index n1(550) of all birefringent layers satisfying a relationship of |R (550)|≧20 nm are in the same plane. In addition, in order to achieve the effect of the present invention more effectively, it is preferable that the normal lines and the principal axes corresponding to the first principal refractive index n1(550) of all layers (including birefringent layers), which satisfy a relationship of |R (550)|≧10 nm and do not change the principal axes corresponding to the first principal refractive index n1(550), of media having optical anisotropy are in the same plane.

Materials and other optical characteristics of the birefringent layer are not particularly limited, and any material, for example, a thin plate made of an inorganic material, a stretched polymer film, a liquid crystal obtained by fixing the alignment of a liquid crystalline molecule, and the like can be used. Specific examples of materials composing the birefringent layer include a film made of a polycarbonate resin, a film made of a polysulfone resin, a film made of a polyethersulfone resin, a film made of a polyethylene terephthalate resin, a film made of a polyethylene resin, a film made of a polyvinyl alcohol resin, a film made of a norbornene resin, a film made of triacetyl cellulose resin, a film made of diacetyl cellulose resin, a film made of polystyrene resin, a film made of polyvinyl naphthalene resin, a film made of polyvinyl biphenyl resin, a film made of polyvinyl pyridine resin, a film made of a polymethyl methacrylate resin, a film made of a polymethyl acrylate resin, a liquid crystal compound containing nematic liquid crystalline molecule, a liquid crystal compound containing discotic liquid crystalline molecule, a non-liquid-crystal compound containing a polyamide, a non-liquid-crystal compound containing a polyimide, and the like.

A method for forming the birefringent layer is not particularly limited, and in the case of a film, for example, a solvent casting method, a melt extrusion method or the like can be employed. Further, a method for forming a plurality of birefringent layers simultaneously such as a co-extrusion method can also be employed. Further, a non-stretched film may be used as long as a desired phase difference is exhibited, or an appropriately stretched film may be used. A method of stretching a film is not particularly limited, and a drawing between rolls, compression stretching between rolls, tenter uniaxial stretching in transverse direction, biaxial stretching in lengthwise direction and breadthwise direction, as well as special stretching which performs under an action of a contraction force of a heat shrinkable film or the like. Further, the case of a liquid crystal compound is not particularly limited, and for example, a method in which a liquid crystal compound is applied onto a base film subjected to an appropriate alignment treatment and alignment is fixed or the like can be used. Naturally, a method of using a base film not subjected to an alignment treatment as long as a desired phase difference has been exhibited, or a method in which a liquid crystal layer is peeled off from the base film after fixing alignment and transferred to another film or the like may be used. In the case of a liquid crystal compound, a method of not fixing alignment or the like may be used. In the case of an amorphous compound, the same method as in the liquid crystal compound can be employed.

Preferable forms in the complex birefringent medium of the present invention will be described in detail below.

In the plurality of birefringent layers, it is preferable that an angle θ which the principal axis corresponding to the first principal refractive index n1(550) of one birefringent layer forms with that of the other birefringent layer is 25 degrees or less. When this angle θ is larger than 25 degrees, an amount of an angle θ to be deviated from a design value in a normal line direction in viewing obliquely increases and there is a possibility that an adequate effect of widening a viewing angle cannot be achieved. That is, by decreasing an angle θ to 25 degrees or less, an effect of widening a viewing angle can be attained with reliability. In the present invention, in the plurality of birefringent layers, the principal axes corresponding to the first principal refractive index n1(550) are in the same plane, and the angle θ is measured in this plane. Further, the complex birefringent medium of the present invention has three or more birefringent layers, the angle θ is an angle which one principal axis corresponding to the first principal refractive index n1(550) of the birefringent layer of a combination in which the angle becomes the maximum forms with another principal axis. From the viewpoint of the effect of the present invention, the angle θ is more preferably 22.5 degrees or less, and furthermore preferably 15 degrees or less.

In the plurality of birefringent layers, it is particularly preferable that the principal axes corresponding to the first principal refractive index n1(550) are parallel to one another. In the present description, "parallel" includes not only a state of being parallel but also a state which can be assumed to be parallel in view of the effect of the present invention. In accordance with this description, since the principal axis corresponding to the first principal refractive index n1(550) of each birefringent layer in the complex birefringent medium of the present invention overlaps even though viewing from any direction, the plurality of birefringent layers has the same viewing angle characteristics as a single layer type birefringent layer (constitution composed of one layer) and an effect of widening a viewing angle can be achieved most reliably.

Examples of preferable form in the complex birefringent medium of the present invention include a form in which the complex birefringent medium of the present invention has a birefringent layer of a first kind in which a phase difference R (550) at a wavelength of 550 nm defined by the above-mentioned equation (1) is positive value and a birefringent layer of a second kind in which a phase difference R (550) at a wavelength of 550 nm defined by the above-mentioned equation (1) is negative value. In accordance with this form, since the control of the wavelength dispersion of the phase difference becomes easy compared with the constitution formed by laminating the birefringent layers in which the phase differences R (550) have the same sign, the inverse wavelength dispersibility can be readily realized and the degree of adjusting freedom of the inverse wavelength dispersibility can be enhanced. Hereinafter, in the present description, "the birefringent layer of the first kind" refers to a birefringent layer in which the phase difference R (550) at a wavelength of 550 nm, defined by the above-mentioned equation (1) is a positive value, and "the birefringent layer of the second kind" refers to a birefringent layer in which the phase difference R (550) is a negative value. When the complex birefringent medium of the present invention has a plurality of any of or both of the birefringent layer of the first kind and the birefringent layer of the second kind, the normal lines and the principal axes corresponding to the first principal refractive index n1(550) of at least one layer of the birefringent layers of the first kind and those of at least one layer of the birefringent layers of the second kind may are in the same plane. Further, when the complex birefringent medium has one birefringent layer of the first kind and one birefringent layer of the second kind, any birefringent layer may be disposed on an incident surface side or on an output light side.

In the present invention, when the birefringent layer of the first kind and the birefringent layer of the second kind are provided, the form in which the wavelength dispersibility of the phase difference of the birefringent layer of the first kind and that of the birefringent layer of the second kind are preferably different from each other. "The wavelength dispersibility of the phase differences are different from each other" in the present description means that at least one of wavelength dispersibility α and β of the phase differences expressed by the following equations (C) and (D) are different from each other.

$$\alpha = R(450)/R(550) \quad \text{(C)}$$

$$\beta = R(650)/R(550) \quad \text{(D)}$$

In accordance with the form, the control of the wavelength dispersion of the phase difference of the complex birefringent medium becomes easier, and the inverse wavelength dispersibility of the phase difference, which is an essential condition for wideband property, can be more readily realized.

From the viewpoint of the effect of the present invention, it is preferable that the birefringent layer of the first kind and the birefringent layer of the second kind are different in wavelength dispersibility α and β of the phase difference. Further, when the complex birefringent medium has a plurality of any of or both of the birefringent layer of the first kind and the birefringent layer of the second kind, in at least one layer of the birefringent layers of the first kind and at least one layer of the birefringent layers of the second kind, at least one of wavelength dispersibility α and β of the phase difference may be different, and both of wavelength dispersibility α and β of the phase difference are preferably different.

Further, when the birefringent layer of the first kind and the birefringent layer of the second kind are provided, in the birefringent layer of the first kind and the birefringent layer of the second kind, phase differences preferably exhibit normal wavelength dispersibility, respectively. In accordance with this constitution, by use of the birefringent layers exhibiting the normal wavelength dispersibility, having large room for selecting materials, a complex birefringent medium whose phase difference exhibits the inverse wavelength dispersibility can be prepared. In the present description, "phase difference exhibits the normal wavelength dispersibility" refers to cases (a) the wavelength dispersibility α expressed by the above-mentioned equation (C) is larger than 1 and satisfies a relationship of $|R(450)|>|R(550)|$, or (b) the wavelength dispersibility β expressed by the above-mentioned equation (D) is less than 1 and satisfies a relationship of $|R(650)|<|R(550)|$, and preferably (c) satisfies a relationship of $|R(450)|>|R(550)|>|R(650)|$, and more preferably (d) an absolute value of the phase differences R(λ) becomes larger as the wavelength is shorter and becomes smaller as the wavelength is longer in a visible wavelength range (400 nm≦λ≦700 nm).

In addition, materials exemplified as a material composing the birefringent layer can be applied to any of the birefringent layer of the first kind and the birefringent layer of the second kind depending on a method of forming the birefringent layer. For example, if a film made of a polycarbonate resin is uniaxially-stretched, generally, the film becomes a birefringent layer in which the principal axis corresponding to the first principal refractive index n1(550) is along an in-plane direction of the film and R(550)>0 is satisfied. Further, if a film made of a polycarbonate resin is biaxially-stretched in a longitudinal direction and in a width direction, a birefringent layer in which the principal axis corresponding to the first principal refractive index n1(550) is along a normal line direction of the film and R(550)<0 is satisfied can be formed. Furthermore, by subjecting a film made of a polycarbonate resin to special-stretching in which the film is stretched substantially in a thickness direction, a birefringent layer in which the principal axis corresponding to the first principal refractive index n1(550) is along a normal line direction of the film and a phase difference of R(550)>0 is satisfied can be formed.

Examples of preferable forms of the complex birefringent medium of the present invention include (1) the form in which the birefringent layer of the first kind has a larger absolute value of the phase difference R (550) than that of the birefringent layer of the second kind, and (2) the form in which the birefringent layer of the first kind has a smaller absolute value of the phase difference R (550) than that of the birefringent layer of the second kind.

In accordance with the form (1), it is suitable that the complex birefringent medium of the present invention functions as the birefringent layer of the first kind. Further, in accordance with the form (2), it is suitable that the complex birefringent medium of the present invention functions as the birefringent layer of the second kind.

From the viewpoint of making the phase difference of the complex birefringent medium of the present invention inverse wavelength dispersibility, in the case of the form (1), the form in which the birefringent layer of the first kind has the smaller wavelength dispersibility of the phase difference than that of the birefringent layer of the second kind is suitable, and in the case of the form (2), the form in which the birefringent layer of the first kind has the larger wavelength dispersibility of the phase difference than that of the birefringent layer of the second kind is suitable. These forms, in other words, satisfy at least one relationship of the following equations (E1) and (F1), or satisfy at least one relationship of the following equations (E2) and (F2). In addition, the magnitude of the wavelength dispersibility of the phase difference is judged with reference to an absolute value of a difference between the wavelength dispersibility α and/or β and 1 of the phase differences.

$$[R1(550)+R2(550)]/(\alpha 1-\alpha 2)<0 \quad (E1)$$

$$[R1(550)+R2(550)]/(\alpha 1-\alpha 2)>0 \quad (F1)$$

$$[R1(550)+R2(550)]/(|1-\alpha 1|-|1-\alpha 2|)<0 \quad (E2)$$

$$[R1(550)+R2(550)]/(|1-\beta 1|-|1-\beta 2|)<0 \quad (F2)$$

In the equations, R1(550) represents the phase differences R(550) of the birefringent layer of the first kind, and when a plurality of the birefringent layers of the first kind exists, R1(550) represents the total of the phase differences R(550) of the plurality of the birefringent layers of the first kind. R2(550) represents the phase difference R(550) of the birefringent layer of the second kind, and when a plurality of the birefringent layers of the second kind exists, R2(550) represents the total of the phase differences R(550) of the plurality of the birefringent layers of the second kind. α1 represents the wavelength dispersibility α of the phase difference of the birefringent layer of the first kind, and when there are a plurality of the birefringent layers of the first kind, α1 represents an average value. α2 represents the wavelength dispersibility α of the phase difference of the birefringent layer of the second kind, and when there are a plurality of the birefringent layers of the second kind, α2 represents an average value. β1 represents the wavelength dispersibility β of the phase difference of the birefringent layer of the first kind, and when there are a plurality of the birefringent layers of the first kind, β1 represents an average value. β2 represents the wavelength dispersibility β of the phase difference of the birefringent layer of the second kind, and when there are a plurality of the birefringent layers of the second kind, β2 represents an average value.

In addition, in the form (1), when the birefringent layer of the first kind has the smaller wavelength dispersibility of the phase difference than that of the birefringent layer of the second kind, the birefringent layer of the first kind is preferably a film made of a norbornene resin. Further, in the form (2), when the birefringent layer of the first kind has the larger wavelength dispersibility of the phase difference than that of the birefringent layer of the second kind, the birefringent layer of the second kind is preferably a film made of a norbornene resin. The film made of a norbornene resin of films exhibiting normal wavelength dispersibility is a film whose wavelength dispersibility α and β expressed by the equations (C) and (D) become 1.0, respectively, that is, a film whose phase differences R(λ) is constant regardless of a wavelength λ (nm). Accordingly, it becomes possible to realize the inverse wavelength dispersibility of the phase difference of the complex birefringent medium more readily by employing the film made of a norbornene resin as a birefringent layer having small wavelength dispersibility of the phase difference.

Examples of preferable forms of the complex birefringent medium of the present invention include a form in which in at least one of the plurality of birefringent layers, the principal axis corresponding to the first principal refractive index n1(550) is along direction which is neither an in-plane direction of the birefringent layer nor a normal line direction of the birefringent layer. Thereby, even a birefringent layer, whose principal axis corresponding to the first principal refractive index n1(550) is along other direction which is neither an in-plane direction of the birefringent layer nor a normal line direction of the birefringent layer, can be employed as a birefringent layer to compose the complex birefringent medium of the present invention.

For example, a birefringent layer, which can be obtained by applying a liquid crystalline molecule onto a base film subjected to an appropriate alignment treatment and fixing alignment, is not uniformly aligned in a thickness direction of the birefringent layer and sometimes it takes a alignment mode referred to as the so-called hybrid alignment in which the orientation direction is changed successively in a thickness direction of the birefringent layer. This results from the facts that an alignment regulation force which the base film has inherently or which is imparted to the base film has a limit of distance and that liquid crystalline molecule has a property of changing an orientation direction at an interface with air. In this case, since the substantial principal axis corresponding to a first principal refractive index n1(550) is along other directions which is neither an in-plane direction of the birefringent layer nor a normal line direction of the birefringent layer, it is substantially impossible to laminate this birefringent layer and another birefringent layer whose principal axis corresponding to the first principal refractive index n1(550) is along the in-plane direction or the normal line direction of the birefringent layer in such a way that the principal axes corresponding to the first principal refractive index n1(550) are parallel to each other. However, it is possible to laminate the birefringent layers in such a relative relationship that the principal axes corresponding to the first principal refractive indexes n1(550) are in the same plane. In addition, a method of handling such birefringent layer is not described and suggested in the conventional technology (for example, refer to Patent Documents 1 to 11 and 15) in which two or more birefringent layers are laminated.

Examples of preferable forms of the complex birefringent medium of the present invention include a form in which at least one of the plurality of birefringent layers includes a liquid crystalline molecule. In accordance with this form, the phase difference of the birefringent layer and the freedom of control of the principal axis corresponding to the first principal refractive index n1(550) can be improved by use of various alignment regulation means, naturally, such as a vapor deposition method of inorganic substances, rubbing of organic high polymer alignment films, electric field alignment, and magnetic field alignment, and in combination with additives such as a chiral agent which causes alignment of the liquid crystalline molecules to twist, and an alignment aid which controls an alignment state at an interface with air. Further, when the birefringent layer is formed by use of liquid crystalline molecules, an absolute value of the phase difference R(550) of several hundreds nm can be achieved by a thickness of mere several μm. Since this absolute value of the phase difference R(550) is one or more orders of magnitude larger than in a birefringent layer formed by stretching a typical polymer film, a wideband property can be more readily improved. In accordance with this constitution, it is possible to form the birefringent layer in which the principal axis corresponding to the first principal refractive index n1(550) is along the normal line direction of the birefringent layer or the birefringent layer in which the principal axis corresponding to the first principal refractive index n1(550) is along the in-plane direction of the birefringent layer with ease compared with a case of stretching a polymer film to form a birefringent layer.

"A liquid crystalline molecule" in the present description refers to molecules which have fluidity like liquid and ordinality of being regularly-aligned in a certain temperature range/concentration range, of rod-like molecules or flat plate-like molecules. Based on spatial shape, the liquid crystal is classified into a nematic liquid crystal, a cholesteric liquid crystal, and a smetic liquid crystal. A liquid crystalline molecule may be a fixed alignment type, or may be a nonfixed alignment type.

Orientation directions of the liquid crystalline molecules preferably change successively in a thickness direction of the birefringent layer. Thereby, it is possible to form a birefringent layer in which the principal axis corresponding to the first principal refractive index n1(550) is along direction which is neither an in-plane direction of the birefringent layer nor a normal line direction of the birefringent layer. Examples of such the birefringent layer include films formed by fixing the hybrid alignment of the liquid crystalline molecule such as a film with wide viewing angle (trade name: NH Film, fabricated by NIPPON OIL CORP.) possessing a hybrid-nematic structure of liquid crystalline polymers in which the tilt angles of the liquid crystalline polymers vary gradually relative to the normal orientation of the film, and a viewing angle compensation film (trade name: WV Film, fabricated by Fuji Photo Film Co., Ltd.) formed by aligning discotic liquid crystals to specific orientation and fixing the alignment on a triacetyl cellulose (TAC) film.

In this case, there may be cases where a principal dielectric axis and the principal refractive index cannot be exactly defined as the whole of the birefringent layer. However, when considering the principal dielectric axis and the principal refractive index defined on the assumption that the liquid crystalline molecules composing the birefringent layer are aligned uniformly at a certain angle (generally, referred to as "average angle of inclination") with respect to a reference plane, and if the principal dielectric axis and the principal refractive index satisfy the above-mentioned predetermined relationships, the liquid crystalline molecule can be used as a material of the birefringent layer to compose the complex birefringent medium of the present invention without loss of generality. In addition, the orientation direction of the liquid crystalline molecule may change successively while twisting in a thickness direction, or the alignment orientation of the liquid crystalline molecule may change successively without twisting in a thickness direction.

The liquid crystalline molecule is preferably a discotic liquid crystalline molecule. The birefringent layer composed of the discotic liquid crystalline molecule generally has a negative phase differences R (550) and has large wavelength dispersibility of the phase difference. Therefore, a birefringent layer composed of the discotic liquid crystalline molecule is generally used as the birefringent layer of the second kind and combined with the birefringent layer of the first kind in which the phase differences R (550) has a positive value, and thereby the inverse wavelength dispersibility of the phase difference of the complex birefringent medium can be readily realized.

The liquid crystalline molecule is preferably a nematic liquid crystalline molecule. In the birefringent layer composed of the nematic liquid crystalline molecule, the principal axis corresponding to the first principal refractive index is along a direction other than an in-plane direction (it is also referred to as an out-plane direction and includes a normal line direction), and it is suitable for forming the birefringent layer of the first kind in which the phase differences R (550) has a positive value.

At least one of the plurality of birefringent layers preferably has a biaxial parameter η of more than 0, defined by the following equation (2):

$$\eta = |n2(550) - n3(550)| / |n1(550) - n2(550)| \qquad (2),$$

wherein n3(550) represents a principal refractive index having the minimum absolute value of a difference from an average value of three principal refractive indexes at a wavelength 550 (nm).

It is known that most of the birefringent layers exhibit not an optically uniaxial birefringent property but an optically biaxial birefringent property. Therefore, in accordance with this constitution, a birefringent layer exhibiting a birefringent property such as a biaxial property can also be suitably used as a birefringent layer composing the complex birefringent medium of the present invention. In addition, when the complex birefringent medium has a plurality of any of or both of the birefringent layer of the first kind and the birefringent layer of the second kind, the biaxial parameters η of all the birefringent layers are preferably more than 0 from the viewpoint of ease of production of the complex birefringent medium. Further, at least one of the plurality of birefringent layers more preferably has the biaxial parameters η of more than 0.07, when the complex birefringent medium has a plurality of any of or both of the birefringent layer of the first kind and the birefringent layer of the second kind, the biaxial parameters η of all the birefringent layers are more preferably more than 0.07.

At least one of the plurality of birefringent layers preferably has a biaxial parameter η of ½ or less, defined by the equation (2). This allows the complex birefringent medium to have a wider viewing angle, and the deterioration of the viewing angle can be suppressed effectively even when an optically biaxial birefringent layer is laminated. In addition, when the complex birefringent medium has any of or both of the birefringent layer of the first kind and the birefringent layer of the second kind plurally, the biaxial parameters η of all birefringent layers are preferably ½ or less from the viewpoint of inhibiting the deterioration of the viewing angle more effectively. Further, from the viewpoint of inhibiting the deterioration of the viewing angle more effectively, the birefringent layer more preferably has a biaxial parameter η of ¼ or less. In addition, since an optically uniaxial birefringent layer satisfies the relationship of n2(550)=n3(550), it has a biaxial parameter η of 0.

The birefringent layer of the first kind preferably has a smaller biaxial parameter η, defined by the equation (2), than that of the birefringent layer of the second kind. Thereby, it is possible to inhibit amounts of vibration directions of intrinsic polarization mode in the birefringent layer of the first kind and the birefringent layer of the second kind to be deviated in viewing obliquely, and therefore the deterioration of the viewing angle can be suppressed effectively even when an optically biaxial birefringent layer is laminated. In addition, when the complex birefringent medium has a plurality of the birefringent layers of the first kind, the biaxial parameter η of the birefringent layer of the first kind refers to an average-value of the biaxial parameters η of the birefringent layers of the first kind. The same holds for the birefringent layer of the second kind. Furthermore, the birefringent layer of the first kind preferably has a biaxial parameter η of ½ of that of the birefringent layer of the second kind. Thereby, since it is possible to inhibit amounts of vibration directions of intrinsic polarization mode in the birefringent layer of the first kind and the birefringent layer of the second kind to be deviated in viewing obliquely, a viewing angle of the complex birefringent medium can be more widened. The expression of "the biaxial parameter η is ½" in the present description includes not only a state in which the biaxial parameter η is ½ but also a state in which the biaxial parameter η can be assumed to be ½ in view of the effect of the present invention.

The present invention also pertains to a polarizing plate having the complex birefringent medium and a polarizer. In accordance with the complex birefringent medium of the present invention, since a wideband complex birefringent medium having a wide viewing angle can be provided, a wideband polarizing plate having a wide viewing angle can be provided. "A polarizer" in the present description refers to a linear polarizer. The polarizing plate may be a linearly polarizing plate, a circularly polarizing plate or an elliptically polarizing plate.

In the birefringent layer of the complex birefringent medium, the principal axis corresponding to the first principal refractive index n1(550) is preferably perpendicular to a transmission axis and/or an absorption axis of the polarizer in viewing from a front direction. In accordance with this constitution, the birefringent layer substantially functions against only incident light from an oblique direction, and does not function against incident light from a normal line direction at all. That is, since such the polarizing plate can exert a function of converting a polarized state only in an oblique direction, it can achieve an adequate effect of becoming wideband in an oblique direction. In addition, "being perpendicular" in the present description includes not only a state of being perpendicular but also a state which can be assumed to be perpendicular in view of the effect of the present invention. Further, when the complex birefringent medium has any of or both of the birefringent layer of the first kind and the birefringent layer of the second kind plurally, with respect to all the birefringent layers, the principal axis corresponding to the first principal refractive index n1(550) is preferably perpendicular to the transmission axis and/or the absorption axis of the polarizer.

The present invention also pertains to a liquid crystal display device (hereinafter, also referred to a "first liquid crystal display device") further having the polarizing plate and a liquid crystal panel. The first liquid crystal display device of the present invention corresponds a constitution in which at least one layer of the plurality of the birefringent layers composing the complex birefringent medium of the present invention is a liquid crystal panel being a light modulation device. In accordance with this constitution, a coloring-less liquid crystal display device of high display quality, having a wide viewing angle can be realized since the liquid crystal display device has a wideband polarizing plate having a wide viewing angle. A display mode of the first liquid crystal display device is not particularly limited, and examples of the mode include such as a vertical alignment (VA) mode, a twisted nematic (TN) mode, an in-plane switching (IPS) mode, a fringe field switching (FFS) mode, and an electrically controlled birefringence (ECB) mode of horizontal alignment. In addition, when the liquid crystal display device has a constitution of laminating a polarizing plate, a liquid crystal panel and a polarizing plate in this order, two polarizing plates preferably satisfy the relationship of crossed Nichols from the viewpoint of achieving high contrast.

The present invention also pertains to a liquid crystal display device (hereinafter, also referred to a "second liquid crystal display device") having a structure in which a liquid crystal panel sandwiching a liquid crystal layer between two opposed substrates and having at least a pair of electrodes for applying a voltage to the liquid crystal layer, and a birefringent layer other than a liquid crystal panel are laminated, wherein in the liquid crystal display device, a phase difference exhibits inverse wavelength dispersibility as the whole of the liquid crystal display device in a state of displaying black, and wherein when a principal refractive index having the maximum absolute value of a difference from an average value of three principal refractive indexes at a wavelength λ (nm) is designated as a first principal refractive index n1(λ), a normal line of the liquid crystal layer and the birefringent layer, and principal axes corresponding to a first principal refractive index n1(550) of the liquid crystal layer and the birefringent layer are in the same plane.

The second liquid crystal display device of the present invention corresponds a constitution, in which a liquid crystal panel (particularly liquid crystal layer) being a light modulation device itself serves as one layer of the birefringent layers composing the complex birefringent medium of the present invention. Accordingly, according to the second liquid crystal display device of the present invention, since the normal line of the liquid crystal layer, the normal line of the birefringent layer, the principal axis corresponding to the first principal refractive index n1(550) at a wavelength of 550 nm of the liquid crystal layer and the principal axis corresponding to the first principal refractive index n1(550) at a wavelength of 550 nm of the birefringent layer are in the same plane, a similar effect as in the complex birefringent medium of the present invention can be achieved. Further, since the number of the birefringent layers can be reduced, a low-profile and low-cost liquid crystal display device can be realized. Furthermore, since the liquid crystal layer of the liquid crystal panel is a birefringent layer including liquid crystalline molecules and an alignment state can be changed by applying a voltage to the liquid crystal layer, the phase difference of the birefringent layer and the flexibility of control of the principal axis corresponding to the first principal refractive index n1(550) are improved, and therefore a liquid crystal display device of higher quality can be realized. A display mode of the second liquid crystal display device is not particularly limited, and examples of the mode include such as a vertical alignment (VA) mode, a twisted nematic (TN) mode, an in-plane switching (IPS) mode, a fringe field switching (FFS) mode, and an electrically controlled birefringence (ECB) mode of horizontal alignment, but among them, a twisted nematic (TN) mode, an in-plane switching (IPS) mode, a fringe field switching (FFS) mode, and an electrically controlled birefringence (ECB) mode are preferable.

The second liquid crystal display device of the present invention may or may not include other constituents as long as it has the liquid crystal panel and the birefringent layer as a constituent, and it is not particularly limited.

Examples of preferable forms in the second liquid crystal display device of the present invention include (a) a form in which in the liquid crystal layer and the birefringent layer, an angle θ which the principal axis corresponding to the first principal refractive index n1(550) of the liquid crystal layer forms with the principal axis corresponding to the first principal refractive index n1(550) of the birefringent layer is 25 degrees or less in a state of displaying black, (b) a form in which one of phase differences R (550) at a wavelength of 550 nm defined by the equation (1) of the liquid crystal layer and the birefringent layer is positive value and the other is negative value, (c) a form in which in the liquid crystal layer and the birefringent layer, phase differences exhibit normal wavelength dispersibility, respectively, in a state of displaying black, (d) a form in which the liquid crystal layer has a larger absolute value of the phase difference R (550) than that of the birefringent layer in a state of displaying black, (e) a form in which the liquid crystal layer has a smaller absolute value of the phase difference R (550) than that of the birefringent layer in a state of displaying black, (f) a form in which in the birefringent layer, the principal axis corresponding to the first principal refractive index n1(550) is along direction which is neither an in-plane direction of the birefringent layer nor a normal line direction of the birefringent layer in a state of displaying black, (g) a form in which the birefringent layer includes a liquid crystalline molecule, (h) a form in which the birefringent layer has a biaxial parameter η of more than 0, defined by the following equation (2), (i) a form in which the birefringent layer has a biaxial parameter η of ½ or less, defined by the following equation (2), and (j) a form in which the liquid crystal layer has a smaller biaxial parameter η defined by the following equation (2) than that of the birefringent layer in a state of displaying black.

$$\eta = |n2(550) - n3(550)| / |n1(550) - n2(550)| \quad (2)$$

wherein n3(550) represents a principal refractive index having the minimum absolute value of a difference from an average value of three principal refractive indexes at a wavelength 550 (nm).

In addition, in the form (d), the liquid crystal layer more preferably has smaller wavelength dispersibility of the phase difference than that of the birefringent layer in a state of displaying black. In the form (e), the liquid crystal layer more preferably has a larger wavelength dispersibility of the phase difference than that of the birefringent layer in a state of displaying black, and in such a form, the birefringent layer is more preferably a film made of a norbornene resin. In the form (g), the form in which orientation directions of the liquid crystalline molecules change successively in a thickness direction of the birefringent layer in a state of displaying black, the form in which the liquid crystalline molecule is a discotic liquid crystalline molecule, or the form in which the liquid crystalline molecule is a nematic liquid crystalline molecule, are more preferable. In the form (j), the liquid crystal layer more preferably has a biaxial parameter η of ½ of that of the birefringent layer in a state of displaying black.

The liquid crystal layers in these forms correspond to the birefringent layer of the first kind in the complex birefringent medium of the present invention. That is, since the preferable forms in the second liquid crystal display device of the present invention correspond to the preferable forms in the complex birefringent medium of the present invention, a similar effect as the preferable forms in the complex birefringent medium of the present invention can be achieved.

Effects of the Invention

In accordance with of the complex birefringent medium of the present invention, it is possible to provide a phase difference film, which can exhibit the inverse wavelength dispersibility, that is, a wavelength characteristic capable of giving an optimum phase difference to a light of a wide visible wavelength range, and has a wide viewing angle, can be produced by a convenient method and is excellent in a degree of adjusting freedom of the inverse wavelength dispersibility and in mass productivity.

BEST MODE FOR CARRYING OUT THE INVENTION

<Birefringent Layer of the First Kind and Birefringent Layer of the Second Kind>

FIGS. 2-1 to 2-3 are schematic views showing optical indicatrix ellipsoids of the birefringent layer of the second kind.

In drawings, a double-headed arrow represents the principal axis (hereinafter, also referred to as a "P1 axis") corresponding to the first principal refractive index n1(550). Further, a coordinate system fixed to the birefringent layer or a laboratory is shown in a square and a coordinate system coincident with a principal dielectric axis is shown in a circle. In addition, an optical indicatrix is a spheroid of which lengths of three principal axes correspond to magnitudes of three principal refractive indexes in the coordinate system coincident with a principal dielectric axis. A line of intersection of the optical indicatrix and a plane which passes through a center of the optical indicatrix and is perpendicular to a direction of light propagation generally becomes an ellipsoid, and the directions of two principal axes of the ellipsoid coincide with the directions of electric displacement vectors of two eigenmodes. Furthermore, the length of the principal axis gives a refractive index in eigenmode.

Figure 1:
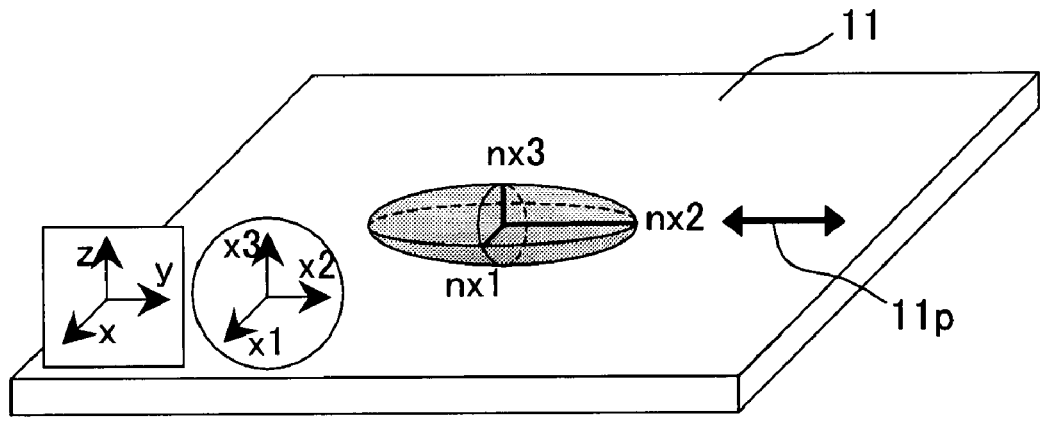
FIGS. 1-1 to 1-4 are schematic views showing optical indicatrix of the birefringent layer of the first kind.

For example, in a birefringent layer 11 of the first kind in FIG. 1-1, nx1 and nx3 are shown as being equal to each other, but the relationship between the nx1 and the nx3 is not limited to this. When the nx1 is equal to the nx3, the birefringent layer 11 becomes optically uniaxial and P1 axis 11$p$ is in exact coincident with an optic axis of the birefringent layer 11. It is a matter of course because the P1 axis defined in the present invention represents an optic axis of the birefringent layer in the case where the birefringent layer which is generally optically biaxial is regarded as a pseudo-uniaxial birefringent layer. In addition, the same is true in birefringent layers 12 to 14 of the first kind in FIGS. 1-2 to 1-4 and birefringent layers 21 to 23 of the second kind in FIGS. 2-1 to 2-3. That is, also in the birefringent layers 12 to 14 and 21 to 23, when the birefringent layers are optically uniaxial, P1 axes 12$p$ to 14$p$ and 21$p$ to 23$p$ are in exact coincident with an optic axis of the birefringent layer, and when the birefringent layers are optically biaxial, the P1 axes 12$p$ to 14$p$ and 21$p$ to 23$p$ represent optic axes of the birefringent layers in the case where the birefringent layer is regarded as a pseudo-uniaxial birefringent layer.

As shown in FIGS. 1-1 and 1-4, in the birefringent layer 11 and the birefringent layer 14, the P1 axes 11$p$ and 14$p$ are in an x-y plane (in-plane direction of the birefringent layer), and the azimuth of the P1 axis 1ip is different from that of the P1 axis 14$p$. The azimuth is defined by an angle (azimuth angle) which the P1 axis forms with the x-axis, and when the P1 axis is not in the x-y plane, the azimuth is defined, for example, by an angle (azimuth angle) which a projection of the P1 axis on the x-y plane forms with the x-axis. In the present invention, when two or more birefringent layers are laminated, the azimuths of the P1 axes of the respective birefringent layers are important, but as long as a typical example of each birefringent layer is shown, the birefringent layer 11 is identical to the birefringent layer 14. All of the birefringent layers 13, 21 and 23 are shown as a typical example in such a way that the azimuths of the P1 axes 13$p$, 21$p$ and 23$p$ is 90 degrees in terms of an azimuth angle. In addition, when the P1 axes 12$p$ and 22$p$ are along a direction of a z-axis (normal line of the birefringent layer) likewise the birefringent layers 12 and 22, the azimuth becomes infinite, but this case may be construed as having an appropriate azimuth conveniently.

FIGS. 1-1, 1-4, and 2-1 are examples in which the P1 axes are along an in-plane direction of the birefringent layer. In addition, when each birefringent layer is optically uniaxial, the birefringent layers 11 and 14 of the first kind of FIGS. 1-1 and 1-4 become the so-called positive A plate, and the birefringent layer 21 of the second kind of FIG. 2-1 becomes the so-called negative A plate.

Figures 1, 2:
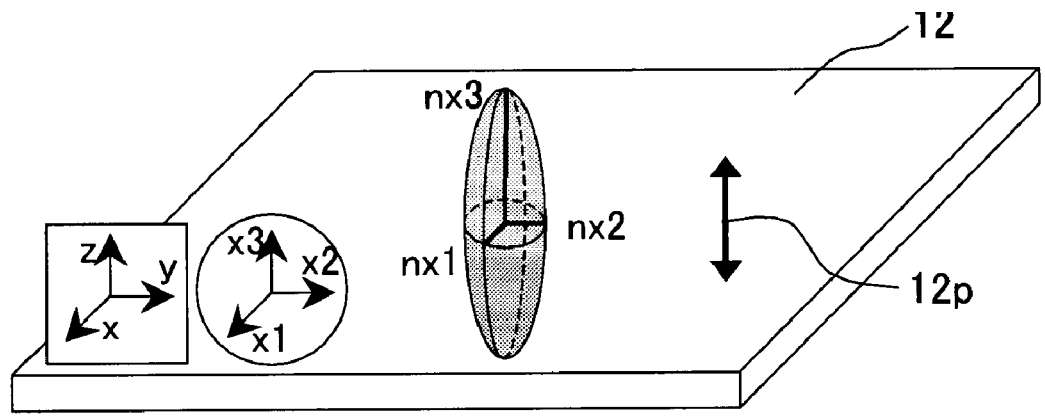

FIGS. 1-2 and 2-2 are examples in which the P1 axes are along a direction of the normal line of the birefringent layer. In addition, when each birefringent layer is optically uniaxial, the birefringent layer 12 of the first kind of FIG. 1-2 becomes the so-called positive C plate, and the birefringent layer 22 of the second kind of FIG. 2-2 becomes the so-called negative C plate.

Figures 1, 2, 3:
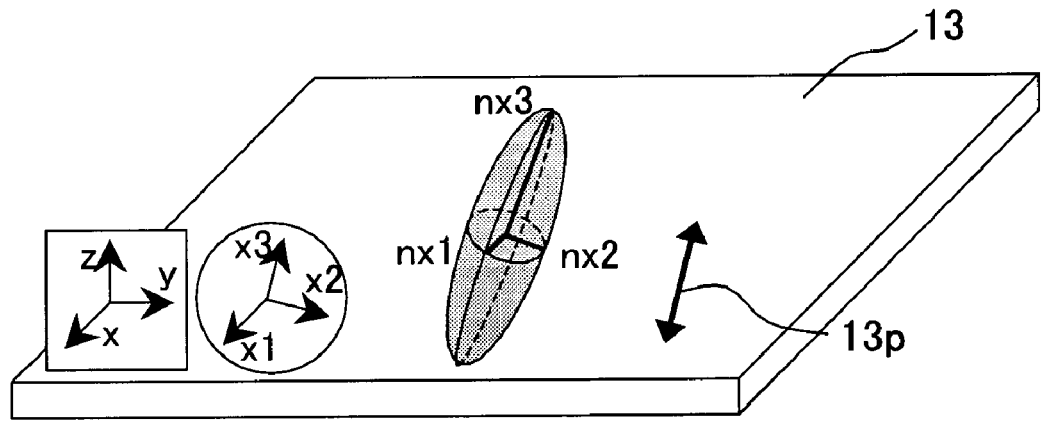

FIGS. 1-3 and 2-3 are examples in which the P1 axes are along direction which is neither an in-plane direction of the birefringent layer nor a normal line direction of the birefringent layer. A crystal plate cut obliquely corresponds this example. Further, films in which liquid crystals are aligned in a hybrid mode such as a film with wide viewing angle (trade name: WV Film, fabricated by Fuji Photo Film Co., Ltd.), a viewing angle compensation film (trade name: NH Film, fabricated by NIPPON OIL CORP.) and the like also correspond to this example viewing from a macroscopic viewpoint. In this case, the direction of the P1 axis is designated by designating an angle (polar angle) between the P1 axis and the normal line in addition to the azimuth angle.

<Complex Birefringent Medium>

FIGS. 3-1 to 3-9 are schematic views showing typical examples of the complex birefringent medium of the present invention, which have a structure in which the birefringent layer of the first kind and the birefringent layer of the second kind are laminated. In addition, in these drawings, a complex birefringent medium including one birefringent layer of the first kind and one birefringent layer of the second kind is selected and shown, but the number of laminated layers and an order of laminated layers are not particularly limited.

FIGS. 3-1 to 3-3 are examples of complex birefringent media formed by laminating birefringent layers in such a way that the P1 axes of the respective birefringent layers are all in the same plane as that including the normal line of the respective birefringent layer and are parallel with one another.

FIG. 3-1 shows a method of laminating the birefringent layers in the case of desiring to constitute a complex birefringent medium having a function of the A Plate or a function similar to this.

In a complex birefringent medium 41 of FIG. 3-1, a P1 axis 11$ap$ of a birefringent layer 11$a$ of the first kind, a P1 axis 21$ap$ of a birefringent layer 21$a$ of the second kind, and normal lines of the birefringent layers 11$a$ and 21$a$ are in the same plane 30$a$. Further, the P1 axis hap of the birefringent layer 11$a$ of the first kind is parallel with the P1 axis 21$ap$ of the birefringent layer 21$a$ of the second kind.

FIG. 3-2 shows a method of laminating the birefringent layers in the case of desiring to constitute a complex birefringent medium having a function of the C Plate or a function similar to this.

In a complex birefringent medium 42 of FIG. 3-2, a P1 axis 12$ap$ of a birefringent layer 12$a$ of the first kind, a P1 axis 22$ap$ of a birefringent layer 22$a$ of the second kind, and normal lines of the birefringent layers 12$a$ and 22$a$ are in the same plane 30b. Further, the P1 axis 12ap of the birefringent layer 12a of the first kind is parallel with the P1 axis 22ap of the birefringent layer 22a of the second kind.

FIG. 3-3 shows a method of laminating the birefringent layers in the case of desiring to constitute a complex birefringent medium which is not the A Plate or the C Plate.

In a complex birefringent medium 43 of FIG. 3-3, a P1 axis 13ap of a birefringent layer 13a of the first kind, a P1 axis 23ap of a birefringent layer 23a of the second kind, and normal lines of the birefringent layers 13a and 23a are in the same plane 30c. Further, the P1 axis 13ap of the birefringent layer 13a of the first kind is parallel with the P1 axis 23ap of the birefringent layer 23a of the second kind.

FIGS. 3-4 to 3-9 are examples of complex birefringent media formed by laminating birefringent layers in such a way that the P1 axes of the respective birefringent layers are not parallel to one another but are all in the same plane as that including the normal line of the birefringent layer, and show methods of laminating the birefringent layers in the case of desiring to constitute a complex birefringent medium which is not the A Plate nor the C Plate.

Figures 1, 2, 3, 4:
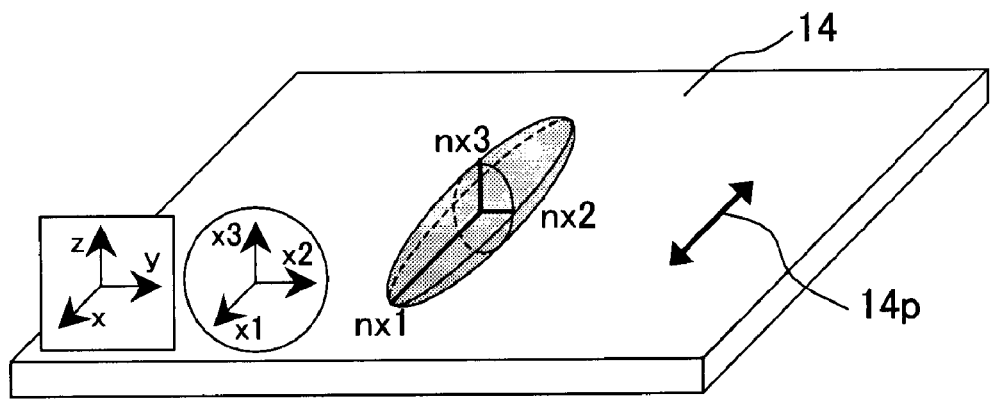
Figures 1, 2:
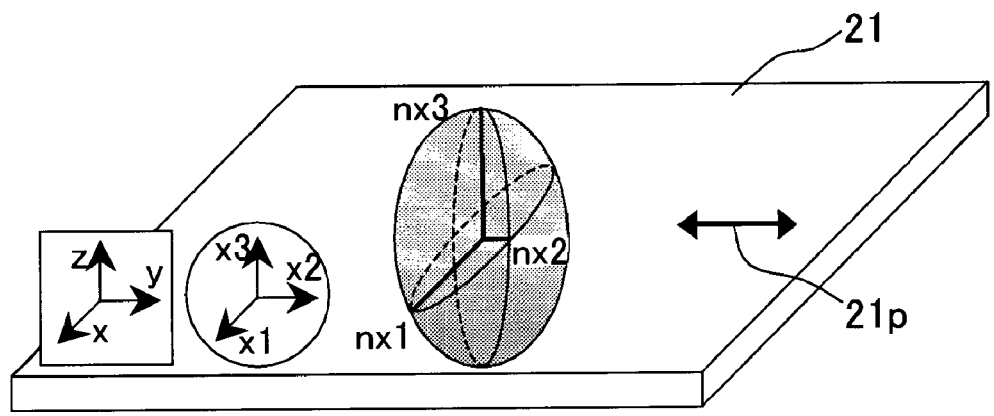
Figure 2:
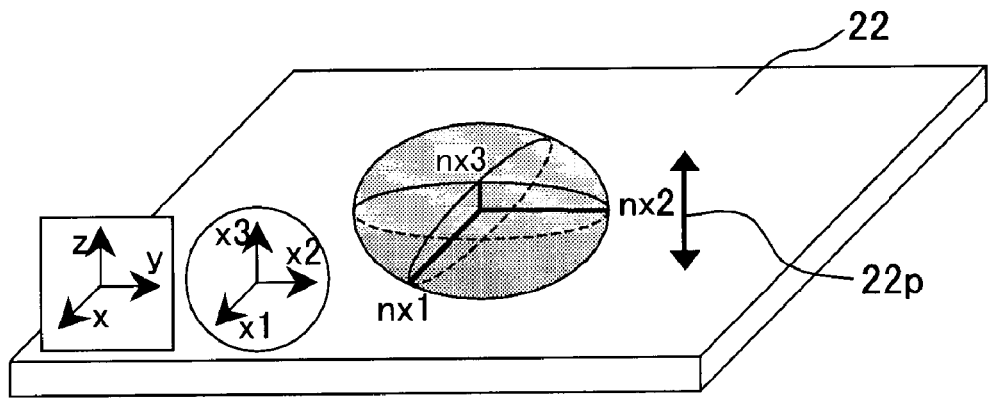
Figures 2, 3:
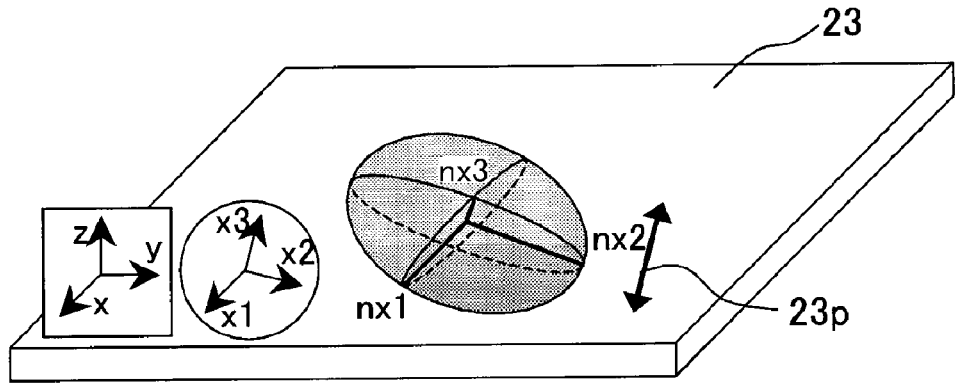

In a complex birefringent medium 44 of FIG. 3-4, a P1 axis 11bp of a birefringent layer 11b of the first kind, a P1 axis 22bp of a birefringent layer 22b of the second kind, and normal lines of the birefringent layers 11b and 22b are in the same plane 30d.

Figures 1, 3:
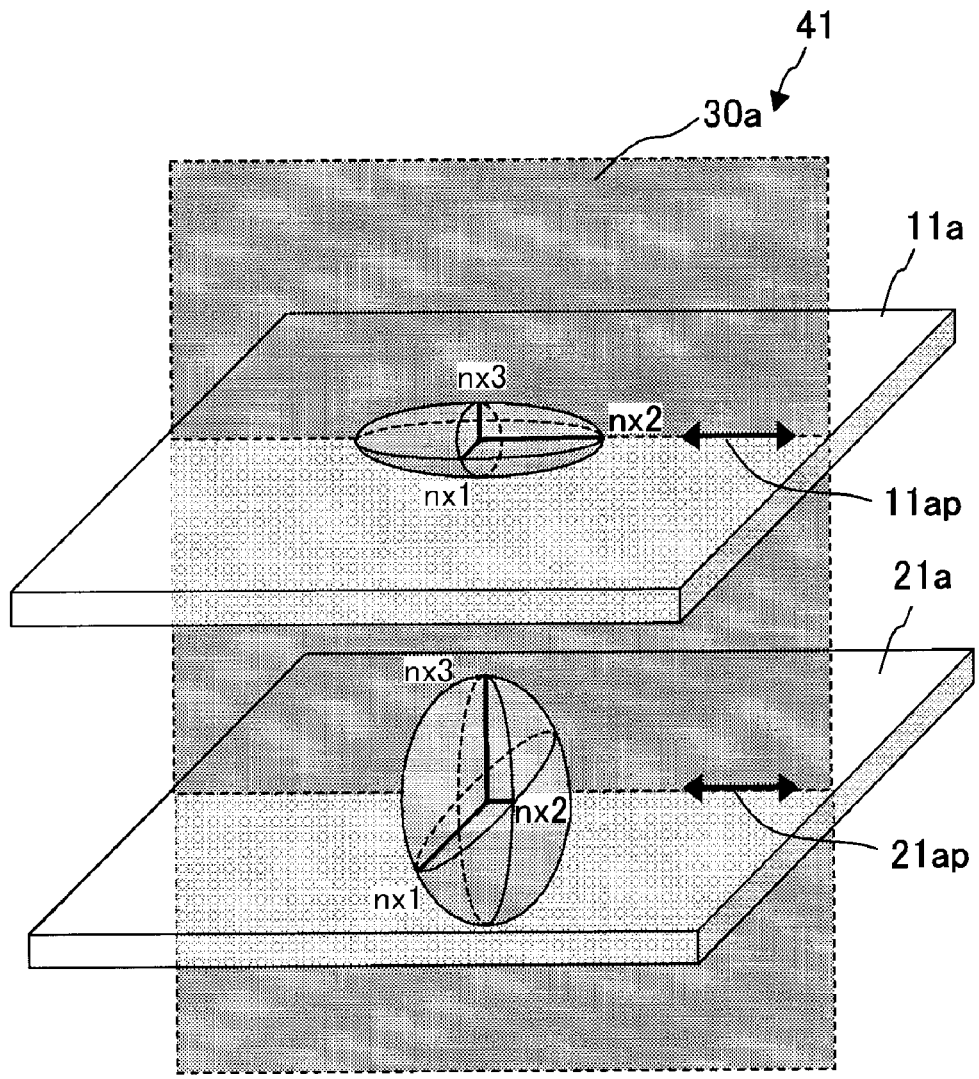
Figures 2, 3:
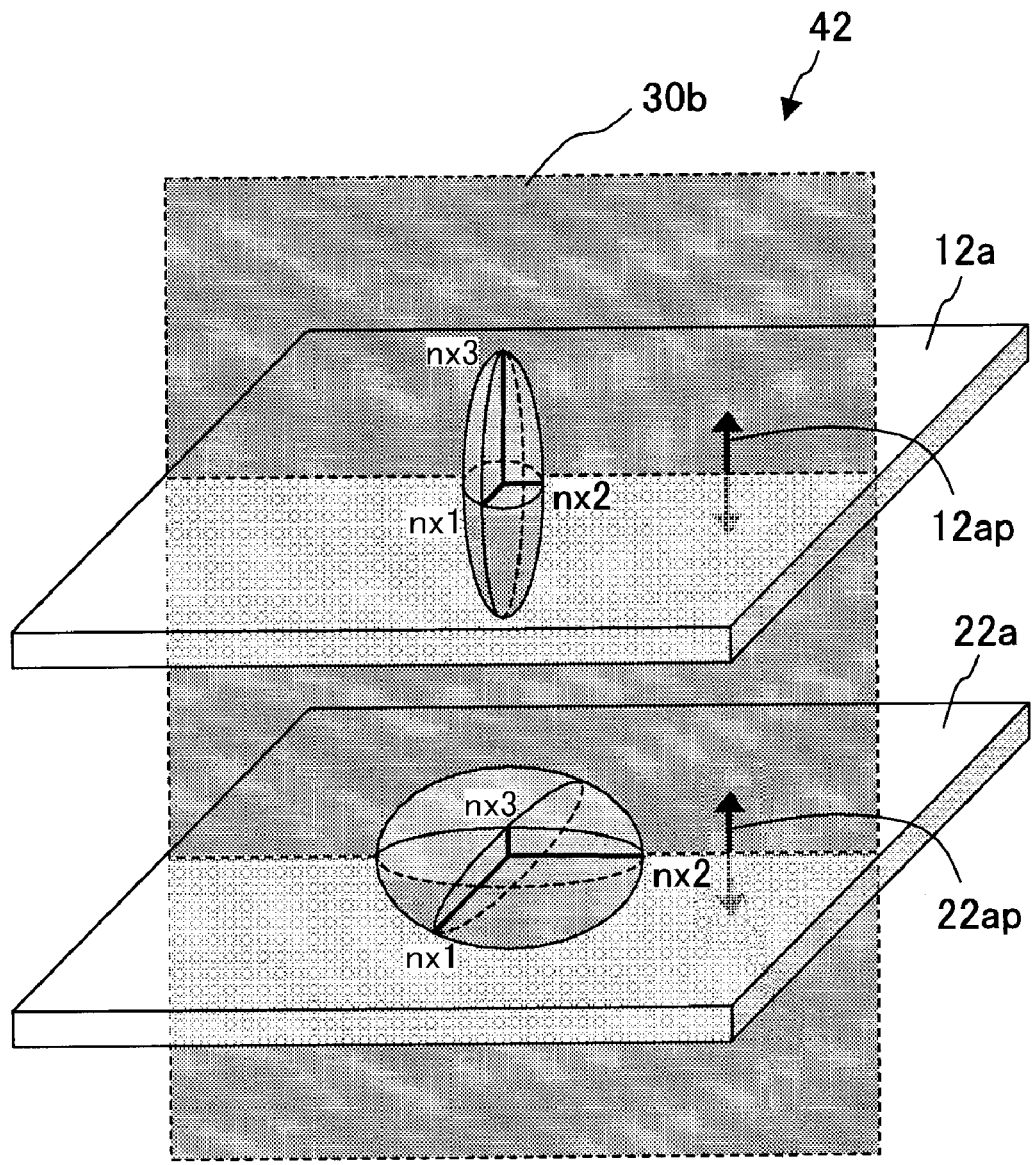
Figure 3:
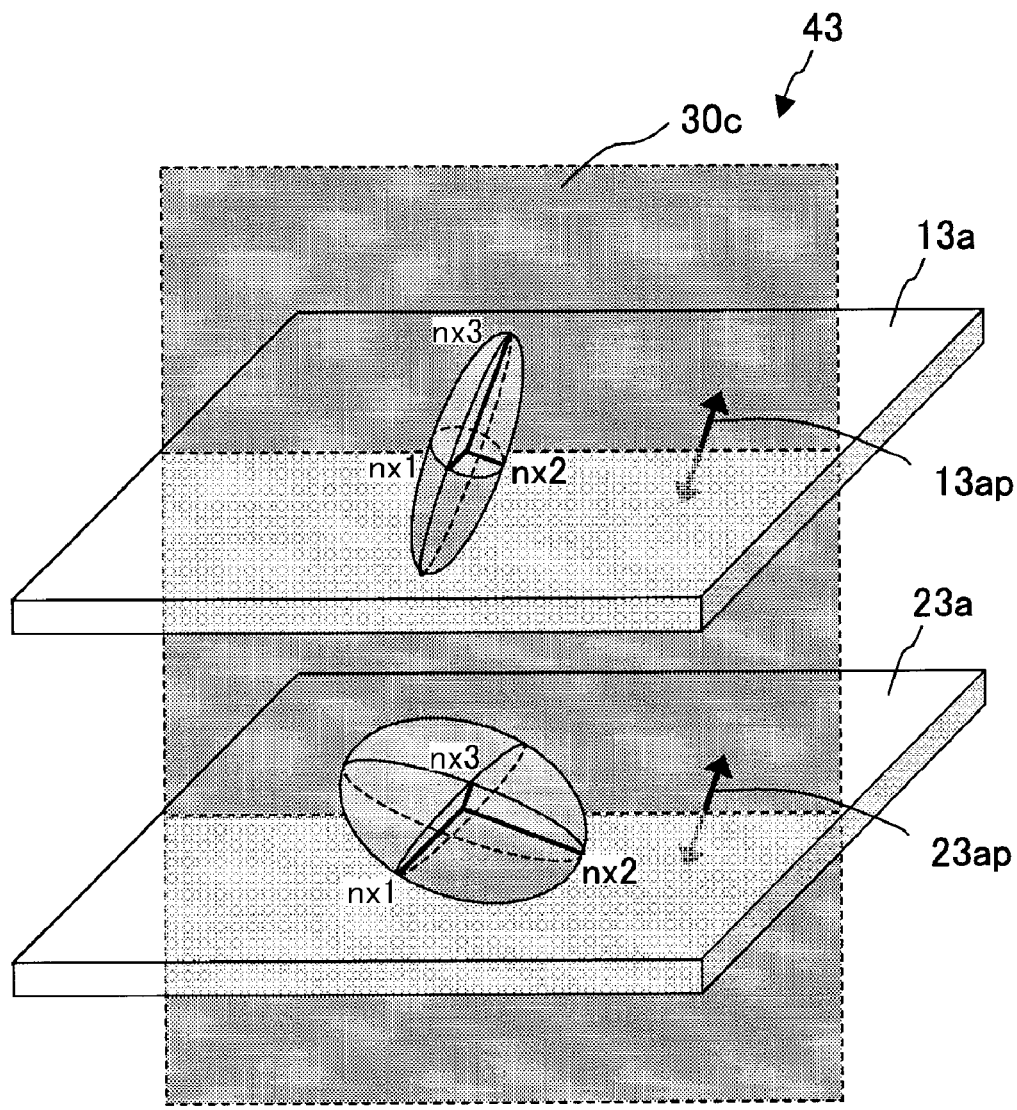
Figures 3, 4:
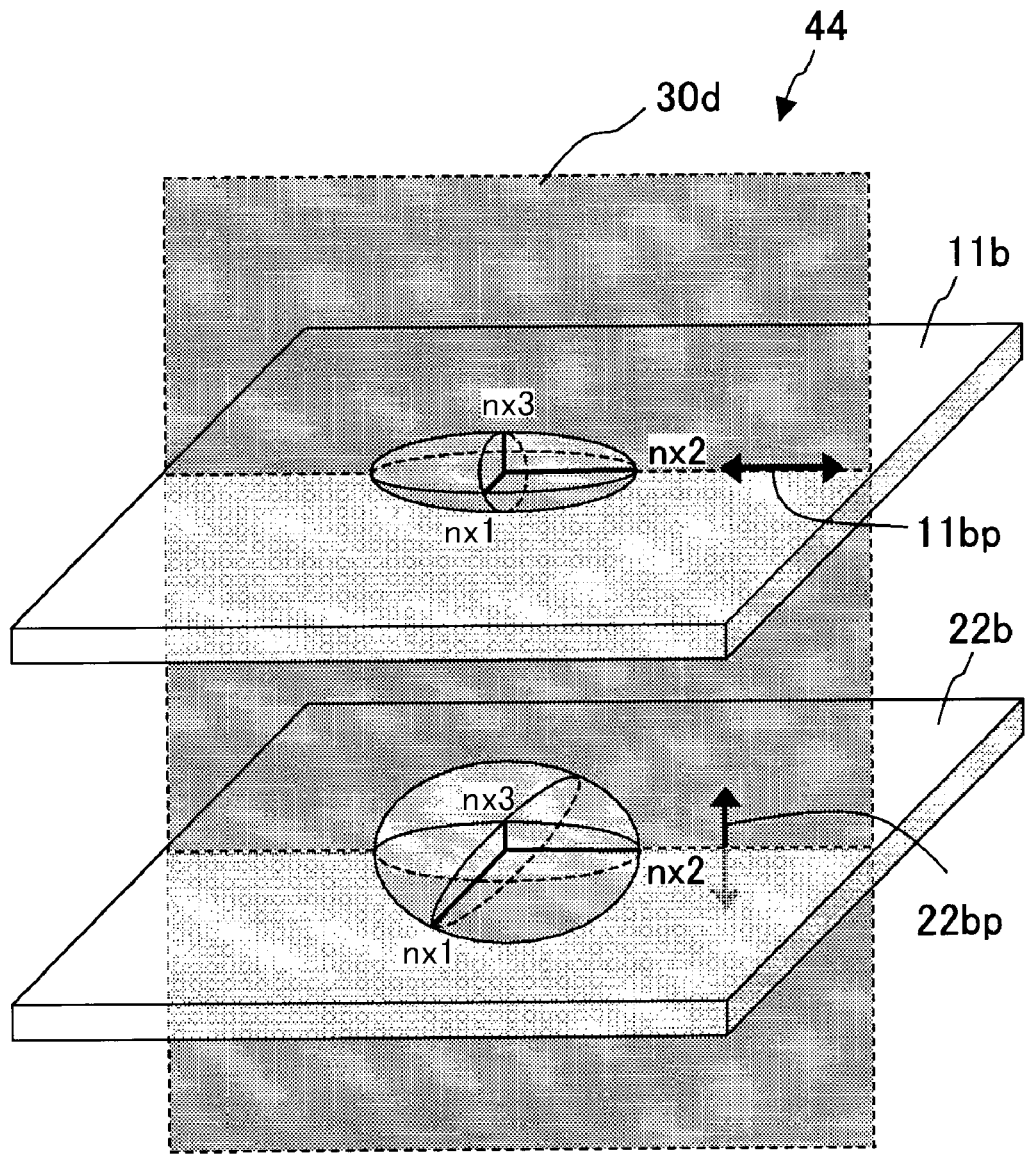
Figures 3, 4, 5:
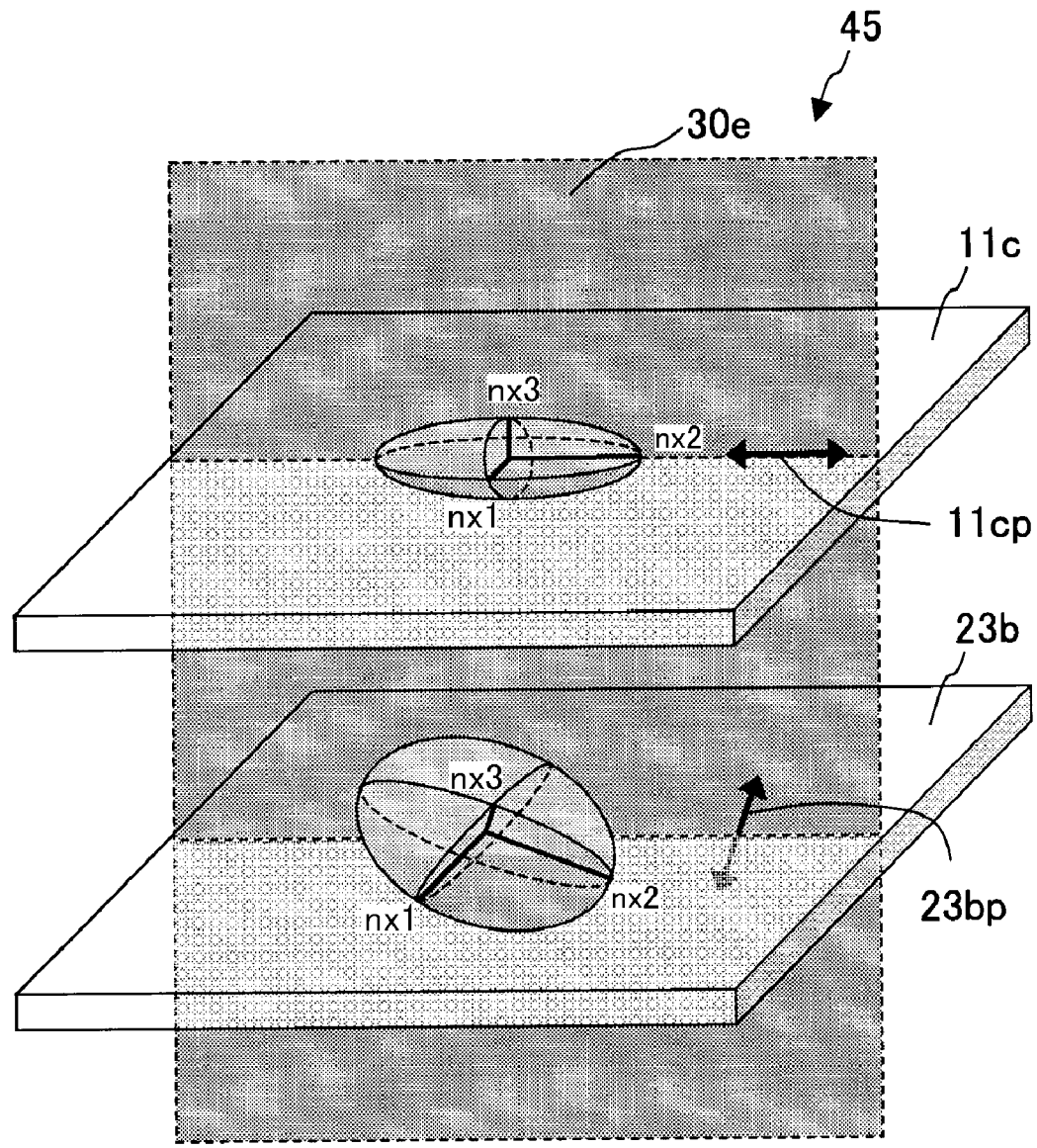

In a complex birefringent medium 45 of FIG. 3-5, a P1 axis 11cp of a birefringent layer 11c of the first kind, a P1 axis 23bp of a birefringent layer 23b of the second kind, and normal lines of the birefringent layers 11c and 23b are in the same plane 30e.

In a complex birefringent medium 46 of FIG. 3-6, a P1 axis 12bp of a birefringent layer 12b of the first kind, a P1 axis 21bp of a birefringent layer 21b of the second kind, and normal lines of the birefringent layers 12b and 21b are in the same plane 30f.

In a complex birefringent medium 47 of FIG. 3-7, a P1 axis 12cp of a birefringent layer 12c of the first kind, a P1 axis 23cp of a birefringent layer 23c of the second kind, and normal lines of the birefringent layers 12c and 23c are in the same plane 30g.

In a complex birefringent medium 48 of FIG. 3-8, a P1 axis 13bp of a birefringent layer 13b of the first kind, a P1 axis 14ap of a birefringent layer 14a of the second kind, and normal lines of the birefringent layers 13b and 14a are in the same plane 30h.

In a complex birefringent medium 49 of FIG. 3-9, a P1 axis 13cp of a birefringent layer 13c of the first kind, a P1 axis 22cp of a birefringent layer 22c of the second kind, and normal lines of the birefringent layers 13c and 22c are in the same plane 30i.

FIG. 4 shows an example of a complex birefringent medium in which the effect of the present invention is not achieved. In accordance with this complex birefringent medium 50, since a P1 axis 14bp of a birefringent layer 14b of the first kind and a P1 axis 21cp of a birefringent layer 21c of the second kind are not in the same plane as that including normal lines of the birefringent layers 14b and 21c, a deviation of the angle, which the P1 axis 14bp of the birefringent layer 14b of the first kind forms with the P1 axis 21cp of the birefringent layer 21c of the second kind, from a design value in the direction of a normal line becomes larger in an oblique direction, and therefore a wide viewing angle cannot be achieved.

However, as shown in FIG. 5, in a complex birefringent medium 5l formed by further laminating a birefringent layer 11d of the first kind on a birefringent layer 14c of the first kind and a birefringent layer 21d of the second kind, if an absolute value of a phase difference R (550) of the birefringent layer 14c of the first kind is reduced to a small value, for example, a value less than 20 nm, not to substantially function as a birefringent layer, the P1 axis 11dp of the birefringent layer 11d of the first kind and the P1 axis 21dp of the birefringent layer 21d of the second kind are in the same plane 30j as that including the normal lines of the birefringent layers 11d and 21d, though the complex birefringent medium does not satisfy the condition that all P1 axes 14cp, 21dp and 11dp are in the same plane as that including the normal lines of the birefringent layers 14c, 21d and 11d, and therefore the effect of the present invention can be achieved. That is, the birefringent layers to satisfy the conditions in the present invention is limited to a birefringent layer satisfying a relationship of |R (550)|≧20 nm.

<Circularly Polarizing Plate>

Hereinafter, the present invention will be described by use of a circularly polarizing plate. In addition, a simulation was performed with a commercially available liquid crystal simulator, "LCD Master (fabricated by SHINTECH, Inc.)". Further, a 2×2 Jones matrix method was adopted as an optical calculation algorithm.

1 Constitution of Conventional Circularly Polarizing Plate

Figures 3, 4, 5, 6:
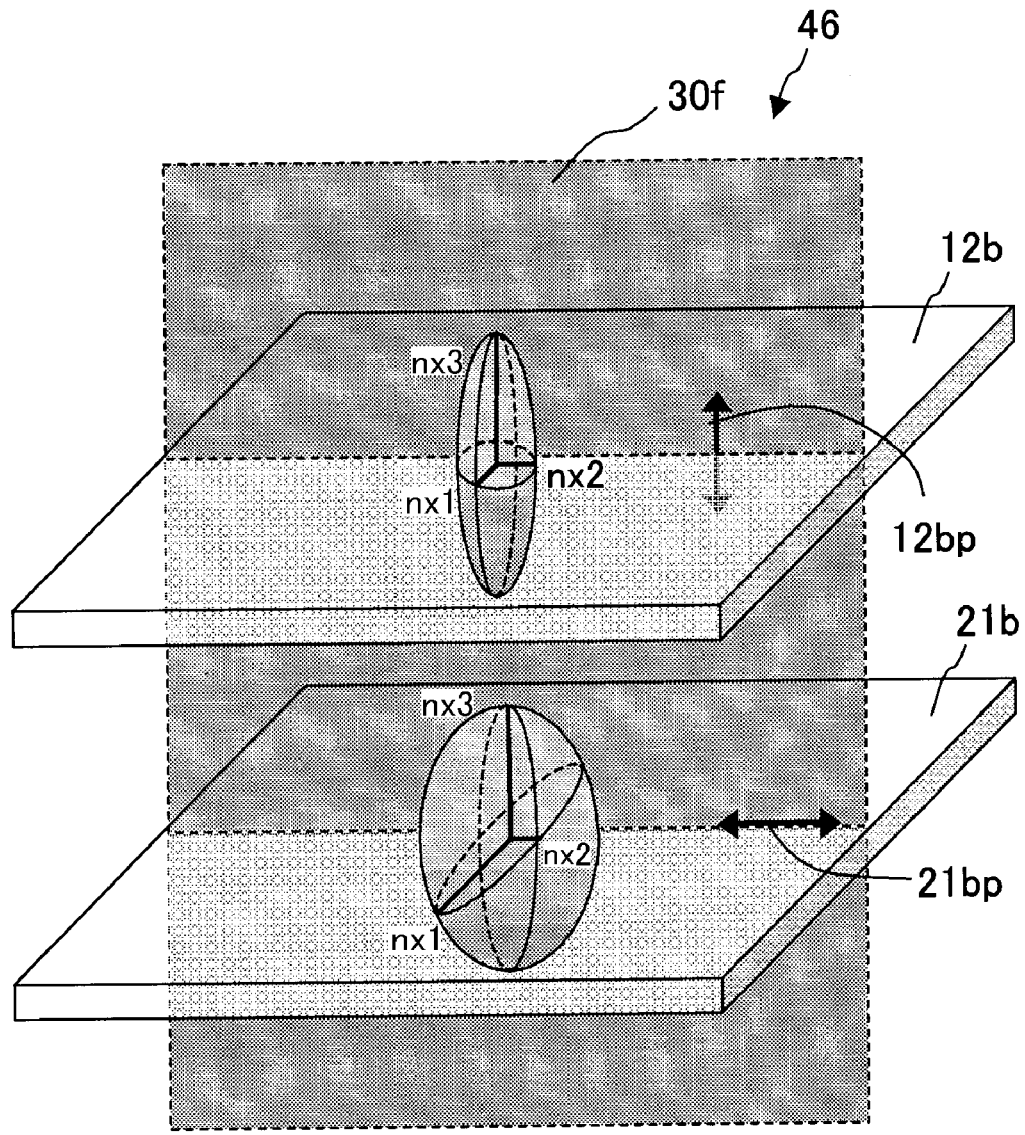

First, as subjects for comparison, optical characteristics of conventional circularly polarizing plates will be described. The following five species of circularly polarizing plates were constituted by reference to the Patent Documents 1 to 15. The constitutions of the circularly polarizing plates are shown in FIGS. 6-1 to 6-5. In addition, in drawings, a double-headed arrow in a linear polarizer represents an absorption axis and double-headed arrows in a λ/4 plate and a λ/2 plate represent an optic axis. A dotted line represents an azimuth with an azimuth angle of 0 degrees.

(1) Single Layer Type Circularly Polarizing Plate not Becoming a Wideband Circularly Polarizing Plate As shown in FIG. 6-1, a circularly polarizing plate (hereinafter, also referred to as a "first circularly polarizing plate") 101 of this type has a constitution in which a linear polarizer (an azimuth of the absorption axis is 0 degrees) 5a and a λ/4 plate (an azimuth of the slow axis (identical to the optic axis) is 45 degrees) 61 are laminated. In addition, the first circularly polarizing plate 101 does not include a protective film of triacetyl cellulose (TAC) or the like and the linear polarizer 5a was assumed as an ideal polarizing element having a polarization degree of 100% over the full range of visible wavelengths. The same is true in the following circularly polarizing plates. As the λ/4 plate 61, a uniaxially-stretched film made of a polycarbonate resin was assumed, and with respect to α and β defined by the following equations (C2) and (D2), α was taken as 1.08 and β was taken as 0.96.

$$\alpha = (\text{phase difference at wavelength of 450 nm})/(\text{phase difference at wavelength of 550 nm}) \quad (C2)$$

$$\beta = (\text{phase difference of wavelength of 650 nm})/(\text{phase difference of wavelength of 550 nm}) \quad (D2)$$

(2) Double Layer Perpendicularly Laminated Type Circularly Polarizing Plate

As shown in FIG. 6-2, a circularly polarizing plate (hereinafter, also referred to as a "second circularly polarizing plate") 102 of this type has a constitution in which a linear polarizer (an azimuth of the absorption axis is 0 degrees) 5b, a λ/2 plate (an azimuth of the slow axis (identical to the optic axis) is 45 degrees) 72, and a λ/4 plate (an azimuth of the slow axis (identical to the optic axis) is −45 degrees) 62 are laminated. As the λ/2 plate 72, a uniaxially-stretched film made of a norbornene resin was assumed, and α was taken as 1.00 and β was taken as 1.00. As the λ/4 plate 62, a uniaxially-stretched film made of a polycarbonate resin was assumed, and α was taken as 1.08 and β was taken as 0.96.

(3) Double Layer Crisscross Laminated Type Circularly Polarizing Plate

As shown in FIG. 6-3, a circularly polarizing plate (hereinafter, also referred to as a "third circularly polarizing plate") 103 of this type has a constitution in which a linear polarizer (an azimuth of the absorption axis is −30 degrees) 5c, a λ/2 plate (an azimuth of the slow axis (identical to the optic axis) is −15 degrees) 73, and a λ/4 plate (anazimuth of the slow axis (identical to the optic axis) is 45 degrees) 63 are laminated. As the λ/2 plate 73 and the λ/4 plate 63, uniaxially-stretched films made of a polycarbonate resin, respectively, were assumed, and α was taken as 1.08 and β was taken as 0.96.

(4) Single Layer Type Circularly Polarizing Plate

As shown in FIG. 6-4, a circularly polarizing plate (hereinafter, also referred to as a "fourth circularly polarizing plate") 104 of this type has a constitution in which a linear polarizer (an azimuth of the absorption axis is 0 degrees) 5d and a λ/4 plate (an azimuth of the slow axis (identical to the optic axis) is 45 degrees) 64 are laminated. As the λ/4 plate 64, a film obtained by uniaxially-stretching a film exhibiting inverse wavelength dispersibility was assumed, and α was taken as 0.75 and β was taken as 1.10 by reference to Example 1 of the Patent Document 11.

(5) Double Layer Parallel Laminated Type Circularly Polarizing Plate not Becoming a Wideband Circularly Polarizing Plate As shown in FIG. 6-5, a circularly polarizing plate (hereinafter, also referred to as a "fifth circularly polarizing plate") 105 of this type has a constitution in which a linear polarizer (an azimuth of the absorption axis is 0 degrees) 5e, a λ/2 plate (Δn>0, an azimuth of the optic axis is 45 degrees, and an azimuth of the slow axis is 45 degrees) 75, and a λ/4 plate (Δn<0, an azimuth of the optic axis is 45 degrees, and an azimuth of the slow axis is −45 degrees) 65 are laminated. By reference to Example 1 of the Patent Document 15, as the λ/2 plate 75, a uniaxially-stretched film made of a polycarbonate resin was assumed, and α was taken as 1.08 and β was taken as 0.96. As the λ/4 plate 65, a uniaxially-stretched film made of a polymethyl methacrylate resin was assumed, and α was taken as 1.05 and β was taken as 0.98. In addition, since the calculation result of the wavelength dispersibility of a laminated body showed that ν=R(450)/R(650)=1.18, the fifth circularly polarizing plate 105 including this laminated body as a phase difference film does not become a wideband circularly polarizing plate.

2 Calculation of Polarized State

Stokes parameters $S_0$, $S_1$, $S_2$ and $S_3$ of output light of from the first circularly polarizing plate to the fifth circularly polarizing plate were calculated at wavelengths in a visible wavelength range to investigate the polarized state of the output light. Since the present inventors are not interested in the intensity of the output light but interested in only the polarized state for the purpose of calculating a polarized state, only a Stokes parameter $S_3$ is noted and a Stokes parameter $S_3$ normalized by the following equation (G) was calculated. Therefore, it is possible to understand that the output light is converted to more ideal circularly polarized light as an absolute value of the Stokes parameter $S_3$ is closer to 1. Further, when the $S_3$ is zero, this represents linearly polarized light.

$$S_0 = S_1^2 + S_2^2 + S_3^2 \tag{G}$$

Figures 3, 4, 5, 6, 7:
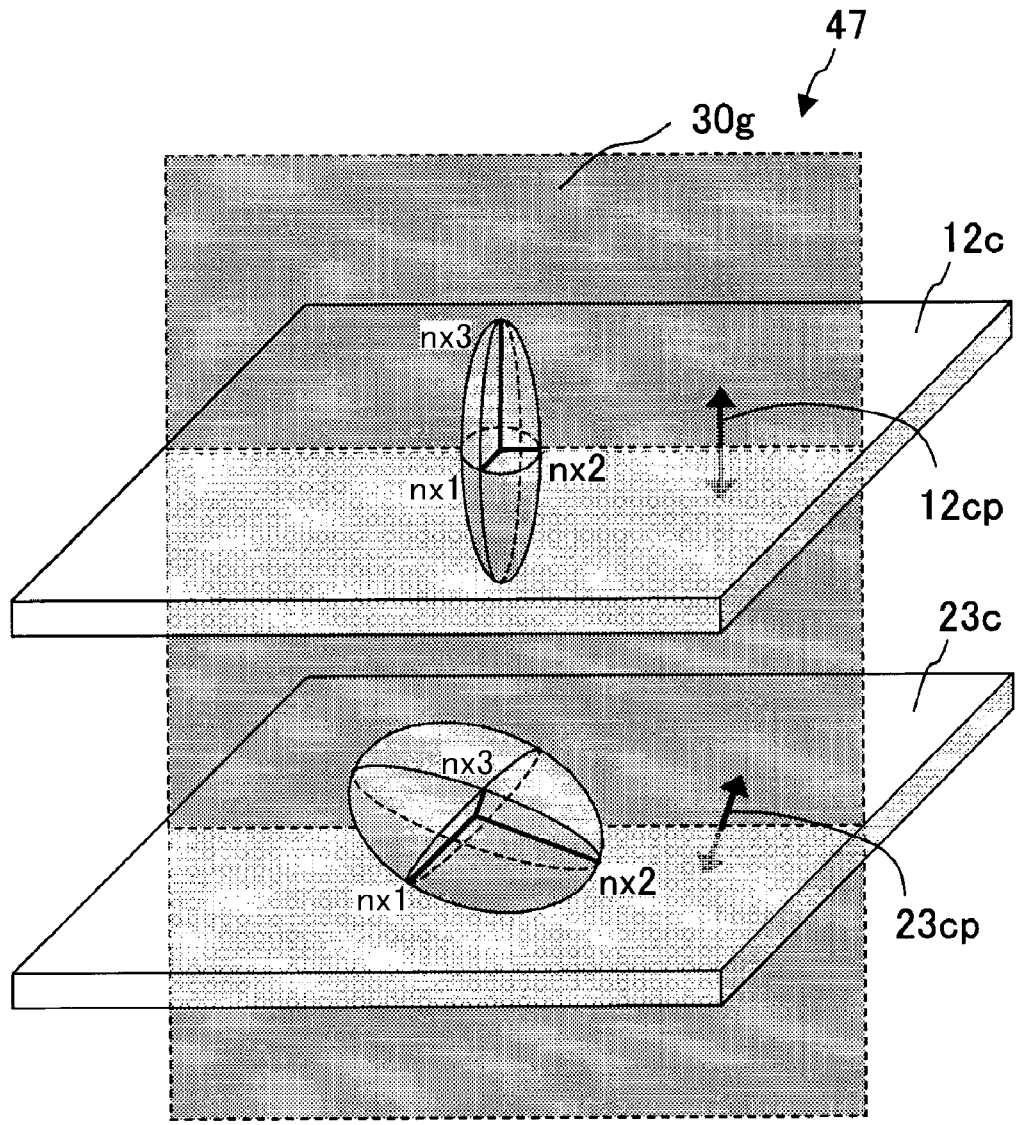

FIGS. 7-1 to 7-5 are graphs showing the calculation results of Stokes parameter $S_3$ of from the first circularly polarizing plate to the fifth circularly polarizing plate. Heavy solid lines, narrow solid lines and dotted lines in drawings represent the Stokes parameter $S_3$ in a normal line direction of the circularly polarizing plate, an oblique direction whose azimuth angle is 22.5 degrees and polar angle is 60 degrees, and an oblique direction whose azimuth angle is 45 degrees and polar angle is 60 degrees, respectively. In addition, in these drawings, that an absolute value of $S_3$ is close to 1 in a wide wavelength range indicates that the circularly polarizing plate is wideband. Further, large overlapping of the heavy solid line, the narrow solid line and the dotted line shows that the circularly polarizing plate has a wide viewing angle.

As shown in FIG. 7-1, in the first circularly polarizing plate not becoming a wideband circularly polarizing plate, $S_3=1$ and an ideal circularly polarized light is obtained at a wavelength of 550 nm which is a design central wavelength. However, in other wavelength region, $S_3$ is less than 1 since the phase difference is deviated from λ/4.

As shown in FIGS. 7-2 to 7-4, in the second, the third and the fourth circularly polarizing plates which become a wideband circularly polarizing plate, $S_3$ is nearly equal to 1 and an ideal circularly polarized light is obtained in a wide wavelength range in a normal line direction, but that is not the case in an oblique direction. Particularly, in the second and the third circularly polarizing plates, the wavelength dispersion of the $S_3$ and the viewing angle dependency of the wavelength dispersion are large, and the divergence of the $S_3$ from 1 is large. The reason why viewing angles of the second and the third circularly polarizing plates, formed by laminating two or more birefringent layers, are narrow as described above include, simply, two reasons (1) that in an oblique direction, apparent phase differences of the birefringent layers are deviated from a design value in a normal line direction, and (2) that in an oblique direction, an angle which the optic axis of the birefringent layers and the polarizer forms with the optic axis of other birefringent layers and the polarizer is deviated from a design value in a normal line direction. This problem shows close similarity to a problem that a crossed Nichols polarizer inherently has a narrow viewing angle, that is, a problem that in the normal line direction, the crossed Nichols polarizer does not produce light leakage since polarization axes (absorption axes) of two polarizers are perpendicular to each other but in an oblique direction, the crossed Nichols polarizer produces light leakage since the polarization axes are not apparently perpendicular to each other. Therefore, it is apparent that this problem comes to the surface as number of the optic axes increases due to an increase in number of the birefringent layers composing the circularly polarizing plate.

On the other hand, as shown in FIG. 7-4, it is found that the fourth circularly polarizing plate of a single layer type has a wide viewing angle and is wideband, since $S_3$ is slightly smaller than 1 in an oblique direction but the viewing angle dependency of the wavelength dispersion of $S_3$ is little. The reason why $S_3$ is smaller than 1 in an oblique direction is (1) that an angle which the optic axis of the λ/4 plate forms with that of the polarizer is deviated from a design value (45 degrees) in an oblique direction, and (2) that an apparent phase difference of the λ/4 plate is deviated from a design value (λ/4). However, anyway, a deviation (magnitude) is almost constant regardless of a wavelength and the wavelength dispersion of $S_3$ does not change even in an oblique direction.

As shown in FIG. 7-5, since the fifth circularly polarizing plate, which is a double layer parallel laminated type circularly polarizing plate, does not become a wideband circularly polarizing plate, the wavelength dispersibility of $S_3$ is large. However, the $S_3$ at a wavelength of 550 nm which is a design central wavelength realized $S_3$ equivalent to $S_3$ of the first and the fourth circularly polarizing plates of the single layer type even in an oblique direction even though it is a double layer laminated type circularly polarizing plate. Further, the viewing angle dependency of the wavelength dispersion of $S_3$ is small.

In the fifth circularly polarizing plate which is a double layer parallel laminated type circularly polarizing plate, there is an important meaning in that not only the slow axes (or the fast axes) of two stretched films are perpendicular to each other but also the birefringent layers are laminated in such a way that the optic axes of the birefringent layers are parallel to one another. Therefore, the viewing angle characteristic of the fifth circularly polarizing plate is distinctly different from the constitution in which two stretched films having an optically positively uniaxial property are simply laminated such a way that the slow axes (or the fast axes) are perpendicular to each other, or the constitution in which two stretched films having an optically negatively uniaxial property are simply laminated in such a way that the slow axes (or the fast axes) are perpendicular to each other. The reason for this can be briefly explained as follows. When the optical characteristics of the birefringent layer in the case where light is propagated in an oblique direction is explained using an optical indicatrix and/or a Poincare sphere, an axis to be used as a basis is not the slow axis nor the fast axis but the optic axis. When the birefringent layers are laminated in such a way that the optic axes of the birefringent layers are in parallel with one another in the same plane as that including the normal lines of the birefringent layers, these optic axes maintain a relationship of being parallel to one another even if viewing the optic axes from any oblique directions. That is, in this case, since an angle between two optic axes is not deviated from a design value, the viewing angle is wide.

3 Constitution of Circularly Polarizing Plate of the Present Invention

The present inventors found the following two points from the calculation results and their consideration of the first circularly polarizing plate to the fifth circularly polarizing plate. That is, it is effective to laminate a plurality of birefringent layers for realizing a wideband phase difference film, and it is effective to use one phase difference film without laminating or to laminate uniaxial phase difference films in such a way that optical axes of the phase difference films are parallel to one another in the case of laminating a plurality of the phase difference films for realizing a phase difference film having a wide viewing angle.

Furthermore, various investigations were made based on these findings, and consequently the present inventors found that a wideband phase difference film having a wide viewing angle (complex birefringent medium) can be provided by laminating two or more birefringent layers so as to satisfy the predetermined relative relationship on the wavelength dispersibility, phase difference and a principal dielectric axis.

In order to show the effectiveness of design guidelines of the present invention below, complex birefringent media were designed according to the design guidelines, and the following eleven species of circularly polarizing plates were made by use of the complex birefringent media. The constitutions of the circularly polarizing plates are shown in FIGS. 6-6 to 6-16. In drawings, a double-headed arrow in a linear polarizer represents an absorption axis and a double-headed arrow in a birefringent layer represents the P1 axis. In addition, double-headed arrows in the birefringent layers in FIGS. 6-13 to 6-16 indicate that these double-headed arrows are not along an in-plane direction of the birefringent layer and are tilted (a polar angle is less than 90 degrees). A dotted line represents an azimuth with an azimuth angle of 0 degrees.

(1) Circularly Polarizing Plate 1 of the Present Invention

As shown in FIG. 6-6, this circularly polarizing plate (hereinafter, also referred to as a "sixth circularly polarizing plate") 106 has a constitution in which the linear polarizer 5f, a birefringent layer 81 of the first kind and a birefringent layer 91 of the second kind are laminated. Optical characteristics of the birefringent layers are shown in Table 1 below. As the birefringent layer 81 of the first kind, a uniaxially-stretched film made of a norbornene resin was assumed. As the birefringent layer 91 of the second kind, a uniaxially-stretched film made of a polymethyl methacrylate resin was assumed.

TABLE 1

| Constitution | Absorption axis Azimuth angle (degree) | Direction of P1 axis | | Phase difference R (550) (nm) | Wavelength dispersibility | | Biaxial property η |
|---|---|---|---|---|---|---|---|
| | | Azimuth angle (degree) | Polar angle (degree) | | α | β | |
| Linear polarizer | 0 | — | | — | | | |
| Birefringent layer of first kind | — | 45 | 90 | 275 | 1.00 | 1.00 | 0 |
| Birefringent layer of second kind | | | | −137.5 | 1.05 | 0.98 | |

(2) Circularly Polarizing Plate 2 of the Present Invention

As shown in FIG. 6-7, this circularly polarizing plate (hereinafter, also referred to as a "seventh circularly polarizing plate") 107 has a constitution in which a linear polarizer 5g, a birefringent layer 82 of the first kind and a birefringent layer 92 of the second kind are laminated. Optical characteristics of the birefringent layers are shown in Table 2 below. As the birefringent layer 82 of the first kind, a uniaxially-stretched film made of a norbornene resin was assumed. As the birefringent layer 92 of the second kind, a uniaxially-stretched film made of a polymethyl methacrylate resin was assumed. The seventh circularly polarizing plate has the same constitution as in the sixth circularly polarizing plate except that absolute values of the phase differences R (550) of the birefringent layer of the first kind and the birefringent layer of the second kind are large.

TABLE 2

| Constitution | Absorption axis Azimuth angle (degree) | Direction of P1 axis Azimuth angle (degree) | Polar angle (degree) | Phase difference R (550) (nm) | Wavelength dispersibility α | Wavelength dispersibility β | Biaxial property η |
|---|---|---|---|---|---|---|---|
| Linear polarizer | 0 | — | | | | | |
| Birefringent layer of first kind | — | 45 | 90 | 987.5 | 1.00 | 1.00 | 0 |
| Birefringent layer of second kind | | | | −850 | 1.05 | 0.98 | |

(3) Circularly Polarizing Plate 3 of the Present Invention

Figures 3, 4, 5, 6, 7, 8:
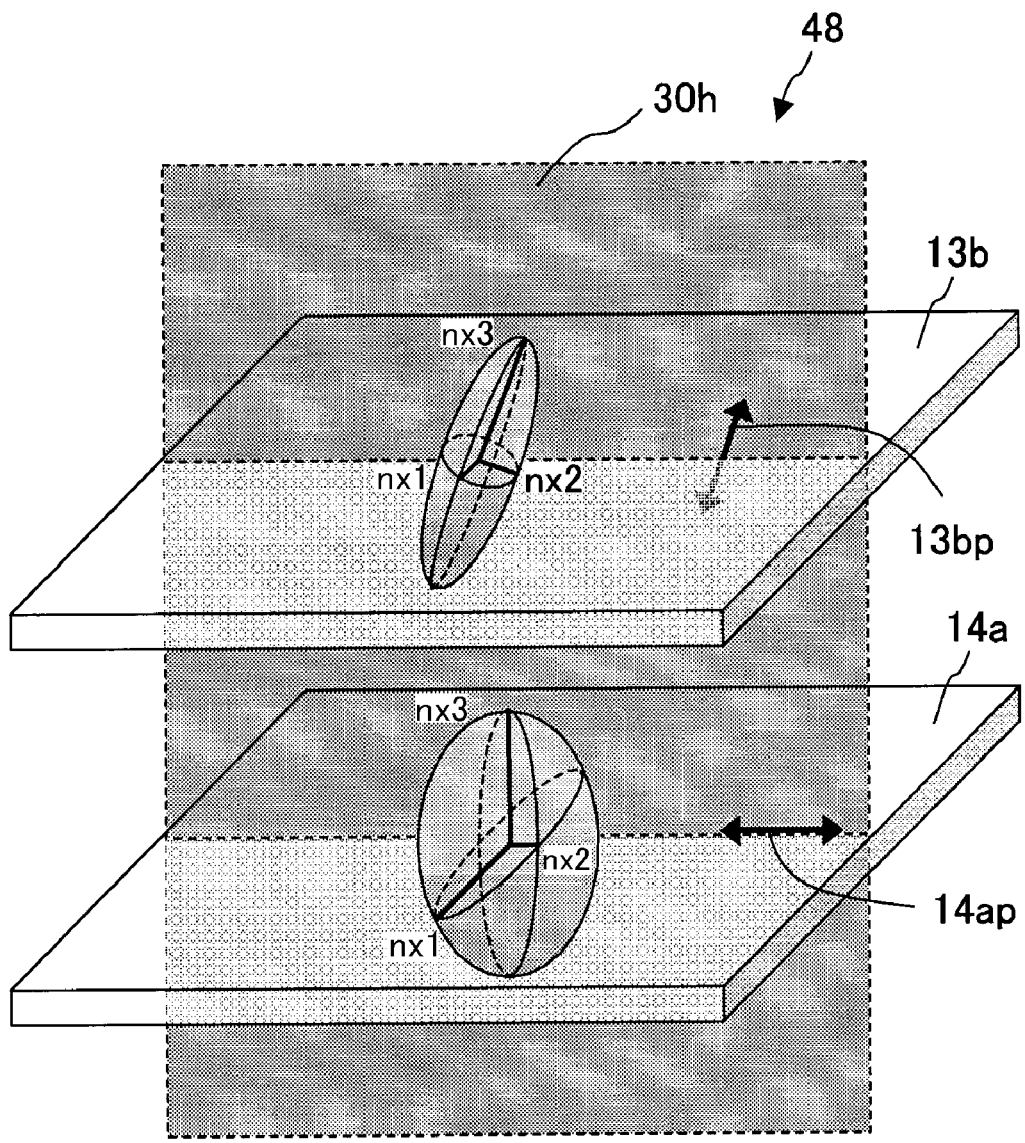

As shown in FIG. 6-8, this circularly polarizing plate (hereinafter, also referred to as a "eighth circularly polarizing plate") 108 has a constitution in which a linear polarizer 5h, a birefringent layer 83 of the first kind, a birefringent layer 93 of the second kind and a birefringent layer 84 of the first kind. Optical characteristics of the birefringent layers are shown in Table 3 below. As the birefringent layers 83 and 84 of the first kind, uniaxially-stretched films made of a norbornene resin were assumed. As the birefringent layer 93 of the second kind, a uniaxially-stretched film made of a polymethyl methacrylate resin was assumed.

TABLE 3

| Constitution | Absorption axis Azimuth angle (degree) | Direction of P1 axis Azimuth angle (degree) | Polar angle (degree) | Phase difference R (550) (nm) | Wave length dispersibility α | Wave length dispersibility β | Biaxial property η |
|---|---|---|---|---|---|---|---|
| Linear polarizer | 0 | — | | | | | |
| Birefringent layer of first kind | — | 45 | 90 | 487.5 | 1.00 | 1.00 | 0 |
| Birefringent layer of second kind | | | | −850 | 1.05 | 0.98 | |
| Birefringent layer of first kind | | | | 500 | 1.00 | 1.00 | |

(4) Circularly Polarizing Plate 4 of the Present Invention

As shown in FIG. 6-9, this circularly polarizing plate (hereinafter, also referred to as a "ninth circularly polarizing plate") 109 has a constitution in which a linear polarizer 5i, a birefringent layer 85 of the first kind and a birefringent layer 94 of the second kind are laminated. Optical characteristics of the birefringent layers are shown in Table 4 below. As the birefringent layer 85 of the first kind, a film obtained by uniaxially-stretching a film made of a norbornene resin in a width direction was assumed. As the birefringent layer 94 of the second kind, a film obtained by uniaxially-stretching a film made of a polymethyl methacrylate resin in a width direction was assumed. The ninth circularly polarizing plate has the same constitution as in the sixth circularly polarizing plate except that biaxial parameters η of the birefringent layers are 0.25.

TABLE 4

| Constitution | Absorption axis Azimuth angle (degree) | Direction of P1 axis Azimuth angle (degree) | Polar angle (degree) | Phase difference R (550) (nm) | Wavelength dispersibility α | Wavelength dispersibility β | Biaxial property η |
|---|---|---|---|---|---|---|---|
| Linear polarizer | 0 | — | | | | | |
| Birefringent layer of first kind | — | 45 | 90 | 275 | 1.00 | 1.00 | 0.25 |
| Birefringent layer of second kind | | | | −137.5 | 1.05 | 0.98 | |

(5) Circularly Polarizing Plate 5 of the Present Invention

As shown in FIG. 6-10, this circularly polarizing plate (hereinafter, also referred to as a "tenth circularly polarizing plate") 110 has a constitution in which a linear polarizer 5j, a birefringent layer 86 of the first kind and a birefringent layer 95 of the second kind are laminated. Optical characteristics of the birefringent layers are shown in Table 5 below. As the birefringent layer 86 of the first kind, a film obtained by uniaxially-stretching a film made of a norbornene resin in a width direction was assumed. As the birefringent layer 95 of the second kind, a film obtained by uniaxially-stretching a film made of a polymethyl methacrylate resin in a width direction was assumed. The tenth circularly polarizing plate has the same constitution as in the ninth circularly polarizing plate except that biaxial parameters η of the birefringent layers are 0.5.

TABLE 5

| Constitution | Absorption axis Azimuth angle (degree) | Direction of P1 axis | | Phase difference R (550) (nm) | Wavelength dispersibility | | Biaxial property |
| --- | --- | --- | --- | --- | --- | --- | --- |
| | | Azimuth angle (degree) | Polar angle (degree) | | α | β | η |
| Linear polarizer | 0 | | | — | | | |
| Birefringent layer of first kind | — | 45 | 90 | 275 | 1.00 | 1.00 | 0.5 |
| Birefringent layer of second kind | | | | −137.5 | 1.05 | 0.98 | |

(6) Circularly Polarizing Plate 6 of the Present Invention

As shown in FIG. 6-11, this circularly polarizing plate (hereinafter, also referred to as a "eleventh circularly polarizing plate") 111 has a constitution in which a linear polarizer 5k, a birefringent layer 87 of the first kind and a birefringent layer 96 of the second kind are laminated. Optical characteristics of the birefringent layers are shown in Table 6 below. As the birefringent layer 87 of the first kind, a film obtained by uniaxially-stretching a film made of a norbornene resin in a width direction was assumed. As the birefringent layer 96 of the second kind, a film obtained by uniaxially-stretching a film made of a polymethyl methacrylate resin in a width direction was assumed. The eleventh circularly polarizing plate has the same constitution as in the tenth circularly polarizing plate except that a biaxial parameter η1 of the birefringent layer of the first kind is different from a biaxial parameter η2 of the birefringent layer of the second kind and η1/η2=½.

(7) Circularly Polarizing Plate 7 of the Present Invention

As shown in FIG. 6-12, this circularly polarizing plate (hereinafter, also referred to as a "twelfth circularly polarizing plate") 112 has a constitution in which a linear polarizer 5m, a birefringent layer 88 of the first kind and a birefringent layer 97 of the second kind are laminated. Optical characteristics of the birefringent layers are shown in Table 7 below. As the birefringent layer 88 of the first kind, a film obtained by uniaxially-stretching a film made of a norbornene resin in a width direction was assumed. As the birefringent layer 97 of the second kind, a film obtained by uniaxially-stretching a film made of a polymethyl methacrylate resin in a width direction was assumed. The twelfth circularly polarizing plate has the same constitution as in the eleventh circularly polarizing plate except that a biaxial parameter η1 of the birefringent layer of the first kind and a biaxial parameter η2 of the birefringent layer of the second kind are large.

TABLE 6

| Constitution | Absorption axis Azimuth angle (degree) | Direction of P1 axis | | Phase difference R (550) (nm) | Wavelength dispersibility | | Biaxial property |
| --- | --- | --- | --- | --- | --- | --- | --- |
| | | Azimuth angle (degree) | Polar angle (degree) | | α | β | η |
| Linear polarizer | 0 | | | — | | | |
| Birefringent layer of first kind | — | 45 | 90 | 275 | 1.00 | 1.00 | 0.25 |
| Birefringent layer of second kind | | | | −137.5 | 1.05 | 0.98 | 0.5 |

TABLE 7

| Constitution | Absorption axis Azimuth angle (degree) | Direction of P1 axis | | Phase difference R (550) (nm) | Wavelength dispersibility | | Biaxial property η |
|---|---|---|---|---|---|---|---|
| | | Azimuth angle (degree) | Polar angle (degree) | | α | β | |
| Linear polarizer | 0 | — | | — | | | |
| Birefringent layer of first kind | — | 45 | 90 | 275 | 1.00 | 1.00 | 0.5 |
| Birefringent layer of second kind | | | | −137.5 | 1.05 | 0.98 | 1 |

(8-1) Circularly Polarizing Plate 8-1 of the Present Invention

As shown in FIG. 6-13, this circularly polarizing plate (hereinafter, also referred to as a "thirteen-first circularly polarizing plate") 113a has a constitution in which a linear polarizer 5n, a birefringent layer 89a of the first kind and a birefringent layer 98a of the second kind are laminated. Optical characteristics of the birefringent layers are shown in Table 8 below. As the birefringent layer 89a of the first kind, a uniaxially-stretched film made of a norbornene resin was assumed. As the birefringent layer 98a of the second kind, a layer formed by aligning discotic liquid crystalline molecules in a hybrid mode was assumed. In the thirteen-first circularly polarizing plate, a polar angle of the P1 axis of the birefringent layer 98a of the second kind was 75 degrees and an angle which the P1 axis of the birefringent layer 89a of the first kind forms with that of the birefringent layer 98a of the second kind was 15 degrees.

(8-2) Circularly Polarizing Plate 8-2 of the Present Invention

As shown in FIG. 6-14, this circularly polarizing plate (hereinafter, also referred to as a "thirteen-second circularly polarizing plate") 113b has a constitution in which a linear polarizer 5p, a birefringent layer 89b of the first kind and a birefringent layer 98b of the second kind. Optical characteristics of the birefringent layers are shown in Table 9 below. As the birefringent layer 89b of the first kind, a uniaxially-stretched film made of a norbornene resin was assumed. As the birefringent layer 98b of the second kind, a layer formed by aligning discotic liquid crystalline molecules in a hybrid mode was assumed. In the thirteen-second circularly polarizing plate, a polar angle of the P1 axis of the birefringent layer 98b of the second kind was 70 degrees and an angle which the P1 axis of the birefringent layer 89b of the first kind forms with that of the birefringent layer 98b of the second kind was 20 degrees.

TABLE 8

| Constitution | Absorption axis Azimuth angle (degree) | Direction of P1 axis | | Phase difference R (550) (nm) | Wavelength dispersibility | | Biaxial property η |
|---|---|---|---|---|---|---|---|
| | | Azimuth angle (degree) | Polar angle (degree) | | α | β | |
| Linear polarizer | 0 | — | | — | | | |
| Birefringent layer of first kind | — | 45 | 90 | 275 | 1.00 | 1.00 | 0 |
| Birefringent layer of second kind | | | 75 | −145 | 1.08 | 0.96 | |

TABLE 9

| Constitution | Absorption axis Azimuth angle (degree) | Direction of P1 axis | | Phase difference R (550) (nm) | Wavelength dispersibility | | Biaxial property η |
|---|---|---|---|---|---|---|---|
| | | Azimuth angle (degree) | Polar angle (degree) | | α | β | |
| Linear polarizer | 0 | — | | — | | | |
| Birefringent layer of first kind | — | 45 | 90 | 275 | 1.00 | 1.00 | 0 |
| Birefringent layer of second kind | | | 70 | −155 | 1.08 | 0.96 | |

(8-3) Circularly Polarizing Plate 8-3 of the Present Invention

As shown in FIG. 6-15, this circularly polarizing plate (hereinafter, also referred to as a "thirteen-third circularly polarizing plate") 113c has a constitution in which a linear polarizer 5q, a birefringent layer 89c of the first kind and a birefringent layer 98c of the second kind. Optical characteristics of the birefringent layers are shown in Table 10 below. As the birefringent layer 89c of the first kind, a uniaxially-stretched film made of a norbornene resin was assumed. As the birefringent layer 98c of the second kind, a layer formed by aligning discotic liquid crystalline molecules in a hybrid mode was assumed. In the thirteen-third circularly polarizing plate, a polar angle of the P1 axis of the birefringent layer 98c of the second kind was 67.5 degrees and an angle which the P1 axis of the birefringent layer 89c of the first kind forms with that of the birefringent layer 98c of the second kind was 22.5 degrees.

TABLE 10

| Constitution | Absorption axis Azimuth angle (degree) | Direction of P1 axis | | Phase difference R (550) (nm) | Wavelength dispersibility | | Biaxial property $\eta$ |
| --- | --- | --- | --- | --- | --- | --- | --- |
| | | Azimuth angle (degree) | Polar angle (degree) | | $\alpha$ | $\beta$ | |
| Linear polarizer | 0 | | | — | | | |
| Birefringent layer of first kind | — | 45 | 90 | 275 | 1.00 | 1.00 | 0 |
| Birefringent layer of second kind | | | 67.5 | −160 | 1.08 | 0.96 | |

(8-4) Circularly Polarizing Plate 8-4 of the Present Invention

As shown in FIG. 6-16, this circularly polarizing plate (hereinafter, also referred to as a "thirteen-fourth circularly polarizing plate") 113d has a constitution in which a linear polarizer 5r, a birefringent layer 89d of the first kind and a birefringent layer 98d of the second kind. Optical characteristics of the birefringent layers are shown in Table 11 below. As the birefringent layer 89d of the first kind, a uniaxially-stretched film made of a norbornene resin was assumed. As the birefringent layer 98d of the second kind, a layer formed by aligning discotic liquid crystalline molecules in a hybrid mode was assumed. In the thirteen-fourth circularly polarizing plate, a polar angle of the P1 axis of the birefringent layer 98d of the second kind was 65 degrees and an angle which the P1 axis of the birefringent layer 89d of the first kind forms with that of the birefringent layer 98d of the second kind was 25 degrees.

4 Measurement of Polarized State

FIGS. 7-6 to 7-16 are graphs showing the calculation results of Stokes parameter $S_3$ of from the sixth circularly polarizing plate to the twelfth circularly polarizing plate and from the thirteen-first circularly polarizing plate to the thirteen-fourth circularly polarizing plate of the present invention. Heavy solid lines, narrow solid lines and dotted lines in drawings represent the Stokes parameter $S_3$ in a normal line direction of the circularly polarizing plate, an oblique direction whose azimuth angle is 22.5 degrees and polar angle is 60 degrees, and an oblique direction whose azimuth angle is 45 degrees and polar angle is 60 degrees, respectively.

As shown in FIG. 7-6, in the sixth circularly polarizing plate of the present invention, in both a normal line direction and an oblique direction, $S_3$ is nearly equal to 1 in a wide wavelength range, and therefore the sixth circularly polarizing plate of the present invention has a wider viewing angle than the second circularly polarizing plate which is a double layer perpendicularly laminated type circularly polarizing plate and the third circularly polarizing plate which is a double layer crisscross laminated type circularly polarizing plate.

Further, as shown in FIG. 7-7, in the seventh circularly polarizing plate of the present invention in which phase differences of the birefringent layers are larger than those of the birefringent layers constituting the sixth circularly polarizing plate, $S_3$ is nearly equal to 1 in a wider wavelength range. Furthermore, as shown in FIG. 7-8, also in the eighth circularly polarizing plate of the present invention in which phase differences of the birefringent layers are relatively large, $S_3$ is nearly equal to 1 in a wide wavelength range as with the seventh circularly polarizing plate which is a double layer laminated type circularly polarizing plate even though the eighth circularly polarizing plate is a triple layer laminated

TABLE 11

| Constitution | Absorption axis Azimuth angle (degree) | Direction of P1 axis | | Phase difference R (550) (nm) | Wavelength dispersibility | | Biaxial property $\eta$ |
| --- | --- | --- | --- | --- | --- | --- | --- |
| | | Azimuth angle (degree) | Polar angle (degree) | | $\alpha$ | $\beta$ | |
| Linear polarizer | 0 | | | — | | | |
| Birefringent layer of first kind | — | 45 | 90 | 275 | 1.00 | 1.00 | 0 |
| Birefringent layer of second kind | | | 65 | −165 | 1.08 | 0.96 | | type circularly polarizing plate, and therefore the eighth circularly polarizing plate is wideband and has a wider viewing angle.

Figures 3, 4, 5, 6, 7, 8, 9:
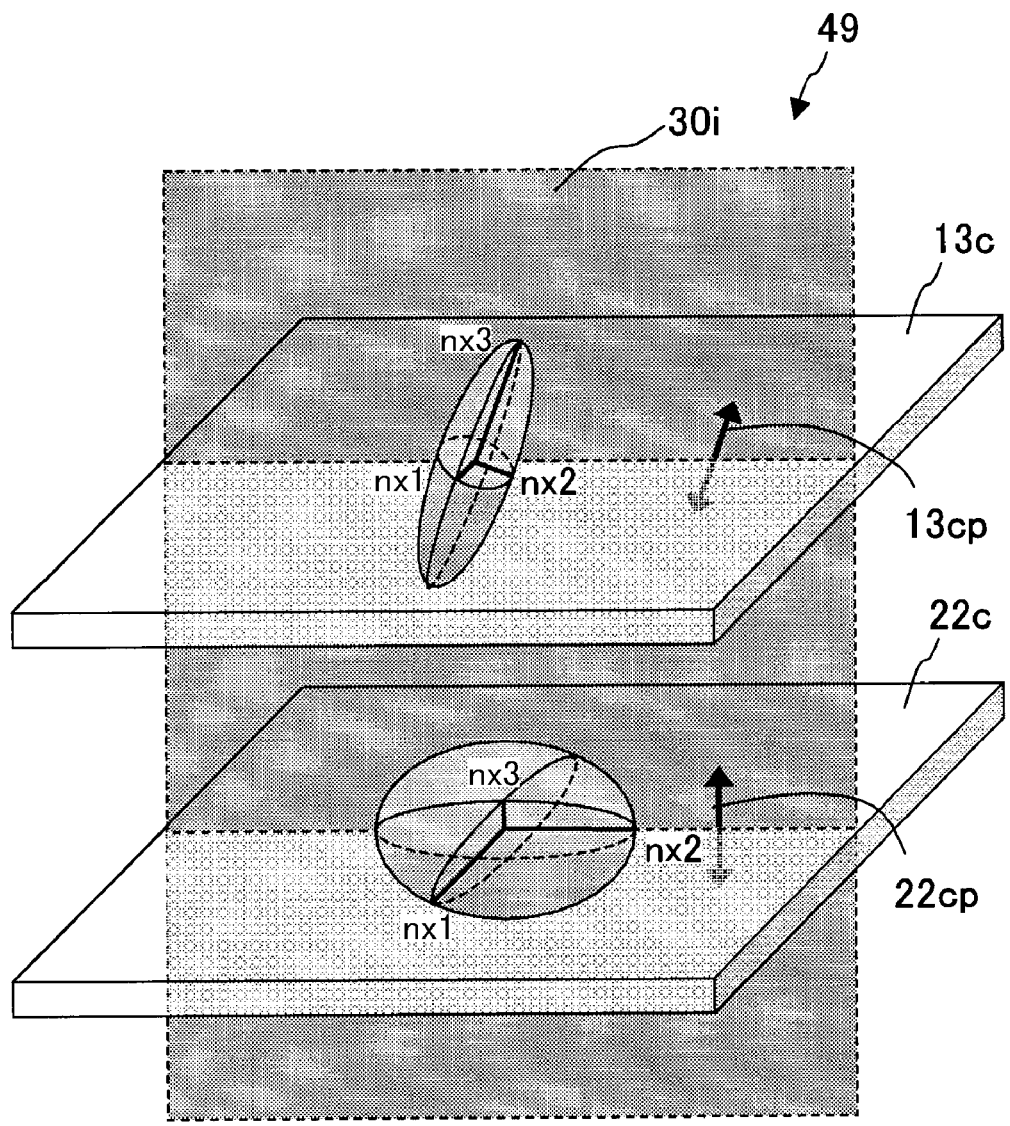
Figure 4:
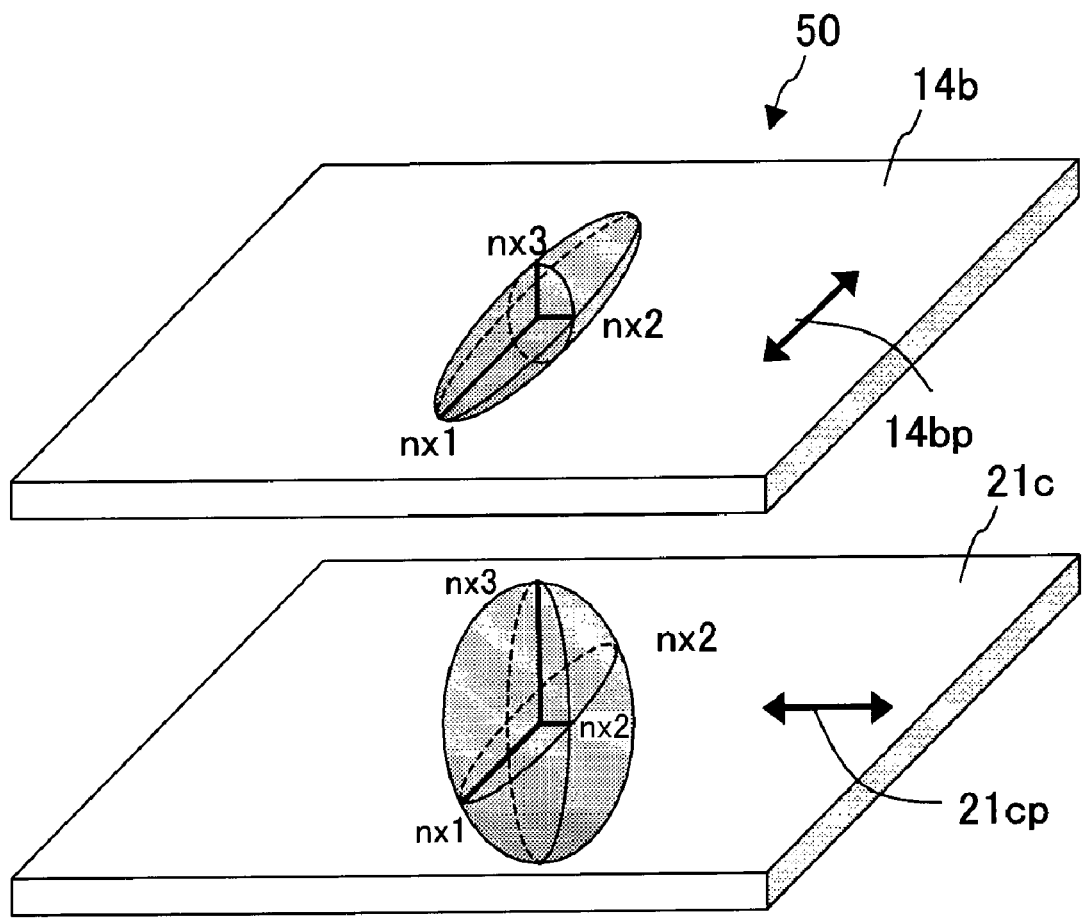
Figure 5:
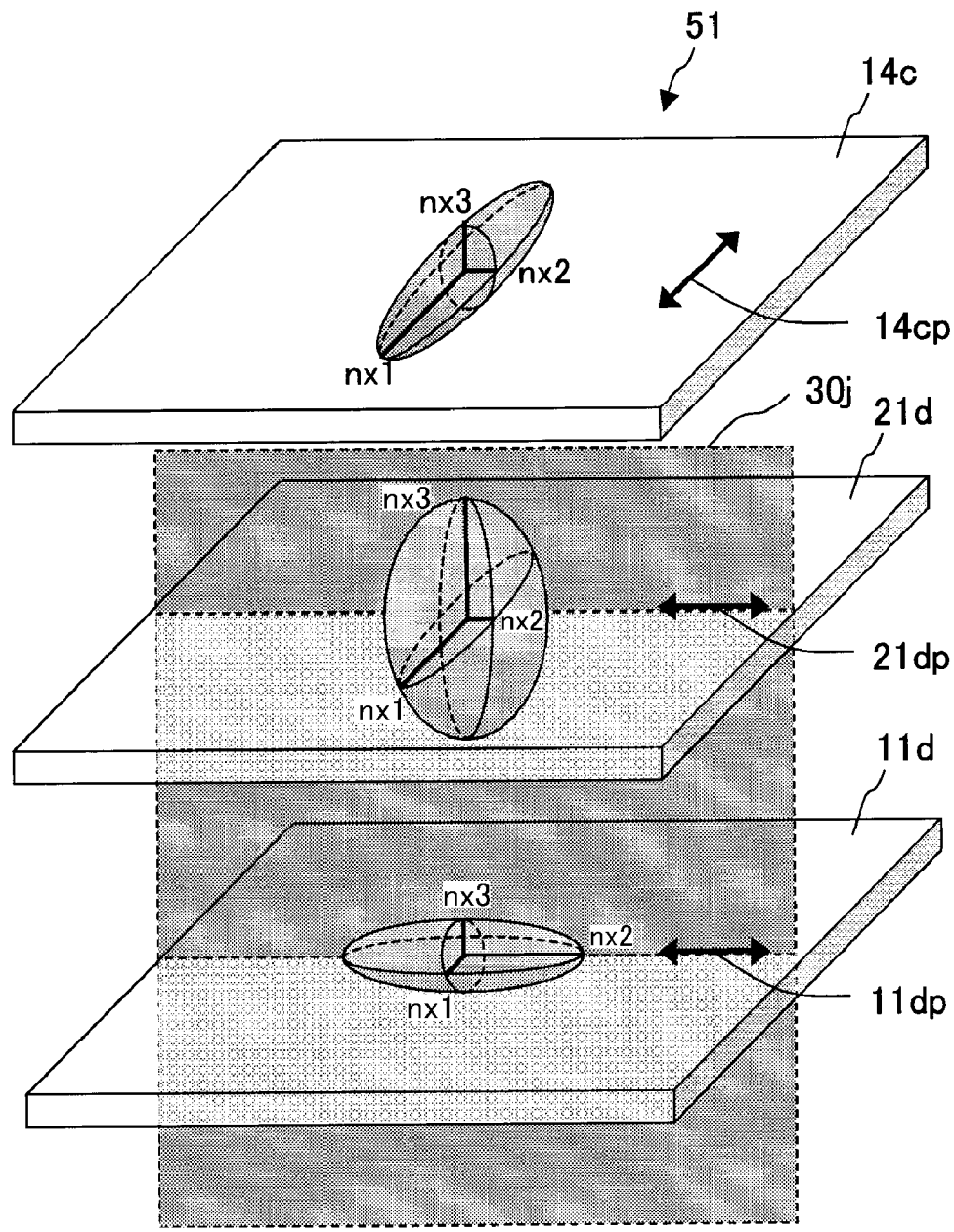
Figures 1, 6:
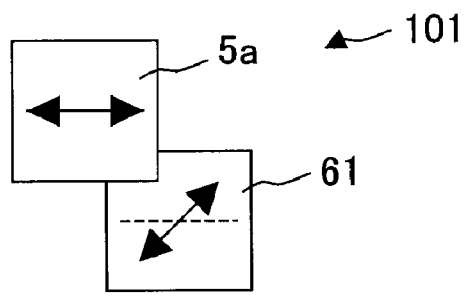
Figures 2, 6:
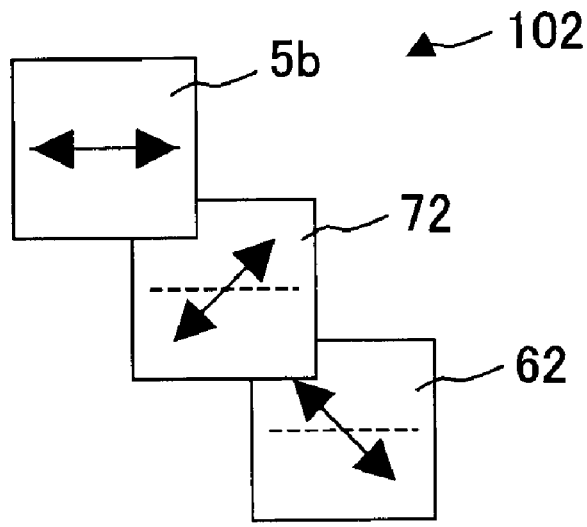
Figures 3, 6:
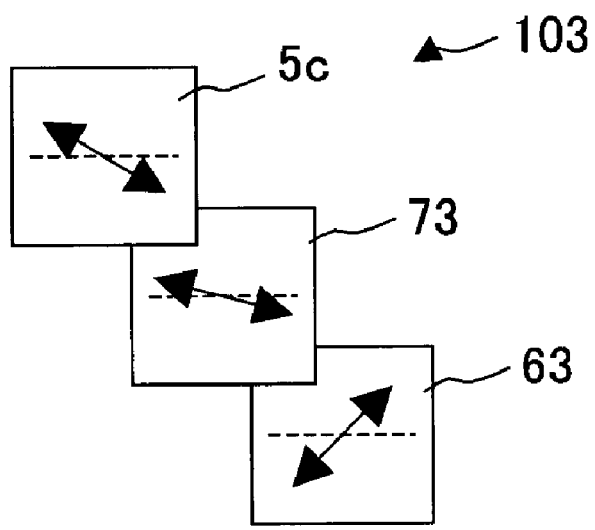
Figures 4, 6:
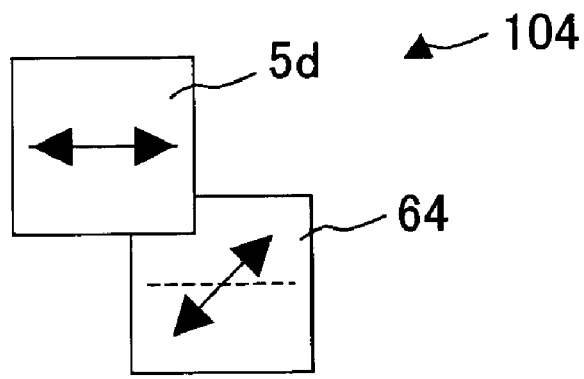
Figures 5, 6:
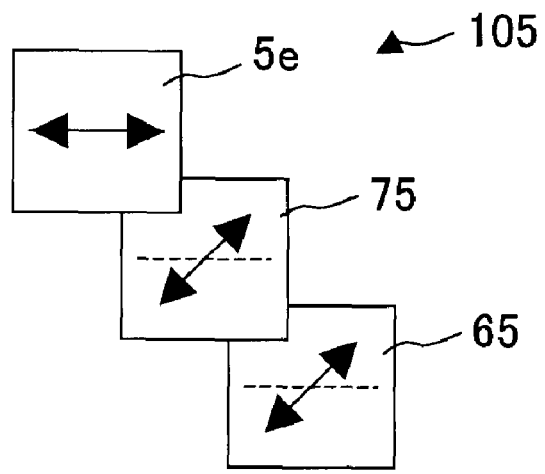
Figure 6:
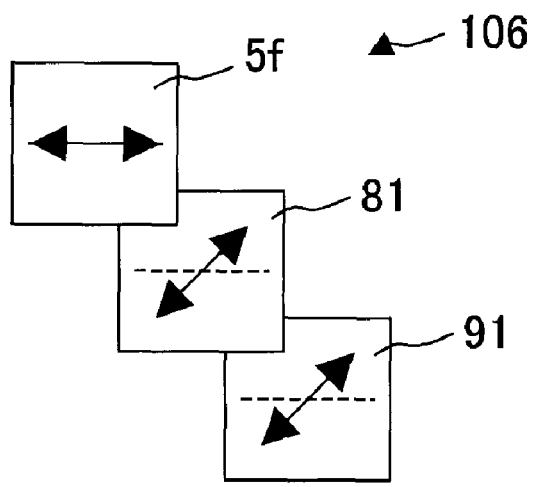
Figures 6, 7:
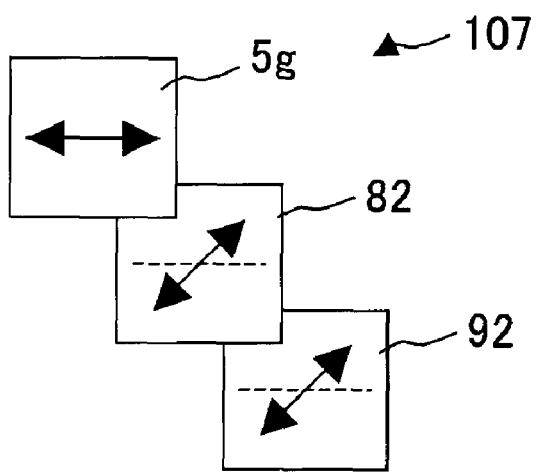
Figures 6, 7, 8:
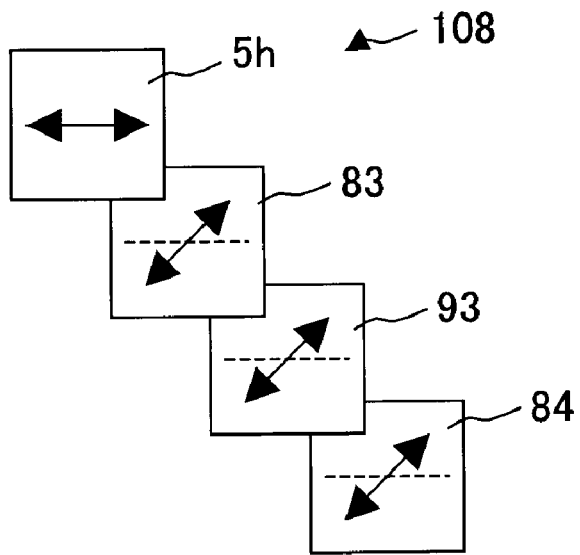
Figures 6, 7, 8, 9:
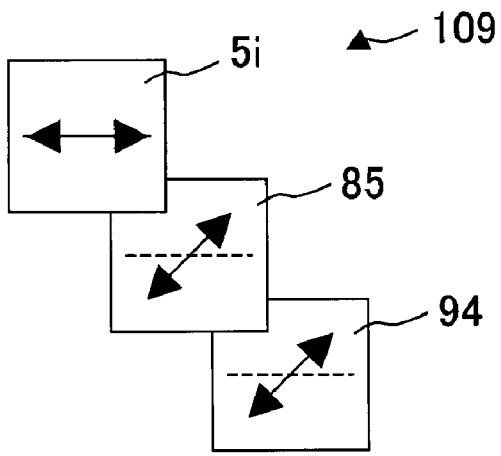
Figures 6, 7, 8, 9, 10:
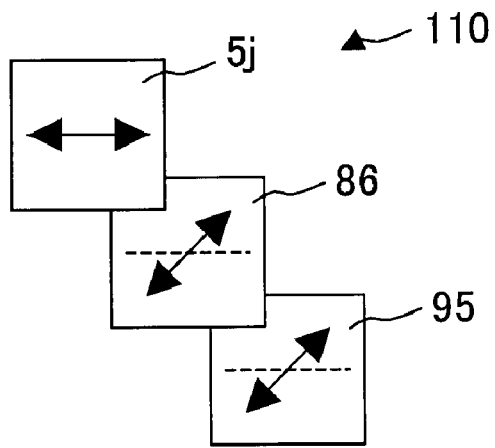
Figures 6, 7, 8, 9, 10, 11:
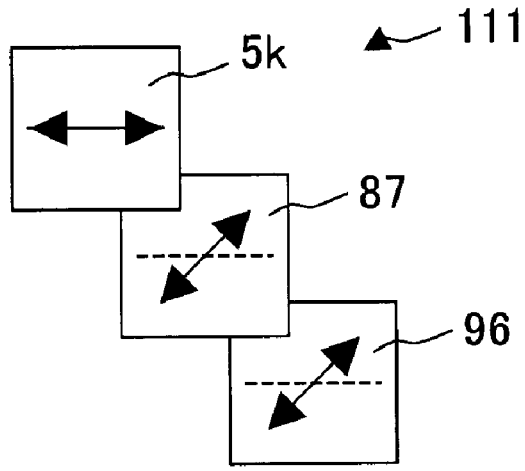
Figures 6, 7, 8, 9, 10, 11, 12:
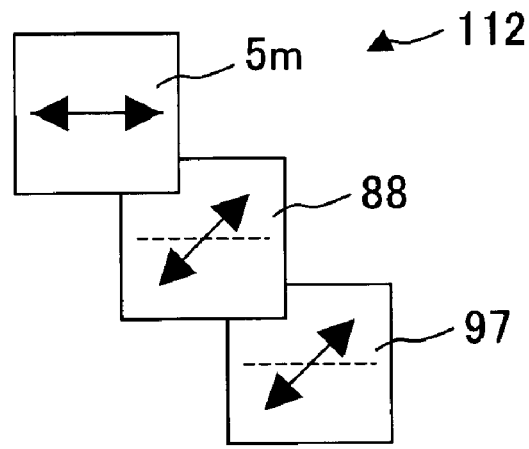
Figures 6, 7, 8, 9, 10, 11, 12, 13:
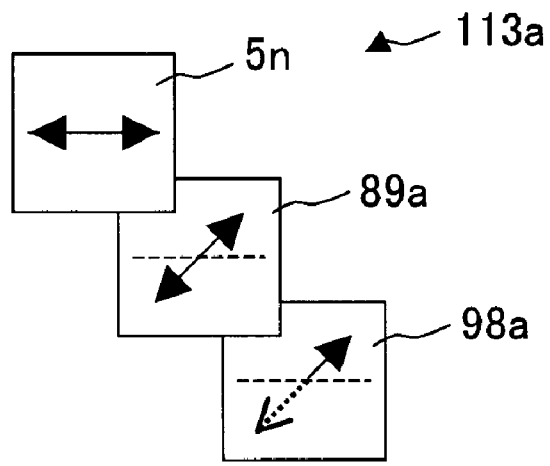
Figures 6, 7, 8, 9, 10, 11, 12, 13, 14:
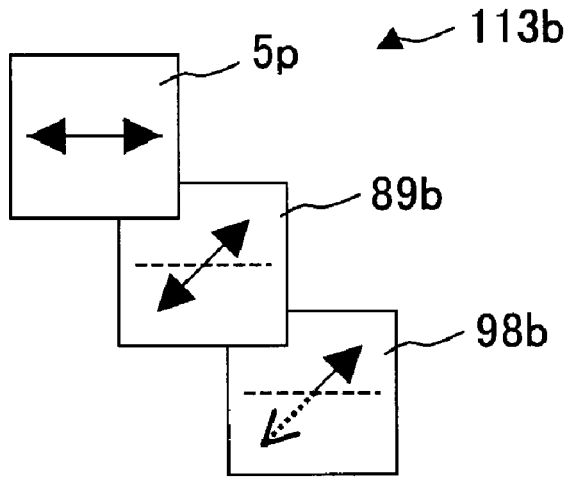
Figures 6, 7, 8, 9, 10, 11, 12, 13, 14, 15:
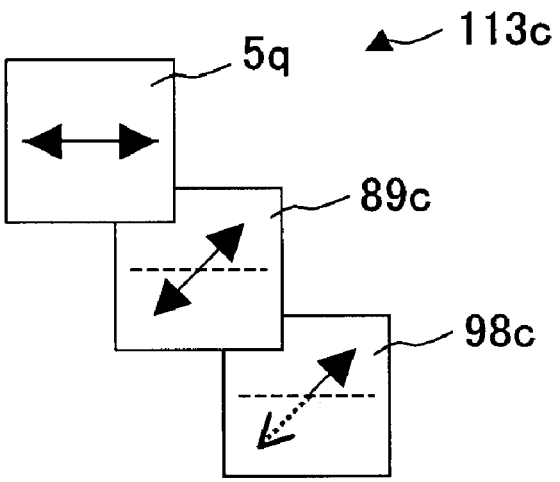
Figures 6, 7, 8, 9, 10, 11, 12, 13, 14, 15, 16:
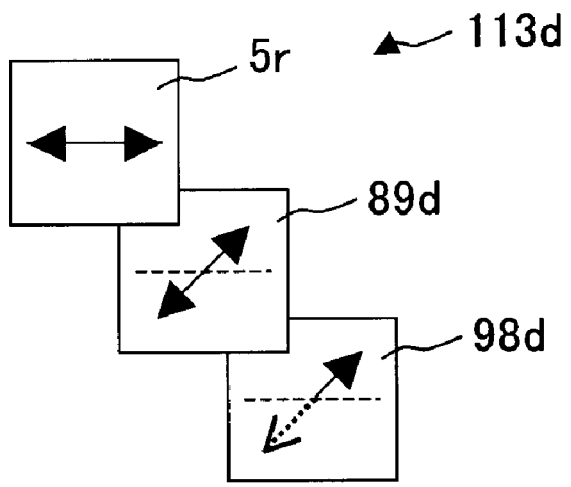
Figures 1, 7:
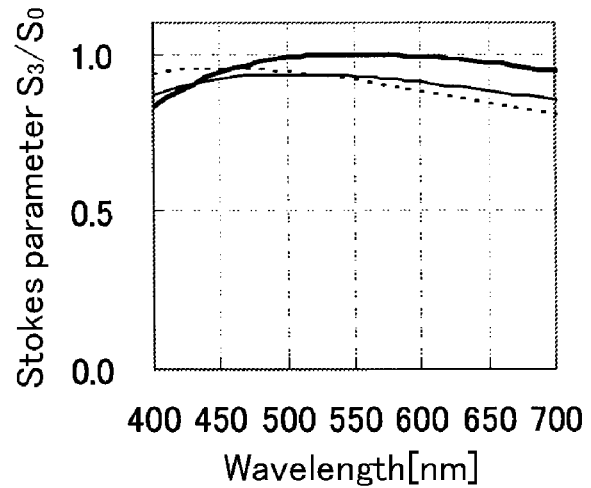
Figures 2, 7:
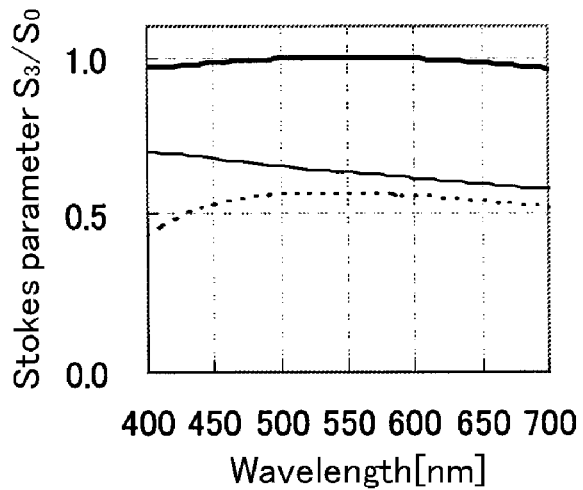
Figures 3, 7:
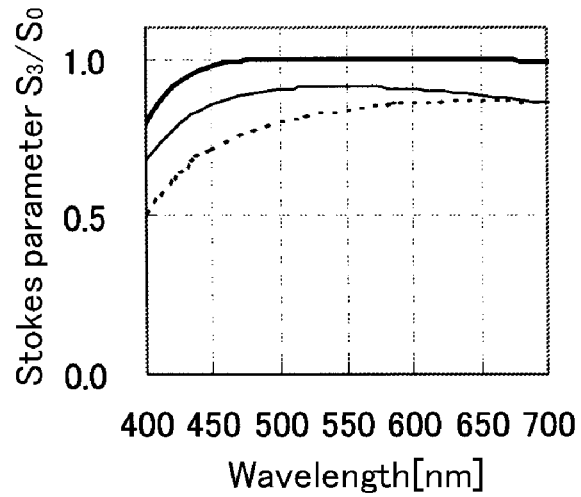
Figures 4, 7:
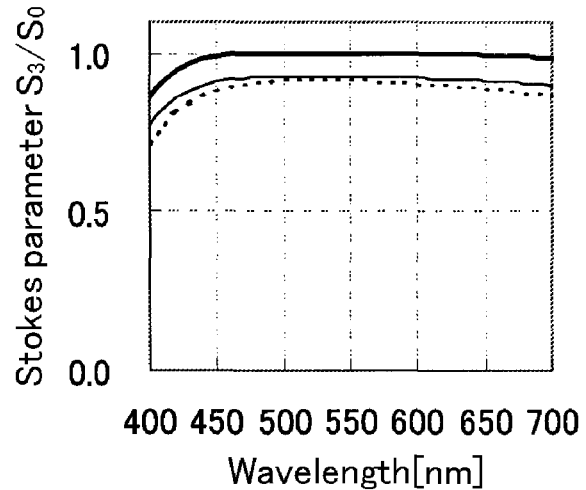
Figures 5, 7:
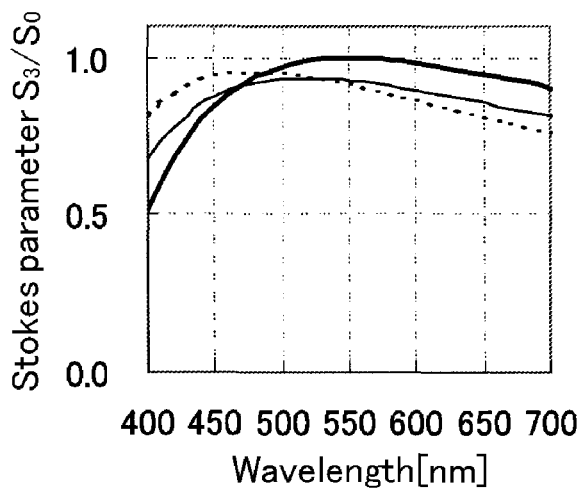
Figures 6, 7:
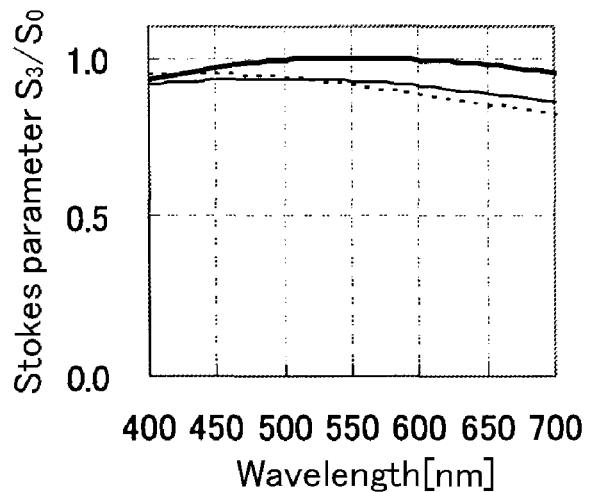
Figure 7:
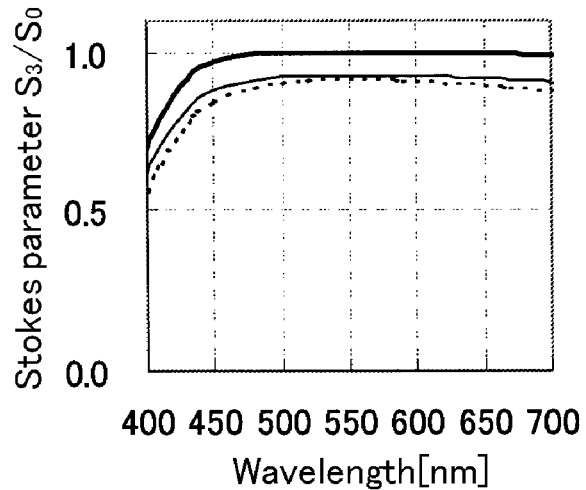
Figures 7, 8:
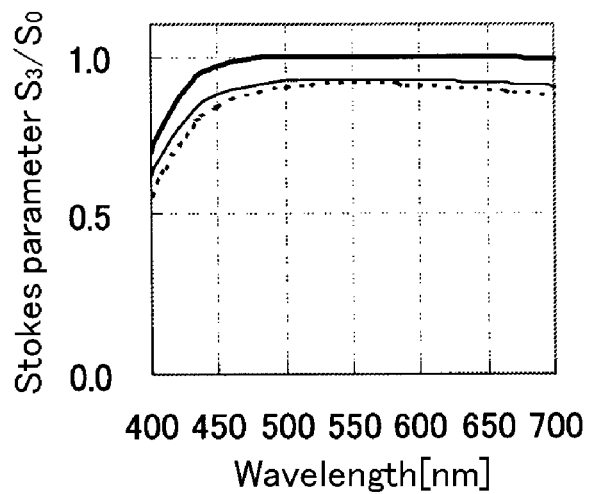
Figures 7, 8, 9:
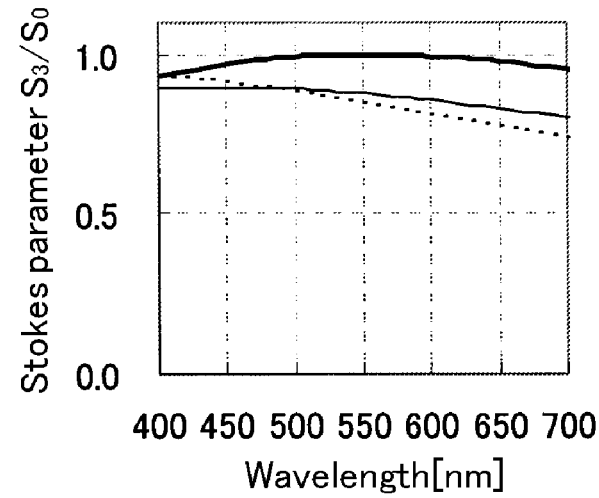
Figures 7, 8, 9, 10:
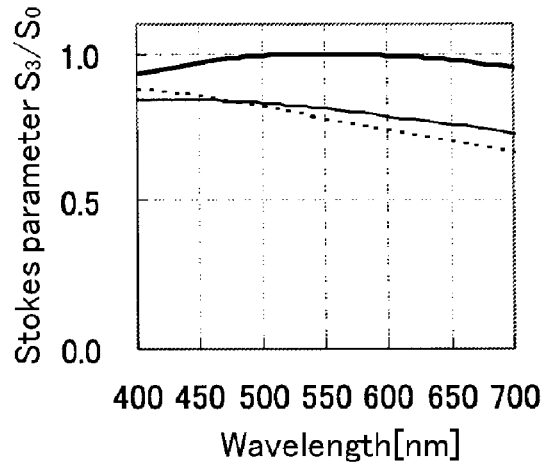
Figures 7, 8, 9, 10, 11:
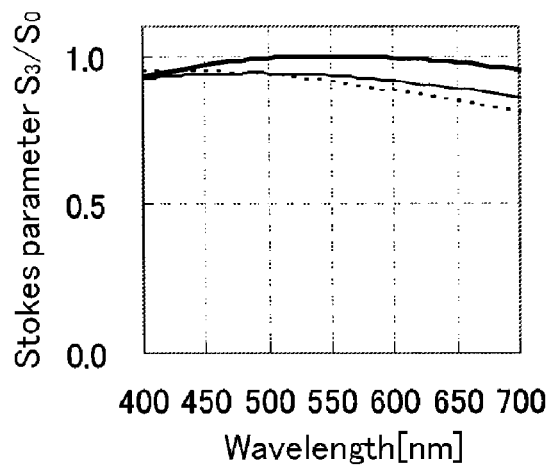
Figures 7, 8, 9, 10, 11, 12:
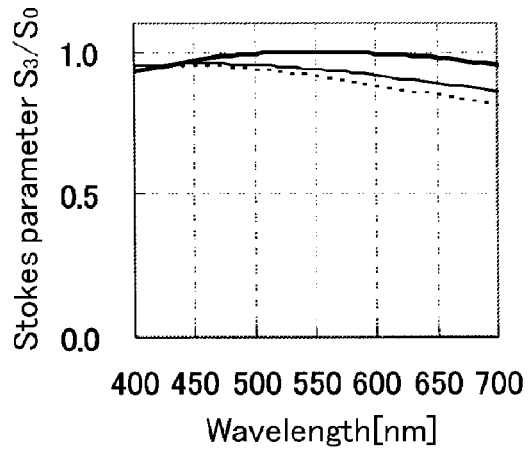
Figures 7, 8, 9, 10, 11, 12, 13:
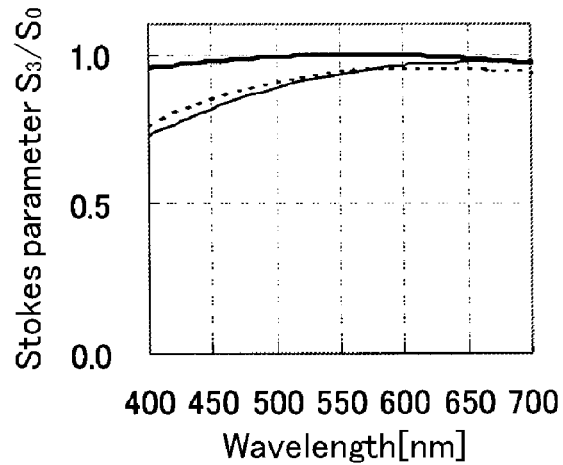
Figures 7, 8, 9, 10, 11, 12, 13, 14:
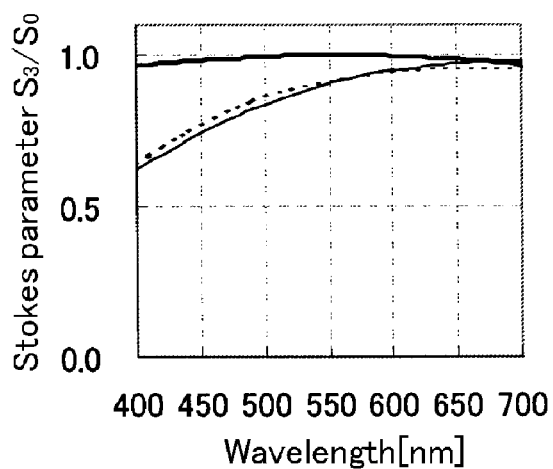
Figures 7, 8, 9, 10, 11, 12, 13, 14, 15:
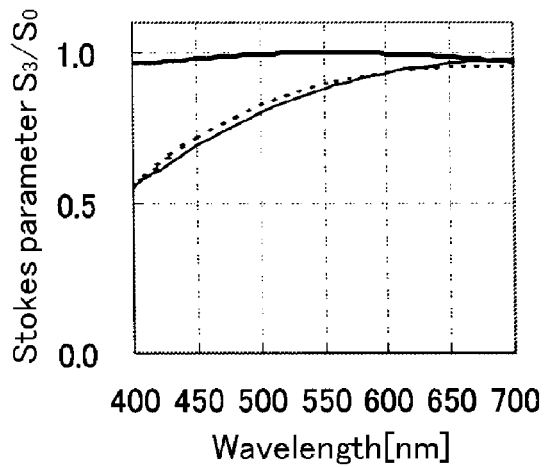
Figures 7, 8, 9, 10, 11, 12, 13, 14, 15, 16:
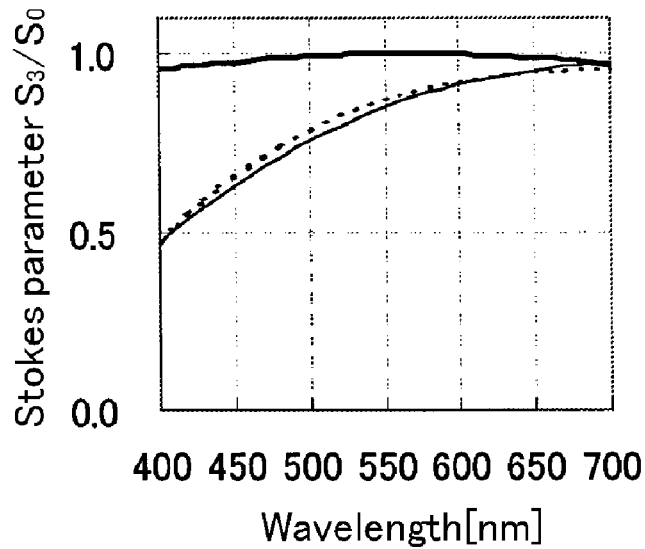
Figures 1, 8:
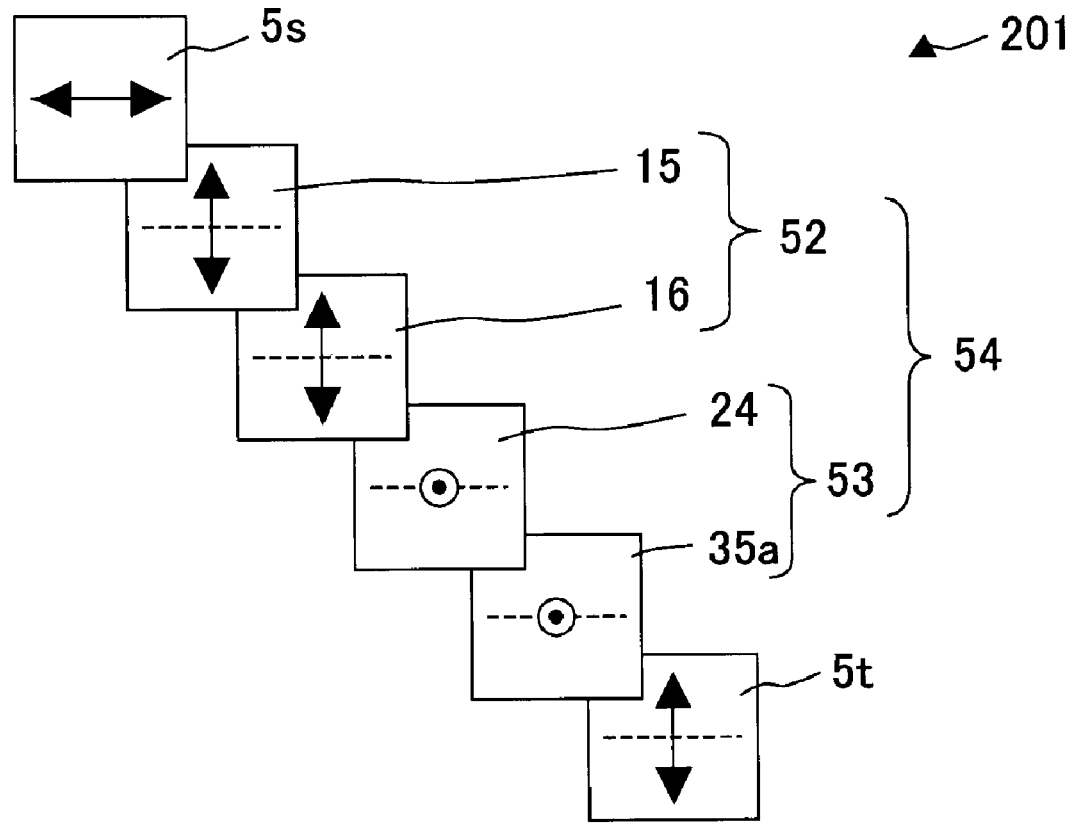
Figures 2, 8:
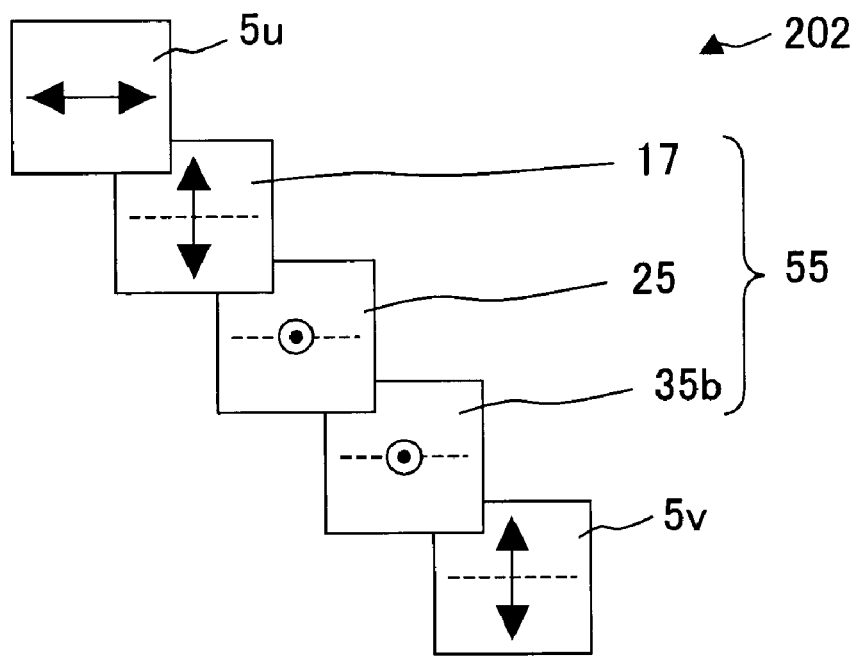
Figures 1, 9:
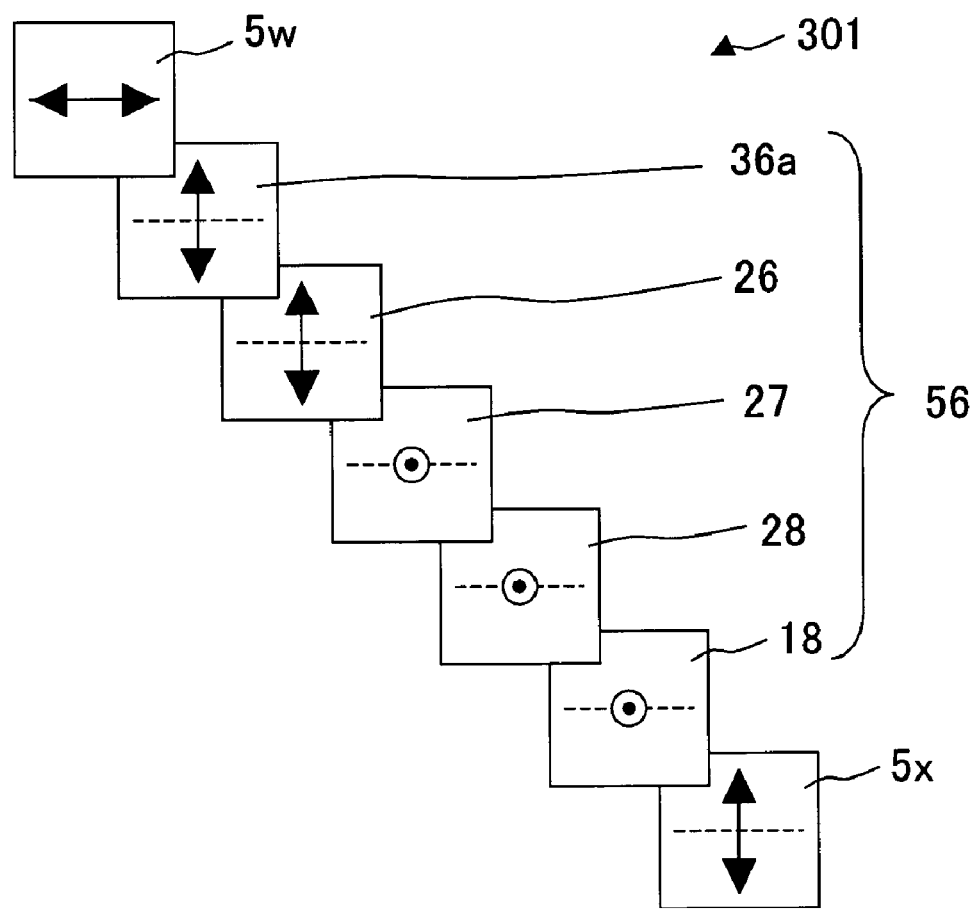
Figures 2, 9:
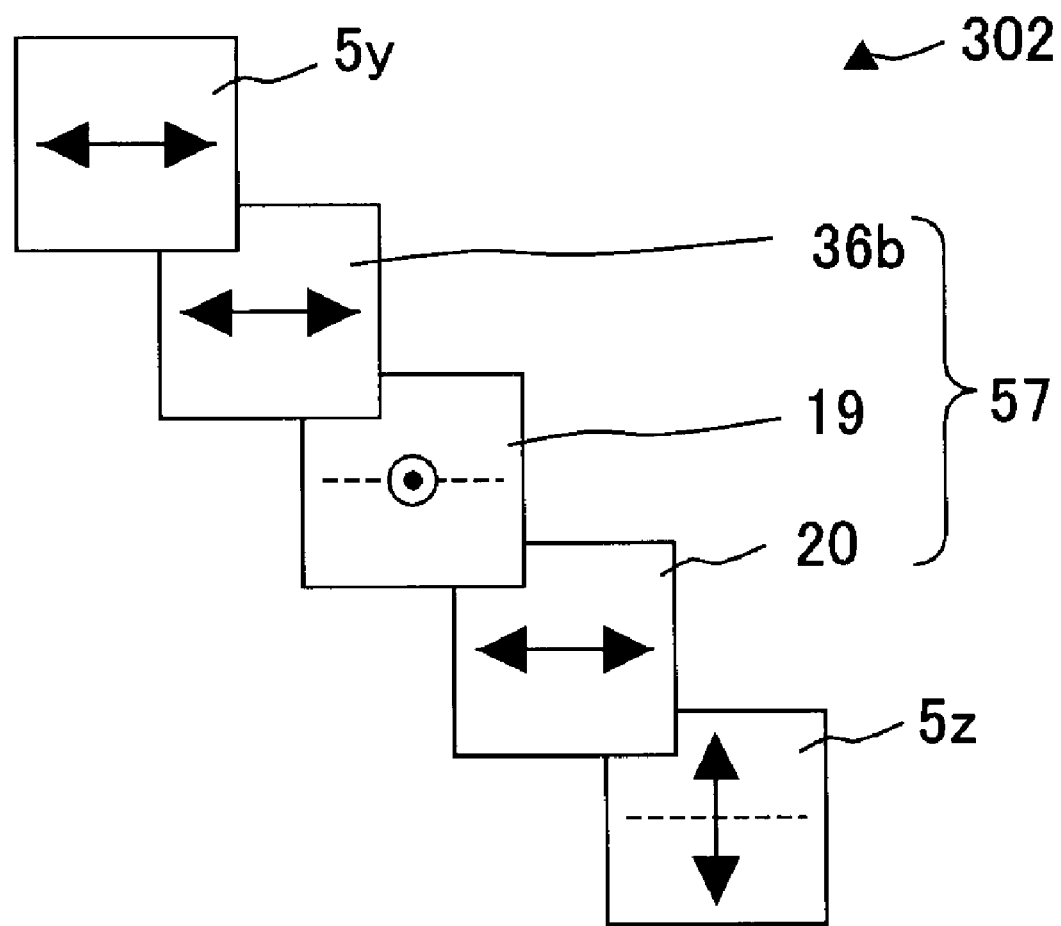

Furthermore, as shown in FIG. 7-9, also in the ninth circularly polarizing plate of the present invention in which a biaxial birefringent layer is used in place of the uniaxial birefringent layer, the ninth circularly polarizing plate of the present invention has a wider viewing angle than the second circularly polarizing plate which is a double layer perpendicularly laminated type circularly polarizing plate and the third circularly polarizing plate which is a double layer crisscross laminated type circularly polarizing plate, and this shows the effectiveness of design guidelines of the present invention. In addition, as shown in FIG. 7-10, in the tenth circularly polarizing plate of the present invention in which both the birefringent layers of the first kind and the second kind have a larger biaxial parameter η indicating a degree of a biaxial property than the ninth circularly polarizing plate, it was shown that a viewing angle is wider than those of the second circularly polarizing plate and the third circularly polarizing plate but it is narrower than that of the sixth circularly polarizing plate using the uniaxial birefringent layer.

From these results, in order to have a wider viewing angle than the second and the third circularly polarizing plates, the biaxial parameter η of the birefringent layers of the first kind and the second kind is preferably 0.5 or less, and more preferably 0.25 or less. In addition, as shown in FIGS. 7-11 and 7-12, in the eleventh and twelfth circularly polarizing plates in which the biaxial parameter η of the birefringent layer of the first kind was adjusted to a half of that of the birefringent layer of the second kind, viewing angles equivalent to the sixth circularly polarizing plate, in which two uniaxial birefringent layers are laminated so as to be parallel to each other, are retained. That is, even when the biaxial parameter η is more than 0.5, it becomes possible to have a wide viewing angle by setting the biaxial parameter η of the birefringent layer of the first kind so as to be smaller than the birefringent layer of the second kind. Accordingly, the biaxial parameter η1 of the birefringent layer of the first kind is preferably ½ times the biaxial parameter η2 of the birefringent layer of the second kind.

Further, when the P1 axis of the birefringent layer of the second kind is along another direction which is neither an in-plane direction of the birefringent layer nor a normal line direction of the birefringent layer, it is difficult to laminate the birefringent layer of the first kind having a P1 axis in the in-plane direction of the birefringent layer and the birefringent layer of the second kind in such a way that the P1 axis of the birefringent layer of the first kind is parallel to the P1 axis of the birefringent layer of the second kind. However, by disposing the P1 axis of the birefringent layer of the first kind and the P1 axis of the birefringent layer of the second kind in a plane including a normal lines of the birefringent layers likewise the thirteen-first circularly polarizing plate of the present invention, it is possible to achieve a more wide viewing angle than the second circularly polarizing plate which is a double layer perpendicularly laminated type circularly polarizing plate and the third circularly polarizing plate which is a double layer crisscross laminated type circularly polarizing plate as shown in FIG. 7-13. In addition, it is said that the thirteen-second circularly polarizing plate and the thirteen-third circularly polarizing plate of the present invention in which an angle which the P1 axis of the birefringent layer of the first kind forms with that of the birefringent layer of the second kind is 22.5 degrees or less are superior to the conventional double layer laminated type circularly polarizing plate, since $S_3$ is not less than 0.5 in a visible wavelength range.

On the other hand, since there are some wavelengths at which $S_3$ is less than 0.5 in the thirteen-fourth circularly polarizing plate of the present invention in which an angle which the P1 axis of the birefringent layer of the first kind forms with that of the birefringent layer of the second kind is 25 degrees, it is not said that this circularly polarizing plate is superior to the conventional double layer laminated type circularly polarizing plate with reliability. However, the following things could be said in consideration of this circularly polarizing plate in terms of a viewing angle of light quantity (light leakage).

If the circularly polarizing plates are compared focusing on only the calculated results at a wavelength of 550 nm which is a design central wavelength and at which a human luminosity factor reaches a peak, the following Table 12 is obtained.

TABLE 12

| Circularly polarizing plate | Angle between P1 axes (degree) | Stokes parameter S3 | | |
|---|---|---|---|---|
| | | Direction of normal line | Azimuth angle 22.5 degrees Polar angle 60 degrees | Azimuth angle 45 degrees Polar angle 60 degrees |
| Third circularly polarizing plate | — | 1.00 | 0.91 | 0.84 |
| Thirteen-first circularly polarizing plate | 15 | 1.00 | 0.94 | 0.94 |
| Thirteen-second circularly polarizing plate | 20 | 1.00 | 0.90 | 0.92 |
| Thirteen-third circularly polarizing plate | 22.5 | 1.00 | 0.88 | 0.90 |
| Thirteen-fourth circularly polarizing plate | 25.0 | 1.00 | 0.85 | 0.87 |

As shown in Table 12, also in the thirteen-fourth circularly polarizing plate, the lowest value (0.87) of $S_3$ is maintained at a level higher than the lowest value (0.84) of $S_3$ of the double layer laminated type circularly polarizing plate. Accordingly, for example when the thirteen-fourth circularly polarizing plate is prepared and placed on a mirror, a viewing angle of a reflection-preventive effect which is evaluated by focusing on only a light quantity of light with a wavelength of 550 nm apart from a coloring problem is wider than that of the conventional third circularly polarizing plate which is the double layer laminated type circularly polarizing plate. Naturally, the thirteen-fourth circularly polarizing plate becomes wideband in a normal line direction as with the third circularly polarizing plate which is the double layer laminated type circularly polarizing plate, and therefore, in comprehensively rating, even the thirteen-fourth circularly polarizing plate in which an angle which one P1 axis forms with the other P1 axis is enlarged to 25 degrees is slightly superior to the conventional third circularly polarizing plate which is the double layer laminated type circularly polarizing plate. In addition, naturally, coloring is preferably little, but, generally, a coloring-free form does not have precedence over the optimization of light quantity. In summary, an upper limit of the angle, which the P1 axis of the birefringent layer of the first kind forms with the P1 axis of the birefringent layer of the second kind, is preferably 25 degrees. A more preferable upper limit is 22.5 degrees and furthermore preferable upper limit is 15 degrees.

Thus, the effectiveness of design guidelines of the present invention is proven. Hereinafter, other embodiments of the present invention will be described. The polarizing plate (hereinafter, also referred to as a "polarizing plate with a complex birefringent medium") can be constituted by combining the complex birefringent medium of the present invention and the polarizer. The polarizing plate with a complex birefringent medium thus constituted can exhibit the effect of the present invention particularly when the P1 axes of all birefringent layers are perpendicular to the transmission axis or the absorption axis of the polarizer. The reason for this is that when the P1 axis of the birefringent layer is perpendicular to the transmission axis or the absorption axis of the polarizer, the birefringent layer substantially functions against only incident light from an oblique direction, and does not function against incident light from a normal line direction at all. Conversely, in such a case, a function of converting a polarized state of the incident light from an oblique direction is expected on the polarizing plate with a complex birefringent medium, and according to the conventional wideband phase difference film which can achieve an adequate effect of becoming wideband only in a front direction, a required effect of becoming wideband cannot be achieved.

Further, by using the polarizing plate with a complex birefringent medium of the present invention for the liquid crystal display device, it is possible to provide a coloring-less liquid crystal display device of high display quality, having a wide viewing angle. Furthermore, a constitution, in which a liquid crystal panel, a light modulation device of the liquid crystal display device, itself serves as one layer of the birefringent layers composing the complex birefringent medium, may be employed. By employing such the constitution, number of the birefringent layers can be reduced and a low-profile and low-cost liquid crystal display device can be realized. Further, as described, since the phase difference of the birefringent layer and the flexibility of control of the P1 axis are improved, a liquid crystal display device of higher quality can be realized.

EXAMPLES

Hereinafter, the present invention will be described in more detail by way of Examples, but the present invention is not limited to these Examples.

1 Constitution of Complex Birefringent Media of Examples 1 to 8, Phase Difference Film of Comparative Example 1, and Complex Birefringent Medium of Comparative Example 2

With respect to the complex birefringent media of Examples 1 to 8, the phase difference film of Comparative Example 1 and the complex birefringent medium of Comparative Example 2, species, materials, phase differences R (550), wavelength dispersibility α and β, biaxial parameters η and P1 axis directions of the birefringent layers are shown in Table 13.

TABLE 13

| Embodiment | First kind/ second kind | Material | Phase difference R (550) | Wavelength dispersibility α | β | Biaxial property η | P1 axis direction Azimuth angle | Polar angle | Evaluation results α' | β' |
|---|---|---|---|---|---|---|---|---|---|---|
| Example 1 | First kind | NB | 280 nm | 1.00 | 1.00 | 0 | 45° | 90° | 0.95 | 1.03 |
|  | Second kind | PS | −140 nm | 1.06 | 0.97 |  |  |  |  |  |
| Example 2 | First kind | NB | 280 nm | 1.00 | 1.00 | 0.2 | 45° | 90° | 0.97 | 1.02 |
|  | Second kind | PS | −140 nm | 1.06 | 0.97 | 0.3 |  |  |  |  |
| Example 3 | First kind | NB | 250 nm | 1.00 | 1.00 | 0.6 | 45° | 90° | 0.96 | 1.03 |
|  | Second kind | PS | −125 nm | 1.06 | 0.97 | 0.3 |  |  |  |  |
| Example 4 | First kind | NB | 280 nm | 1.00 | 1.00 | 0 | 45° | 90° | 0.94 | 1.04 |
|  | Second kind | DLC | −135 nm | 1.08 | 0.96 |  |  |  |  |  |
| Example 5 | First kind | NB | 280 nm | 1.00 | 1.00 | 0 | 45° | 90° | 0.99 | 1.03 |
|  | Second kind | DLC | −155 nm | 1.08 | 0.96 |  |  | 75° |  |  |
| Example 6 | First kind | NLC | 520 nm | 1.05 | 0.98 | 0 | 45° | 90° | 0.97 | 1.03 |
|  | Second kind | NB | −5 nm | 1.00 | 1.00 |  |  | 0° |  |  |
|  | Second kind | DLC | −370 nm | 1.08 | 0.96 |  |  | 90° |  |  |
| Example 7 | First kind | NLC | 520 nm | 1.05 | 0.98 | 0 | 45° | 90° | 0.97 | 1.03 |
|  | Second kind | NB | −5 nm | 1.00 | 1.00 |  |  | 0° |  |  |
|  | Second kind | DLC | −370 nm | 1.08 | 0.96 |  |  | 90° |  |  |
| Example 8 | First kind | PC | 300 nm | 1.08 | 0.96 | 0 | 45° | 90° | 0.98 | 1.02 |
|  | Second kind | PMM | −445 nm | 1.05 | 0.98 |  |  |  |  |  |
| Comparative Example 1 | First kind | PC | 135 nm | 1.08 | 0.96 | 0 | 45° | 90° | 1.08 | 0.96 |
| Comparative Example 2 | First kind | NB | 280 nm | 1.00 | 1.00 | 0 | −15° | 90° | — | — |
|  | First kind | NB | 135 nm |  |  |  | 45° |  |  |  |

Example 1

A first birefringent layer (a birefringent layer of the first kind) composed of a uniaxially-stretched norbornene (NB) resin film and a second birefringent layer (a birefringent layer of the second kind) composed of a uniaxially-stretched polystyrene (PS) resin film were laminated through a clear acrylic adhesive not having birefringence to prepare a complex birefringent medium of Example 1.

Example 2

A first birefringent layer (a birefringent layer of the first kind) formed by uniaxially-stretching a norbornene (NB) resin film in a width direction and a second birefringent layer (a birefringent layer of the second kind) formed by uniaxially-stretching a polystyrene (PS) resin film in a width direction were laminated through a clear acrylic adhesive not having birefringence to prepare a complex birefringent medium of Example 2.

Example 3

A first birefringent layer (a birefringent layer of the first kind) composed of a biaxially-stretched norbornene resin film and a second birefringent layer (a birefringent layer of the second kind) formed by uniaxially-stretching a polystyrene resin film in a width direction were laminated through a clear acrylic adhesive not having birefringence to prepare a complex birefringent medium of Example 3.

Example 4

First, a vertical alignment film was applied onto a first birefringent layer (a birefringent layer of the first kind) composed of a uniaxially-stretched norbornene resin film. Next, rubbing of the vertical alignment film was performed in a direction parallel to the direction in which the norbornene resin film had been stretched. Subsequently, a coating solution containing discotic liquid crystalline (DLC) molecules, to which a trace of an aid for vertical alignment at an air interface was added, was applied onto the vertical alignment film with a bar coater. Thereafter, by heating and drying the coating solution on the vertical alignment film, and further irradiating the dried coating solution with ultraviolet light to cure the coating solution, a second birefringent layer (a birefringent layer of the second kind) was formed. The laminated body thus formed was used as a complex birefringent medium of Example 4. In addition, "vertical alignment of discotic liquid crystalline molecules" in the present description refers to an alignment state in which disc planes of disc-shaped molecules are aligned in a direction perpendicular to a substrate.

Example 5

First, a vertical alignment film was applied onto a first birefringent layer (a birefringent layer of the first kind) composed of a uniaxially-stretched norbornene resin film. Next, rubbing of the vertical alignment film was performed in a direction parallel to the direction in which the norbornene resin film had been stretched. Subsequently, a coating solution containing discotic liquid crystalline molecules was applied onto the vertical alignment film with a bar coater. Thereafter, by heating and drying the coating solution on the vertical alignment film, and further irradiating the dried coating solution with ultraviolet light to cure the coating solution, a second birefringent layer (a birefringent layer of the second kind) was formed. The laminated body thus formed was used as a complex birefringent medium of Example 5.

In addition, the second birefringent layer (the birefringent layer of the second kind) in this example is in a hybrid alignment mode in which the orientation direction is changed successively in a thickness direction of the birefringent layer.

Therefore, assuming that the whole birefringent layer aligned in a hybrid mode is substantially equivalent to a birefringent layer in which birefringent media exhibiting an optically biaxial property are aligned uniformly at a certain angle relative to a plane of the birefringent layer, the results of measurement of a phase difference in an oblique direction were referred, and a principal dielectric axis, a principal refractive index and a P1 axis were determined by calculation.

Example 6

First, a horizontal alignment film was applied onto a first birefringent layer (a birefringent layer of the second kind) composed of an unstretched norbornene resin film. Next, rubbing of the horizontal alignment film was performed in one direction, and then a coating solution containing nematic liquid crystalline (NLC) molecules was applied onto the horizontal alignment film with a bar coater. Thereafter, by heating and drying the coating solution on the horizontal alignment film, and further irradiating the dried coating solution with ultraviolet light to cure the coating solution, a second birefringent layer (a birefringent layer of the first kind) was formed.

Further, a vertical alignment film was applied onto the side opposite to the side of the first birefringent layer (the birefringent layer of the second kind) on which the second birefringent layer (the birefringent layer of the first kind) was formed. Next, rubbing of the vertical alignment film was performed in a direction parallel to the direction in which the rubbing of the horizontal alignment film was performed. Thereafter, a coating solution containing discotic liquid crystalline molecules, to which a trace of an aid for vertical alignment at an air interface was added, was applied onto the vertical alignment film with a bar coater. Thereafter, by heating and drying the coating solution on the vertical alignment film, and further irradiating the dried coating solution with ultraviolet light to cure the coating solution, a third birefringent layer (a birefringent layer of the second kind) was formed. The laminated body thus formed was used as a complex birefringent medium of Example 6.

Example 7

By the same method as in Example 6, a second birefringent layer (a birefringent layer of the first kind) was laminated on a first birefringent layer (a birefringent layer of the second kind) with a horizontal alignment film therebetween. On the other hand, a third birefringent layer (a birefringent layer of the second kind) was formed on a glass plate as distinct from Example 6. Thereafter, only the third birefringent layer was peeled off from the glass plate and transferred to and laminated on the second birefringent layer (the birefringent layer of the first kind) through a clear acrylic adhesive not having birefringence. The laminated body thus formed was used as a complex birefringent medium of Example 7.

Example 8

A first birefringent layer (a birefringent layer of the first kind) composed of a uniaxially-stretched polycarbonate (PC) resin film and a second birefringent layer (a birefringent layer of the second kind) composed of a uniaxially-stretched polymethyl methacrylate (PMMA) resin film were laminated through a clear acrylic adhesive not having birefringence to prepare a complex birefringent medium of Example 8.

Comparative Example 1

A polycarbonate resin film was uniaxially-stretched to prepare a phase difference film of Comparative Example 1.

Comparative Example 2

A λ/2 plate (an azimuth of the slow axis is −15 degrees) and a λ/4 plate (an azimuth of the slow axis is 45 degrees), which were respectively obtained by uniaxially-stretching the norbornene resin film, were laminated through a clear acrylic adhesive not having birefringence to prepare a complex birefringent medium of Comparative Example 2.

2 Evaluation Test of Wavelength Dispersibility of Complex Birefringent Media of Examples 1 to 8, Phase Difference Film of Comparative Example 1 and Complex Birefringent Medium of Comparative Example 2

The wavelength dispersibility α' and β' of the complex birefringent media of Examples 1 to 8, the phase difference film of Comparative Example 1 and the complex birefringent medium of Comparative Example 2 were measured in three directions of a normal line direction of the complex birefringent medium or the phase difference film, an oblique direction whose azimuth angle is 22.5 degrees and polar angle is 60 degrees, and an oblique direction whose azimuth angle is 45 degrees and polar angle is 60 degrees, respectively, and average values of the wavelength dispersibility α' and β' in the three directions were determined. In addition, a spectroscopic ellipsometer (trade name: M-220, manufactured by JASCO Corp.) was used for this measurement. Further, the wavelength dispersibility α' and β' are defined by the following equations (H) and (I):

$$\alpha'=[N1(450)-N2(450)]/[N1(550)-N2(550)] \quad (H), \text{ and}$$

$$\beta'=[N1(650)-N2(650)]/[N1(550)-N2(550)] \quad (I),$$

wherein $N1(\lambda)$ and $N2(\lambda)$ represent refractive indexes corresponding to two eigenmodes of light in the case where incident light with a wavelength λ (nm) from a specified direction for measurement passes through the complex birefringent medium or the phase difference film, and $N1(\lambda) \geq N2(\lambda)$.

In addition, since it has been shown that the complex birefringent medium of Comparative Example 2 has a narrow viewing angle in an evaluation of a quantity of reflected light described later, the wavelength dispersibility of a phase difference of this complex birefringent medium was not measured.

The results of evaluation test of wavelength dispersibility are shown in Table 13. It was shown that the complex birefringent media of Examples 1 to 8 of the present invention exhibit the inverse wavelength dispersibility in the phase difference and have a wide viewing angle and are wideband. On the other hand, the phase difference film of Comparative Example 1 did not exhibit the inverse wavelength dispersibility, and in the complex birefringent medium of Comparative Example 2, wavelength dispersion and a function of converting polarized light were deviated largely from design values in directions other than the direction of a normal line.

3 Constitution of Circularly Polarizing Plates of Examples 9 to 16 and Comparative Examples 3 and 4

Example 9

By laminating the complex birefringent medium of Example 1 and a polarizer in which an azimuth of the absorption axis is 45 degrees through an acrylic adhesive not having birefringence, a circularly polarizing plate of Example 9 was prepared. In addition, as the polarizer, a polarizer not including a protective film made of triacetyl cellulose (TAC) or the like was used.

Example 10

By laminating the complex birefringent medium of Example 2 and a polarizer in which an azimuth of the absorption axis is 45 degrees through an acrylic adhesive not having birefringence, a circularly polarizing plate of Example 10 was prepared. In addition, as the polarizer, a polarizer not including a protective film made of TAC or the like was used.

Example 11

By laminating the complex birefringent medium of Example 3 and a polarizer in which an azimuth of the absorption axis is 45 degrees through an acrylic adhesive not having birefringence, a circularly polarizing plate of Example 11 was prepared. In addition, as the polarizer, a polarizer not including a protective film made of TAC or the like was used.

Example 12

By laminating the complex birefringent medium of Example 4 and a polarizer in which an azimuth of the absorption axis is 45 degrees through an acrylic adhesive not having birefringence, a circularly polarizing plate of Example 12 was prepared. In addition, as the polarizer, a polarizer not including a protective film made of TAC or the like was used.

Example 13

By laminating the complex birefringent medium of Example 5 and a polarizer in which an azimuth of the absorption axis is 45 degrees through an acrylic adhesive not having birefringence, a circularly polarizing plate of Example 13 was prepared. In addition, as the polarizer, a polarizer not including a protective film made of TAC or the like was used.

Example 14

By laminating the complex birefringent medium of Example 6 and a polarizer in which an azimuth of the absorption axis is 45 degrees through an acrylic adhesive not having birefringence, a circularly polarizing plate of Example 14 was prepared. In addition, as the polarizer, a polarizer not including a protective film made of TAC or the like was used.

Example 15

By laminating the complex birefringent medium of Example 7 and a polarizer in which an azimuth of the absorption axis is 45 degrees through an acrylic adhesive not having birefringence, a circularly polarizing plate of Example 15 was prepared. In addition, as the polarizer, a polarizer not including a protective film made of TAC or the like was used.

Example 16

By laminating the complex birefringent medium of Example 8 and a polarizer in which an azimuth of the absorption axis is 45 degrees through an acrylic adhesive not having birefringence, a circularly polarizing plate of Example 16 was prepared. In addition, as the polarizer, a polarizer not including a protective film made of TAC or the like was used.

Comparative Example 3

By laminating the phase difference film of Comparative Example 1 and a polarizer in which an azimuth of the absorption axis is 45 degrees through an acrylic adhesive not having birefringence, a circularly polarizing plate of Comparative Example 3 was prepared. In addition, as the polarizer, a polarizer not including a protective film made of TAC or the like was used.

Comparative Example 4

By laminating the complex birefringent medium of Comparative Example 2 and a polarizer in which an azimuth of the absorption axis is 45 degrees through an acrylic adhesive not having birefringence, a circularly polarizing plate of Comparative Example 4 was prepared. In addition, as the polarizer, a polarizer not including a protective film made of TAC or the like was used.

4 Visual Evaluation Test of Circularly Polarizing Plates of Examples 9 to 16 and Comparative Examples 3 and 4

The circularly polarizing plates of Examples 9 to 16 and Comparative Examples 3 and 4 were placed on an aluminum vacuum metalized mirror, respectively, to check a state of reflected light. When a light quantity of reflection was small and coloring was not recognized in all viewing directions, the circularly polarizing plate was rated as ◯, and it was rated as x when coloring was recognized. The results of evaluation test are shown in Table 14.

TABLE 14

| Embodiment | Azimuth of absorption axes of polarizer | Complex birefringent medium or phase difference film | Visual rating | |
|---|---|---|---|---|
| | | | Light quantity | Coloring |
| Example 9 | 45° | Example 1 | ◯ | ◯ |
| Example 10 | 45° | Example 2 | ◯ | ◯ |
| Example 11 | 45° | Example 3 | ◯ | ◯ |
| Example 12 | 45° | Example 4 | ◯ | ◯ |
| Example 13 | 45° | Example 5 | ◯ | ◯ |
| Example 14 | 45° | Example 6 | ◯ | ◯ |
| Example 15 | 45° | Example 7 | ◯ | ◯ |
| Example 16 | 45° | Example 8 | ◯ | ◯ |
| Comparative Example 3 | 45° | Comparative Example 1 | ◯ | X |
| Comparative Example 4 | 45° | Comparative Example 2 | X | X |

It was shown that the circularly polarizing plates of Examples 9 to 16 of the present invention have a wide viewing angle and are wideband. On the other hand, the circularly polarizing plates of Comparative Examples 3 and 4 exhibited inadequate performance as a circularly polarizing plate because the phase difference film of Comparative Example 1 did not exhibit the inverse wavelength dispersibility and in the complex birefringent medium of Comparative Example 2, wavelength dispersion and a function of converting polarized light were deviated largely from design values in directions other than the direction of a normal line.

3 Constitution of Complex Birefringent Media of Examples 17 and 18 and Phase Difference Films of Comparative Examples 5 and 6

With respect to the complex birefringent media of Examples 17 and 18 and the phase difference film of Comparative Examples 5 and 6, species, materials, phase differences R (550), wavelength dispersibility α and β, biaxial parameters η and P1 axis directions of the birefringent layers are shown in Table 15.

TABLE 15

| Embodiment | First kind/ second kind | Material | Phase difference R (550) | Wavelength dispersibility α | β | Biaxial property η | P1 axis direction Azimuth angle | Polar angle | Evaluation results α' | β' |
|---|---|---|---|---|---|---|---|---|---|---|
| Example 17 | First kind | NB | 180 nm | 1.00 | 1.00 | 0 | 90° | 90° | 0.95 | 1.02 |
| | Second kind | PMM | −100 nm | 1.05 | 0.98 | | | | | |
| Example 18 | First kind | PC | 100 nm | 1.08 | 0.96 | 0 | 0° | 90° | 0.938 | 1.04 |
| | Second kind | NB | −180 nm | 1.00 | 1.00 | 0.1 | | | | |
| Comparative Example 5 | First kind | PC | 80 nm | 1.08 | 0.96 | 0 | 0° | 90° | 1.08 | 0.96 |
| Comparative Example 6 | Second kind | PMM | −80 nm | 1.05 | 0.98 | | 90° | | 1.05 | 0.98 |

Example 17

A first birefringent layer (a birefringent layer of the first kind) composed of a uniaxially-stretched norbornene resin film and a second birefringent layer (a birefringent layer of the second kind) composed of a uniaxially-stretched polymethyl methacrylate resin film were laminated through a clear acrylic adhesive not having birefringence to prepare a complex birefringent medium of Example 17.

Example 18

A first birefringent layer (a birefringent layer of the first kind) composed of a uniaxially-stretched polycarbonate resin film and a second birefringent layer (a birefringent layer of the second kind) formed by stretching a norbornene resin film in a special manner in a film-thickness direction were laminated through a clear acrylic adhesive not having birefringence to prepare a complex birefringent medium of Example 18.

Comparative Example 5

A polycarbonate resin film was uniaxially-stretched to prepare a phase difference film of Comparative Example 5.

Comparative Example 6

A polymethyl methacrylate resin film was uniaxially-stretched to prepare a phase difference film of Comparative Example 6.

4 Evaluation Test of Wavelength Dispersibility of Complex Birefringent Media of Examples 17 and 18 and Phase Difference Film of Comparative Examples 5 and 6

The wavelength dispersibility α' and β' of the complex birefringent media of Examples 17 and 18 and the phase difference films of Comparative Examples 5 and 6 were measured in three directions of a normal line direction of the complex birefringent medium or the phase difference film, an oblique direction whose azimuth angle is 22.5 degrees and polar angle is 60 degrees, and an oblique direction whose azimuth angle is 45 degrees and polar angle is 60 degrees, respectively, and average values of the wavelength dispersibility α' and β' in the three directions were determined. In addition, a spectroscopic ellipsometer (trade name: M-220, manufactured by JASCO Corp.) was used for this measurement. The results of evaluation test are shown in Table 15. It was shown that the complex birefringent media of Examples 17 and 18 of the present invention exhibit the inverse wavelength dispersibility in the phase difference and have a wide viewing angle and are wideband. On the other hand, the phase difference films of Comparative Examples 5 and 6 did not exhibit the inverse wavelength dispersibility.

5 Constitution of Crossed Nichols Polarizing Plates of Example 19 and Comparative Example 7

Example 19

A polarizer in which an azimuth of the absorption axis is 0 degrees, the complex birefringent medium of Example 17, the complex birefringent medium of Example 18 and a polarizer in which an azimuth of the absorption axis is 90 degrees were laminated in this order through a clear acrylic adhesive not having birefringence to prepare a crossed Nichols polarizing plate of Example 19. In addition, as the polarizer, a polarizer not including a protective film made of triacetyl cellulose (TAC) or the like was used.

Comparative Example 7

A polarizer in which an azimuth of the absorption axis is 0 degrees, the phase difference film of Comparative Example 5, the phase difference film of Comparative Example 6 and a polarizer in which an azimuth of the absorption axis is 90 degrees were laminated in this order through a clear acrylic adhesive not having birefringence to prepare a crossed Nichols polarizing plate of Comparative Example 7. In addition, as the polarizer, a polarizer not including a protective film made of TAC or the like was used.

6 Visual Evaluation Test of Crossed Nichols Polarizing Plates of Example 19 and Comparative Example 7

The crossed Nichols polarizing plates of Example 19 and Comparative Example 7 were placed on a white light source, respectively, and a light quantity and coloring of the resulting transmitted light were checked. When the light quantity (or the coloring) was small in all viewing directions, the crossed Nichols polarizing plate was rated as ○, and it was rated as x when the light quantity (or the coloring) was not small. The results of evaluation test are shown in Table 16.

TABLE 16

| Embodiment | Azimuth of absorption axes of two polarizers | Complex birefringent medium or phase difference film | Visual rating | |
|---|---|---|---|---|
| | | | Light quantity | Coloring |
| Example 19 | 0°, 90° | Examples 17, 18 | ○ | ○ |
| Comparative Example 7 | 0°, 90° | Comparative Examples 5, 6 | ○ | X |

It was shown that the complex birefringent media of Examples 17 and 18 of the present invention have a wide viewing angle and are wideband, and the crossed Nichols polarizing plate of Example 19 using these complex birefringent media also has a wide viewing angle and are wideband. On the other hand, the crossed Nichols polarizing plate of Comparative Example 7 using the complex birefringent media of Comparative Examples 5 and 6 had a wide viewing angle but was colored largely.

7 Constitution of Complex Birefringent Media of Examples 20 to 22 and Comparative Example 8

With respect to the complex birefringent media of Examples 20 to 22 and Comparative Example 8, species, materials, phase differences R (550), wavelength dispersibility α and β, biaxial parameters η and P1 axis directions of the birefringent layers are shown in Table 15.

TABLE 17

| Embodiment | First kind/ second kind | Material | Phase difference R (550) | Wavelength dispersibility | | Biaxial property | P1 axis direction | | Evaluation results | |
|---|---|---|---|---|---|---|---|---|---|---|
| | | | | α | β | η | Azimuth angle | Polar angle | α' | β' |
| Example 20 | First kind | NB | 320 nm | 1.00 | 1.00 | 0.2 | 90° | 90° | 0.897 | 1.051 |
| | Second kind | DLC | −180 nm | 1.08 | 0.96 | 0 | | | | |
| Example 21 | Second kind | DLC | −220 nm | 1.08 | 0.96 | 0 | 90° | 0° | 0.984 | 1.024 |
| | First kind | NLCP | 320 nm | 1.05 | 0.98 | | | | | |
| Example 22 | First kind | NB | 320 nm | 1.00 | 1.00 | 0.2 | 90° | 90° | 0.97 | 1.03 |
| | Second kind | DLC | −180 nm | 1.08 | 0.96 | 0 | | | | |
| | Second kind | DLC | −220 nm | 1.08 | 0.96 | | | 0° | | |
| | First kind | NLCP | 320 nm | 1.05 | 0.98 | | | | | |
| Comparative Example 8 | First kind | NB | 140 nm | 1.00 | 1.00 | 0.2 | 90° | 90° | 1.03 | 0.98 |
| | Second kind | NB | −220 nm | 1.00 | 1.00 | 0 | 0° | 0° | | |
| | First kind | NLCP | 320 nm | 1.05 | 0.98 | | | | | |

Example 20

First, a vertical alignment film was applied onto a first birefringent layer (a birefringent layer of the first kind) composed of a uniaxially-stretched norbornene resin film. Next, rubbing of the vertical alignment film was performed in a direction parallel to the direction in which the norbornene resin had been stretched. Subsequently, a coating solution containing discotic liquid crystalline molecules, to which a trace of an aid for vertical alignment at an air interface was added, was applied onto the vertical alignment film with a bar coater. Thereafter, by heating and drying the coating solution on the vertical alignment film, and further irradiating the dried coating solution with ultraviolet light to cure the coating solution, a second birefringent layer (a birefringent layer of the second kind) was formed. The laminated body thus formed was used as a complex birefringent medium of Example 20.

Example 21

First, a horizontal alignment film was applied onto a glass plate, and rubbing of this film was performed. Next, a coating solution containing discotic liquid crystalline molecules, to which a trace of an aid for horizontal alignment at an air interface was added, was applied onto the horizontal alignment film with a bar coater. Subsequently, by heating and drying the coating solution on the horizontal alignment film, and further irradiating the dried coating solution with ultraviolet light to cure the coating solution, a birefringent layer (a birefringent layer of the second kind) was formed. Thereafter, only this birefringent layer (a birefringent layer of the second kind) was peeled off from the glass plate and laminated on a VA mode liquid crystal panel filled with nematic liquid crystal (NLCP) through a clear acrylic adhesive not having birefringence. Thus, a complex birefringent medium of Example 21 was formed.

In addition, "horizontal alignment of discotic liquid crystalline molecules" in the present description refers to an alignment state in which disc planes of disc-shaped molecules are aligned in a horizontal direction relative to a substrate.

Example 22

A birefringent layer of the second kind similar to Example 21 was formed directly on the second birefringent layer (the birefringent layer of the second kind) in the complex birefringent medium of Example 20, and then a VA mode liquid crystal panel filled with nematic liquid crystal was further laminated through a clear acrylic adhesive not having birefringence to form a complex birefringent medium of Example 22.

Comparative Example 8

A first birefringent layer (a birefringent layer of the first kind) composed of a uniaxially-stretched norbornene resin film, a second birefringent layer (a birefringent layer of the second kind) composed of a biaxially-stretched norbornene resin film, and a VA mode liquid crystal panel filled with nematic liquid crystal were laminated in this order through a clear acrylic adhesive not having birefringence to form a complex birefringent medium of Comparative Example 8.

8 Evaluation Test of Wavelength Dispersibility of Complex Birefringent Media of Examples 20 to 22 and Comparative Example 8

The wavelength dispersibility $\alpha'$ and $\beta'$ of the complex birefringent media of Examples 20 to 22 and Comparative Example 8 were measured in three directions of an oblique direction whose azimuth angle is 0 degrees and polar angle is 60 degrees, an oblique direction whose azimuth angle is 22.5 degrees and polar angle is 60 degrees, and an oblique direction whose azimuth angle is 45 degrees and polar angle is 60 degrees, respectively, and average values of the wavelength dispersibility $\alpha'$ and $\beta'$ in the three directions were determined. In addition, a spectroscopic ellipsometer (trade name: M-220, manufactured by JASCO Corp.) was used for this measurement. The results of evaluation test are shown in Table 17. It was shown that the complex birefringent media of Examples 20 to 22 of the present invention exhibit the inverse wavelength dispersibility in the phase difference and have a wide viewing angle and are wideband. On the other hand, the complex birefringent medium of Comparative Example 8 did not exhibit the inverse wavelength dispersibility in the phase difference.

9 Constitution of VA Mode Liquid Crystal Display Devices of Examples 23 and 24 and Comparative Example 9

Example 23

As shown in FIG. 8-1, the complex birefringent medium 52 (laminate of a birefringent layer 15 of the first kind and a birefringent layer 24 of the second kind) of Example 20 and the complex birefringent medium 53 (laminate of the birefringent layer 25 of the second kind and the liquid crystal panel 35a) of Example 21 were laminated in such a way that the birefringent layers 24 and 25 of the second kind are adjacent to each other through a clear acrylic adhesive not having birefringence. Further, a polarizer 5s, in which an azimuth of the absorption axis is 0 degrees, was laminated on the outside of the complex birefringent medium 52 of Example 20 through a clear acrylic adhesive not having birefringence. Furthermore, a polarizer 5t, in which an azimuth of the absorption axis is 90 degrees, was laminated on the outside of the complex birefringent medium 53 of Example 21 through a clear acrylic adhesive not having birefringence. Thus, a vertical alignment (VA) mode liquid crystal display device 201 of Example 23 was prepared.

Example 24

A polarizer, in which an azimuth of the absorption axis is 0 degrees, was laminated on the outside of the birefringent layer of the first kind composed of a uniaxially-stretched norbornene resin film of the complex birefringent medium of Example 22 through a clear acrylic adhesive not having birefringence. Further, a polarizer, in which an azimuth of the absorption axis is 90 degrees, was laminated on the other outside of the complex birefringent medium of Example 22 through a clear acrylic adhesive not having birefringence. Thus, a VA mode liquid crystal display device of Example 24 was prepared.

Comparative Example 9

As shown in FIG. 8-2, a polarizer 5u, in which an azimuth of the absorption axis is 0 degrees, was laminated on the outside of a first birefringent layer (birefringent layer of the first kind) 17 of the complex birefringent medium 55 (laminate of the birefringent layer 17 of the first kind, a birefringent layer 25 of the second kind and a liquid crystal panel 35b) of Comparative Example 8 through a clear acrylic adhesive not having birefringence. Further, a polarizer 5v, in which an azimuth of the absorption axis is 90 degrees, was laminated on the other outside of the complex birefringent medium 55 through a clear acrylic adhesive not having birefringence. Thus, a VA mode liquid crystal display device 202 of Comparative Example 9 was prepared.

10 Visual Evaluation Test of VA Mode Liquid Crystal Display Devices of Examples 23 and 24 and Comparative Example 9

The VA mode liquid crystal display devices of Examples 23 and 24 and Comparative Example 9 were placed on a white light source, respectively, and a light quantity and coloring in black display were checked. When the light quantity (or the coloring) was small in all viewing directions, the liquid crystal display device was rated as ◯, and it was rated as x when the light quantity (or the coloring) was not small. The results of evaluation test are shown in Table 18.

TABLE 18

| Embodiment | Azimuth of absorption axes of two polarizers | Complex birefringent medium or phase difference film | Visual rating | |
|---|---|---|---|---|
| | | | Light quantity | Coloring |
| Example 23 | 0°, 90° | Examples 20, 21 | ◯ | ◯ |
| Example 24 | 0°, 90° | Example 22 | ◯ | ◯ |
| Comparative Example 9 | 0°, 90° | Comparative Example 8 | ◯ | X |

It was shown that the liquid crystal display devices of Examples 23 and 24 of the present invention have a wider viewing angle and less coloring than the liquid crystal display device of Comparative Example 9, in black display.

11 Constitution of Complex Birefringent Medium of Example 25 and Comparative Example 10

With respect to the complex birefringent media of Example 25 and Comparative Example 10, species, materials, phase differences R (550), wavelength dispersibility α and β, biaxial parameters η and P1 axis directions of the birefringent layers are shown in Table 16.

TABLE 19

| Embodiment | First kind/ second kind | Material | Phase difference R (550) | Wavelength dispersibility | | Biaxial property η | P1 axis direction | | Evaluation results | |
|---|---|---|---|---|---|---|---|---|---|---|
| | | | | α | β | | Azimuth angle | Polar angle | α' | β' |
| Example 25 | First kind | NLCP | 340 nm | 1.05 | 0.98 | 0 | 90° | 90° | 0.99 | 1.02 |
| | Second kind | DLC | −210 nm | 1.08 | 0.96 | | | | | |
| | Second kind | NB | −5 nm | 1.00 | 1.00 | | | 0° | | |
| | Second kind | DLC | −200 nm | 1.08 | 0.96 | | | | | |
| | First kind | NLC | 300 nm | 1.05 | 0.98 | | | | | |
| Comparative Example 10 | First kind | NLCP | 340 nm | 1.05 | 0.98 | 0 | 0° | 90° | 1.04 | 0.97 |
| | First kind | NLC | 90 nm | 1.05 | 0.97 | | | 0° | | |
| | First kind | NB | 140 nm | 1.00 | 1.00 | | | 90° | | |

Example 25

First, a vertical alignment film was applied onto a first birefringent layer (a birefringent layer of the second kind) composed of a nonstretched norbornene resin film. Next, rubbing of the vertical alignment film was performed, and then a coating solution containing discotic liquid crystalline molecules, to which a trace of an auxiliary for vertical alignment at an air interface was added, was applied onto the vertical alignment film with a bar coater. Thereafter, by heating and drying the coating solution on the vertical alignment film, and further irradiating the dried coating solution with ultraviolet light to cure the coating solution, a second birefringent layer (a birefringent layer of the second kind) was formed.

Further, a horizontal alignment film was applied onto the side opposite to the side of the first birefringent layer (the birefringent layer of the second kind) on which the second birefringent layer (the birefringent layer of the second kind) was formed. Next, rubbing of the horizontal alignment film was performed, and then a coating solution containing discotic liquid crystalline molecules, to which a trace of an auxiliary for horizontal alignment at an air interface was added, was applied onto the horizontal alignment film with a bar coater. Thereafter, by heating and drying the coating solution on the horizontal alignment film, and further irradiating the dried coating solution with ultraviolet light to cure the coating solution, a third birefringent layer (a birefringent layer of the second kind) was formed. Furthermore, a vertical alignment film was applied onto the third birefringent layer, and then a coating solution containing nematic liquid crystalline molecules was applied onto the vertical alignment film with a bar coater. Thereafter, by heating and drying the coating solution on the vertical alignment film, and further irradiating the dried coating solution with ultraviolet light to cure the coating solution, a fourth birefringent layer (a birefringent layer of the first kind) was formed to obtain a complex birefringent medium. Furthermore, an in-plane switching (IPS) mode liquid crystal panel filled with nematic liquid crystal was laminated on the second birefringent layer side of the complex birefringent medium through a clear acrylic adhesive not having birefringence to form a complex birefringent medium of Example 25.

Comparative Example 10

First, a vertical alignment film was applied onto a first birefringent layer (a birefringent layer of the second kind) composed of a uniaxially-stretched norbornene resin film. Next, a coating solution containing nematic liquid crystalline molecules was applied onto the vertical alignment film with a bar coater. Thereafter, by heating and drying the coating solution on the vertical alignment film, and further irradiating the dried coating solution with ultraviolet light to cure the coating solution, a second birefringent layer (a birefringent layer of the first kind) was formed to obtain a complex birefringent medium. Furthermore, an IPS mode liquid crystal panel filled with nematic liquid crystal was laminated on the second birefringent layer side of the complex birefringent medium through a clear acrylic adhesive not having birefringence to form a complex birefringent medium of Comparative Example 10.

12 Evaluation Test of Wavelength Dispersibility of Complex Birefringent Media of Example 25 and Comparative Example 10

The wavelength dispersibility α' and β' of the complex birefringent media of Example 25 and Comparative Example 10 were measured in three directions of an oblique direction whose azimuth angle is 0 degrees and polar angle is 60 degrees, an oblique direction whose azimuth angle is 22.5 degrees and polar angle is 60 degrees, and an oblique direction whose azimuth angle is 45 degrees and polar angle is 60 degrees, respectively, and average values of the wavelength dispersibility α' and β' in the three directions were determined. In addition, a spectroscopic ellipsometer (trade name: M-220, manufactured by JASCO Corp.) was used for this measurement. The results of evaluation test are shown in Table 19. It was shown that the complex birefringent medium of Example 25 of the present invention exhibits the inverse wavelength dispersibility in the phase difference and has a wide viewing angle and is wideband. The complex birefringent medium of Comparative Example 10 did not exhibit the inverse wavelength dispersibility in the phase difference.

13 Constitution of IPS Mode Liquid Crystal Display Device of Example 26 and Comparative Example 11

Example 26

As shown in FIG. 9-1, a polarizer 5w, in which an azimuth of the absorption axis is 0 degrees, was laminated on the outside of an IPS mode liquid crystal panel 36a of the complex birefringent medium 56 (laminate of the in-plane switching (IPS) mode liquid crystal panel 36a, a first birefringent layer 26, a second birefringent layer 27, a third birefringent layer 28 and a fourth birefringent layer 18) of Example 25 through a clear acrylic adhesive not having birefringence. Further, a polarizer 5x, in which an azimuth of the absorption axis is 90 degrees, was laminated on the other outside of the complex birefringent medium 56 through a clear acrylic adhesive not having birefringence. Thus, an IPS mode liquid crystal display device 301 of Example 12 was prepared.

Comparative Example 11

As shown in FIG. 9-2, a polarizer 5y, in which an azimuth of the absorption axis is 0 degrees, was laminated on the outside of an IPS mode liquid crystal panel 36b of the complex birefringent medium 57 (laminate of the IPS mode liquid crystal panel 36b, a first birefringent layer 19 and a second birefringent layer 20) of Comparative Example 10 through a clear acrylic adhesive not having birefringence. Further, a polarizer 5z, in which an azimuth of the absorption axis is 90 degrees, was laminated on the other outside of the complex birefringent medium 57 through a clear acrylic adhesive not having birefringence. Thus, an IPS mode liquid crystal display device 302d of Comparative Example 11 was prepared.

14 Visual Evaluation Test of IPS Mode Liquid Crystal Display Devices of Example 26 and Comparative Example 11

The IPS mode liquid crystal display devices of Example 26 and Comparative Example 11 were placed on a white light source, respectively, and a light quantity and coloring in black display were checked. When the light quantity (or the coloring) was small in all viewing directions, the liquid crystal display device was rated as ◯, and it was rated as x when the light quantity (or the coloring) was not small. The results of evaluation test are shown in Table 20.

TABLE 20

| Embodiment | Azimuth of absorption axes of two polarizers | Complex birefringent medium | Visual rating Light quantity | Coloring |
|---|---|---|---|---|
| Example 26 | 0°, 90° | Example 25 | ◯ | ◯ |
| Example 11 | 0°, 90° | Comparative Example 10 | ◯ | X |

It was shown that the liquid crystal display device of Example 26 of the present invention have a wider viewing angle and less coloring than the liquid crystal display device of Comparative Example 11, in black display.

In the present description, the linear polarizer, the polarizer, the polarizing element, the polarizing plate (excluding the circularly polarizing plate and elliptically polarizing plate), and the polarization film are all synonymous. Their materials or production method are not particularly limited, but the present invention assumes the use of an ◯ type polarizing element prepared by adsorbing an iodine complex having dichroism on a polyvinyl alcohol film and stretching the resulting film in a certain direction to be oriented unless otherwise specified. Further, the polarizing element does not include a protective film of TAC or the like unless otherwise specified. Furthermore, the term "visible wavelength range" refers to a wavelength of 400 to 700 nm. In addition, λ/4 plate and λ/2 plate without an adjective modifier "biaxial", respectively, refers to an optically uniaxial λ/4 plate and λ/2 plate.

Further, the phase difference film, the phase difference plate, the birefringent layer and the optically anisotropic layer are all synonymous with the birefringent medium (without "complex"). Furthermore, in the present description, directions of the polarization axis of the polarizer and the P1 axis of the birefringent layer are defined by the azimuth angle measured in a plane of the polarizer or the birefringent layer and the polar angle measured from the normal line. When the axis is in a plane, the polar angle becomes 90 degrees, but in this case, expression of the polar angle may be omitted and the direction may be expressed by only the azimuth.

In the present description, "or more" and "or less" include the numeric value represented.

In addition, the present application claims priority under the Paris Convention and the domestic law in the country to be entered into national phase on Patent Application No. 2006-178460 filed in Japan on Jun. 28, 2006, the entire contents of which are hereby incorporated by reference.

BRIEF DESCRIPTIONS OF THE DRAWINGS

FIG. 1-1 is a schematic view showing a typical optical indicatrix of a birefringent layer (nx2>>nx1, nx3) of a first kind.

FIG. 1-2 is a schematic view showing a typical optical indicatrix of a birefringent layer (nx3>>nx1, nx2) of a first kind.

FIG. 1-3 is a schematic view showing a typical optical indicatrix of a birefringent layer (nx3>>nx1, nx2) of a first kind.

FIG. 1-4 is a schematic view showing a typical optical indicatrix of a birefringent layer (nx1>>nx2, nx3) of a first kind.

FIG. 2-1 is a schematic view showing a typical optical indicatrix of a birefringent layer (nx2<<nx1, nx3) of a second kind.

FIG. 2-2 is a schematic view showing a typical optical indicatrix of a birefringent layer (nx3<<nx1, nx2) of a second kind.

FIG. 2-3 is a schematic view showing a typical optical indicatrix of a birefringent layer (nx3<<nx1, nx2) of a second kind.

FIG. 3-1 is a schematic view showing a typical constitution of the complex birefringent medium of the present invention.

FIG. 3-2 is a schematic view showing a typical constitution of the complex birefringent medium of the present invention.

FIG. 3-3 is a schematic view showing a typical constitution of the complex birefringent medium of the present invention.

FIG. 3-4 is a schematic view showing a typical constitution of the complex birefringent medium of the present invention.

FIG. 3-5 is a schematic view showing a typical constitution of the complex birefringent medium of the present invention.

FIG. 3-6 is a schematic view showing a typical constitution of the complex birefringent medium of the present invention.

FIG. 3-7 is a schematic view showing a typical constitution of the complex birefringent medium of the present invention.

FIG. 3-8 is a schematic view showing a typical constitution of the complex birefringent medium of the present invention.

FIG. 3-9 is a schematic view showing a typical constitution of the complex birefringent medium of the present invention.

FIG. 4 is a schematic view showing a typical constitution of a complex birefringent medium in which the effect of the present invention is not achieved.

FIG. 5 is a schematic view showing a typical constitution of the complex birefringent medium of the present invention.

FIG. 6-1 is a schematic view showing a typical constitution of a conventional first circularly polarizing plate.

FIG. 6-2 is a schematic view showing a typical constitution of a conventional second circularly polarizing plate.

FIG. 6-3 is a schematic view showing a typical constitution of a conventional third circularly polarizing plate.

FIG. 6-4 is a schematic view showing a typical constitution of a conventional fourth circularly polarizing plate.

FIG. 6-5 is a schematic view showing a typical constitution of a conventional fifth circularly polarizing plate.

FIG. 6-6 is a schematic view showing a constitution of a sixth circularly polarizing plate of the present invention.

FIG. 6-7 is a schematic view showing a constitution of a seventh circularly polarizing plate of the present invention.

FIG. 6-8 is a schematic view showing a constitution of an eighth circularly polarizing plate of the present invention.

FIG. 6-9 is a schematic view showing a constitution of a ninth circularly polarizing plate of the present invention.

FIG. 6-10 is a schematic view showing a constitution of a tenth circularly polarizing plate of the present invention.

FIG. 6-11 is a schematic view showing a constitution of an eleventh circularly polarizing plate of the present invention.

FIG. 6-12 is a schematic view showing a constitution of a twelfth circularly polarizing plate of the present invention.

FIG. 6-13 is a schematic view showing a constitution of a thirteen-first circularly polarizing plate of the present invention.

FIG. 6-14 is a schematic view showing a constitution of a thirteen-second circularly polarizing plate of the present invention.

FIG. 6-15 is a schematic view showing a constitution of a thirteen-third circularly polarizing plate of the present invention.

FIG. 6-16 is a schematic view showing a constitution of a thirteen-fourth circularly polarizing plate of the present invention.

FIG. 7-1 is a graph showing a Stokes parameter $S_3$ of the conventional first circularly polarizing plate.

FIG. 7-2 is a graph showing a Stokes parameter $S_3$ of the conventional second circularly polarizing plate.

FIG. 7-3 is a graph showing a Stokes parameter $S_3$ of the conventional third circularly polarizing plate.

FIG. 7-4 is a graph showing a Stokes parameter $S_3$ of the conventional fourth circularly polarizing plate.

FIG. 7-5 is a graph showing a Stokes parameter $S_3$ of the conventional fifth circularly polarizing plate.

FIG. 7-6 is a graph showing a Stokes parameter $S_3$ of the sixth circularly polarizing plate of the present invention.

FIG. 7-7 is a graph showing a Stokes parameter $S_3$ of the seventh circularly polarizing plate of the present invention.

FIG. 7-8 is a graph showing a Stokes parameter $S_3$ of the eighth circularly polarizing plate of the present invention.

FIG. 7-9 is a graph showing a Stokes parameter $S_3$ of the ninth circularly polarizing plate of the present invention.

FIG. 7-10 is a graph showing a Stokes parameter $S_3$ of the tenth circularly polarizing plate of the present invention.

FIG. 7-11 is a graph showing a Stokes parameter $S_3$ of the eleventh circularly polarizing plate of the present invention.

FIG. 7-12 is a graph showing a Stokes parameter $S_3$ of the twelfth circularly polarizing plate of the present invention.

FIG. 7-13 is a graph showing a Stokes parameter $S_3$ of the thirteen-first circularly polarizing plate of the present invention.

FIG. 7-14 is a graph showing a Stokes parameter $S_3$ of the thirteen-second circularly polarizing plate of the present invention.

FIG. 7-15 is a graph showing a Stokes parameter $S_3$ of the thirteen-third circularly polarizing plate of the present invention.

FIG. 7-16 is a graph showing a Stokes parameter $S_3$ of the thirteen-fourth circularly polarizing plate of the present invention.

FIG. 8-1 is a schematic view showing a constitution of the VA mode liquid crystal display device in Example 23.

FIG. 8-2 is a schematic view showing a constitution of the VA mode liquid crystal display device in Comparative Example 9.

FIG. 9-1 is a schematic view showing a constitution of the IPS mode liquid crystal display device in Example 26.

FIG. 9-2 is a schematic view showing a constitution of the IPS mode liquid crystal display device in Comparative Example 11.

EXPLANATION OF REFERENCE 5a to 5z: Polarizer 11 to 19, 11a to 11d, 12a to 12c, 13a to 13c, 14a to 14c, 81 to 88, 89a to 89d: Birefringent layer of a first kind 11p to 14p, hap to 11dp, 12ap to 12cp, 13ap to 13cp, 14ap to 14cp: Principal axis corresponding to a first principal refractive index n1(550) of the birefringent layer of the first kind 21 to 28, 21a to 21d, 22a to 22c, 23a to 23c, 91 to 97, 98a to 98d: Birefringent layer of a second kind 21p to 23p, 21ap to 21dp, 22ap to 22cp, 23ap to 23cp: Principal axis corresponding to a first principal refractive index n1(550) of the birefringent layer of the second kind 30a to 30j: Plane in which a normal line of the birefringent layer and a principal axis corresponding to the first principal refractive index n1(550) exist 35a, 35b: VA mode liquid crystal panel 36a, 36b: IPS mode liquid crystal panel 41 to 57: Complex birefringent medium 61 to 65: λ/4 plate 72, 73, 75: λ/2 plate 101 to 112, 113a to 113d: Circularly polarizing plate 201, 202: VA mode liquid crystal display device 301, 302: IPS mode liquid crystal display device

The invention claimed is:

1. A complex birefringent medium comprising:
a structure in which a plurality of birefringent layers are laminated,
wherein in the complex birefringent medium, a phase difference exhibits inverse wavelength dispersibility as the whole of the complex birefringent medium,
wherein when a principal refractive index having the maximum absolute value of a difference from an average value of three principal refractive indexes at a wavelength λ (nm) is designated as a first principal refractive index n1(λ), for each of the birefringent layers a normal line of the birefringent layer and a principal axis corresponding to the first principal refractive index n1(550) of the birefringent layer are in the same plane;
wherein at least one of the plurality of birefringent layers has a biaxial parameter η of more than 0, defined by the following equation (2), $$\eta = |n2(550) - n3(550)| / |n1(550) - n2(550)| \qquad (2)$$

wherein n2(550) represents a principal refractive index having the second-largest absolute value of a difference from an average value of three principal refractive indices at a wavelength 550 (nm) and n3(550) represents a principal refractive index having the minimum absolute value of a difference from an average value of three principal refractive indexes at a wavelength 550 (nm).

2. The complex birefringent medium according to claim 1, wherein in the plurality of birefringent layers, an angle θ which the principal axis corresponding to the first principal refractive index n1(550) of one birefringent layer forms with that of another birefringent layer is 25 degrees or less.

3. The complex birefringent medium according to claim 1, wherein the complex birefringent medium has a birefringent layer of a first kind in which a phase difference R (550) at a wavelength of 550 nm defined by the following equation (1) is positive value and a birefringent layer of a second kind in which a phase difference R (550) at a wavelength of 550 nm defined by the following equation (1) is negative value, $$R(\lambda) = [n1(\lambda) - n2(\lambda)] \times d \qquad (1)$$

wherein R (λ) represents a phase difference at a wavelength λ (nm); n2(λ) represents a principal refractive index having the second-largest absolute value of a difference from an average value of three principal refractive indexes at a wavelength λ (nm); and d represents thickness.

4. The complex birefringent medium according to claim 3, wherein in the birefringent layer of the first kind and the birefringent layer of the second kind, phase differences exhibit normal wavelength dispersibility, respectively.

5. The complex birefringent medium according to claim 3, wherein the birefringent layer of the first kind has a larger absolute value of the phase difference R (550) than that of the birefringent layer of the second kind.

6. The complex birefringent medium according to claim 5, wherein the birefringent layer of the first kind has smaller wavelength dispersibility of the phase difference than that of the birefringent layer of the second kind.

7. The complex birefringent medium according to claim 6, wherein the birefringent layer of the first kind is a film made of a norbornene resin.

8. The complex birefringent medium according to claim 3, wherein the birefringent layer of the first kind has a smaller absolute value of the phase difference R (550) than that of the birefringent layer of the second kind.

9. The complex birefringent medium according to claim 8, wherein the birefringent layer of the first kind has smaller wavelength dispersibility of the phase difference than that of the birefringent layer of the second kind.

10. The complex birefringent medium according to claim 9, wherein the birefringent layer of the second kind is a film made of a norbornene resin.

11. A complex birefringent medium comprising:
a structure in which a plurality of birefringent layers are laminated,
wherein in the complex birefringent medium, a phase difference exhibits inverse wavelength dispersibility as the whole of the complex birefringent medium,
wherein when a principal refractive index having the maximum absolute value of a difference from an average value of three principal refractive indexes at a wavelength λ (nm) is designated as a first principal refractive index n1(λ), for each of the birefringent layers a normal line of the birefringent layer and a principal axis corresponding to the first principal refractive index n1(550) of the birefringent layer are in the same plane, and
wherein in at least one of the plurality of birefringent layers, the principal axis corresponding to the first principal refractive index n1(550) is along direction which is neither an in-plane direction of the birefringent layer nor a normal line direction of the birefringent layer.

12. The complex birefringent medium according to claim 1, wherein at least one of the plurality of birefringent layers includes liquid crystalline molecules.

13. The complex birefringent medium according to claim 12, wherein orientation directions of the liquid crystalline molecules change successively in a thickness direction of the birefringent layer.

14. The complex birefringent medium according to claim 12, wherein the liquid crystalline molecules are discotic liquid crystalline molecules.

15. The complex birefringent medium according to claim 12, wherein the liquid crystalline molecules are nematic liquid crystalline molecules.

16. The complex birefringent medium according to claim 11,
wherein at least one of the plurality of birefringent layers has a biaxial parameter η of more than 0, defined by the following equation (2), $$\eta = |n2(550) - n3(550)| / |n1(550) - n2(550)| \qquad (2)$$

wherein n2(550) represents a principal refractive index having the second-largest absolute value of a difference from an average value of three principal refractive indices at a wavelength 550 (nm) and n3(550) represents a principal refractive index having the minimum absolute value of a difference from an average value of three principal refractive indexes at a wavelength 550 (nm).

17. The complex birefringent medium according to claim 1, wherein at least one of the plurality of birefringent layers has a biaxial parameter η of ½ or less, defined by the following equation (2), $$\eta = |n2(550) - n3(550)| / |n1(550) - n2(550)| \qquad (2),$$

wherein n3(550) represents a principal refractive index having the minimum absolute value of a difference from an average value of three principal refractive indexes at a wavelength 550 (nm).

18. The complex birefringent medium according to claim 3, wherein the birefringent layer of the first kind has a smaller biaxial parameter η defined by the following equation (2) than that of the birefringent layer of the second kind, $$\eta = |n2(550) - n3(550)| / |n1(550) - n2(550)| \qquad (2)$$

wherein n3(550) represents a principal refractive index having the minimum absolute value of a difference from an average value of three principal refractive indexes at a wavelength 550 (nm).

19. The complex birefringent medium according to claim 18, wherein the birefringent layer of the first kind has a biaxial parameter η of ½ of that of the birefringent layer of the second kind.

20. A polarizing plate having the complex birefringent medium according to claim 1 and a polarizer.

21. The polarizing plate according to claim 20,
wherein in a birefringent layer of the complex birefringent medium, the principal axis corresponding to the first principal refractive index n1(550) is perpendicular to a transmission axis and/or an absorption axis of the polarizer in viewing from a front direction.

22. A liquid crystal display device having the polarizing plate according to claim 20 and a liquid crystal panel.

23. A liquid crystal display device comprising:
a structure in which a liquid crystal panel sandwiching a liquid crystal layer between two opposed substrates and having at least a pair of electrodes for applying a voltage to the liquid crystal layer, and a birefringent layer other than a liquid crystal panel are laminated,
wherein in the liquid crystal display device, a phase difference exhibits inverse wavelength dispersibility as the whole of the liquid crystal display device in a state of displaying black,
wherein when a principal refractive index having the maximum absolute value of a difference from an average value of three principal refractive indexes at a wavelength λ (nm) is designated as a first principal refractive index n1(λ), a normal line of the liquid crystal layer and the birefringent layer, and principal axes corresponding to a first principal refractive index n1(550) of the liquid crystal layer and the birefringent layer are in the same plane;
wherein the birefringent layer has a biaxial parameter η of more than 0, defined by the following equation (2), $$\eta = |n2(550) - n3(550)| / |n1(550) - n2(550)| \quad (2)$$

wherein n2(550) represents a principal refractive index having the second-largest absolute value of a difference from an average value of three principal refractive indices at a wavelength 550 (nm), and n3(550) represents a principal refractive index having the minimum absolute value of a difference from an average value of three principal refractive indexes at a wavelength 550 (nm).

24. The liquid crystal display device according to claim 23, wherein in the liquid crystal layer and the birefringent layer, an angle θ which the principal axis corresponding to the first principal refractive index n1(550) of the liquid crystal layer forms with the principal axis corresponding to the first principal refractive index n1(550) of the birefringent layer is 25 degrees or less in a state of displaying black.

25. The liquid crystal display device according to claim 23, wherein one of phase differences R (550) at a wavelength of 550 nm defined by the following equation (1) of the liquid crystal layer and the birefringent layer is positive value and the other is negative value, $$R(\lambda) = [n1(\lambda) - n2(\lambda)] \times d \quad (1)$$

wherein R (λ) represents a phase difference at a wavelength λ (nm); n2(λ) represents a principal refractive index having the second-largest absolute value of a difference from an average value of three principal refractive indexes at a wavelength λ (nm); and d represents thickness.

26. The liquid crystal display device according to claim 25, wherein in the liquid crystal layer and the birefringent layer, phase differences exhibit normal wavelength dispersibility, respectively, in a state of displaying black.

27. The liquid crystal display device according to claim 23, wherein the liquid crystal layer has a larger absolute value of the phase difference R (550) than that of the birefringent layer in a state of displaying black.

28. The liquid crystal display device according to claim 27, wherein the liquid crystal layer has smaller wavelength dispersibility of the phase difference than that of the birefringent layer in a state of displaying black.

29. The liquid crystal display device according to claim 23, wherein the liquid crystal layer has a smaller absolute value of the phase difference R (550) than that of the birefringent layer in a state of displaying black.

30. The liquid crystal display device according to claim 29, wherein the liquid crystal layer has a larger wavelength dispersibility of the phase difference than that of the birefringent layer in a state of displaying black.

31. The liquid crystal display device according to claim 30, wherein the birefringent layer is a film made of a norbornene resin.

32. The liquid crystal display device according to claim 23, wherein in the birefringent layer, the principal axis corresponding to the first principal refractive index n1(550) is along direction which is neither an in-plane direction of the birefringent layer nor a normal line direction of the birefringent layer in a state of displaying black.

33. The liquid crystal display device according to claim 23, wherein the birefringent layer includes liquid crystalline molecules.

34. The liquid crystal display device according to claim 33, wherein orientation directions of the liquid crystalline molecules change successively in a thickness direction of the birefringent layer in a state of displaying black.

35. The liquid crystal display device according to claim 33, wherein the liquid crystalline molecules are discotic liquid crystalline molecules.

36. The liquid crystal display device according to claim 33, wherein the liquid crystalline molecules are nematic liquid crystalline molecules.

37. The liquid crystal display device according to claim 23, wherein the birefringent layer has a biaxial parameter η of ½ or less, defined by the following equation (2), $$\eta = |n2(550) - n3(550)| / |n1(550) - n2(550)| \quad (2)$$

wherein n3(550) represents a principal refractive index having the minimum absolute value of a difference from an average value of three principal refractive indexes at a wavelength 550 (nm).

38. The liquid crystal display device according to claim 23, wherein the liquid crystal layer has a smaller biaxial parameter η defined by the following equation (2) than that of the birefringent layer in a state of displaying black, $$\eta = |n2(550) - n3(550)| / |n1(550) - n2(550)| \quad (2)$$

wherein n3(550) represents a principal refractive index having the minimum absolute value of a difference from an average value of three principal refractive indexes at a wavelength 550 (nm).

39. The liquid crystal display device according to claim 38, wherein the liquid crystal layer has a biaxial parameter η of ½ of that of the birefringent layer in a state of displaying black.

* * * * *